(12) United States Patent
Sugiyama et al.

(10) Patent No.: US 10,486,571 B2
(45) Date of Patent: Nov. 26, 2019

(54) CHAIR

(71) Applicant: TS TECH CO., LTD., Asaka-shi, Saitama (JP)

(72) Inventors: Shinji Sugiyama, Tochigi (JP); Yukitaka Tadachi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/561,914

(22) PCT Filed: Mar. 25, 2016

(86) PCT No.: PCT/JP2016/059638
§ 371 (c)(1),
(2) Date: Sep. 26, 2017

(87) PCT Pub. No.: WO2016/158759
PCT Pub. Date: Oct. 6, 2016

(65) Prior Publication Data
US 2018/0118071 A1    May 3, 2018

(30) Foreign Application Priority Data

Mar. 27, 2015  (JP) ................................ 2015-067212
Mar. 27, 2015  (JP) ................................ 2015-067213
(Continued)

(51) Int. Cl.
*B60N 2/90*    (2018.01)
*A47C 7/72*    (2006.01)
(Continued)

(52) U.S. Cl.
CPC .................. *B60N 2/90* (2018.02); *A47C 1/12* (2013.01); *A47C 7/14* (2013.01); *A47C 7/72* (2013.01);
(Continued)

(58) Field of Classification Search
CPC .. A47C 7/72; A47C 7/744; A47C 9/02; B60N 2002/981
(Continued)

(56) References Cited

U.S. PATENT DOCUMENTS 6,056,357 A    5/2000  Fukuoka
6,109,688 A    8/2000  Wurz et al.
(Continued)

FOREIGN PATENT DOCUMENTS

JP    S40-017038 Y    6/1965
JP    S58-152927 U    10/1983
(Continued)

OTHER PUBLICATIONS

Office Action issued in related application JP 2015-074042, dated Mar. 28, 2017, with machine generated English language translation, 8 pages.
(Continued)

*Primary Examiner* — Gary C Hoge
(74) *Attorney, Agent, or Firm* — Drinker Biddle & Reath LLP

(57) ABSTRACT

The present disclosure provides a chair in which attachment strength of a holding member and the chair is enhanced and an attachment state can be stably maintained. A legged chair includes a leg member, a support post connected to the leg member, a metal frame integrated with the support post, the metal frame forming a seated portion, an awakening device configured to awaken a seated person, a battery configured to supply electric power to the awakening device, an ECU that controls the awakening device, and a holding cover configured to hold the battery and the ECU. The holding cover is attached to the highly rigid metal frame.

15 Claims, 64 Drawing Sheets

(30) Foreign Application Priority Data

| | | | |
|---|---|---|---|
| Mar. 31, 2015 | (JP) | ................................ | 2015-074039 |
| Mar. 31, 2015 | (JP) | ................................ | 2015-074040 |
| Mar. 31, 2015 | (JP) | ................................ | 2015-074041 |
| Mar. 31, 2015 | (JP) | ................................ | 2015-074042 |
| Mar. 31, 2015 | (JP) | ................................ | 2015-074043 |
| Mar. 31, 2015 | (JP) | ................................ | 2015-074044 |
| Mar. 31, 2015 | (JP) | ................................ | 2015-074045 |

(51) Int. Cl.
 A47C 9/02 (2006.01)
 A47C 7/74 (2006.01)
 A47C 1/12 (2006.01)
 A47C 7/14 (2006.01)

(52) U.S. Cl.
 CPC ............... *A47C 7/744* (2013.01); *A47C 9/02* (2013.01); *B60N 2002/981* (2018.02)

(58) Field of Classification Search
 USPC .......................... 297/217.3, 217.2; 601/49
 See application file for complete search history.

(56) References Cited

U.S. PATENT DOCUMENTS

| | | | |
|---|---|---|---|
| 6,779,592 | B1 | 8/2004 | Ichigaya |
| 2004/0135410 | A1* | 7/2004 | Udo ............ A47C 3/026 297/313 |
| 2005/0137462 | A1 | 6/2005 | Cho |
| 2005/0242635 | A1 | 11/2005 | Cassaday |
| 2008/0100101 | A1* | 5/2008 | Wolas ............ A47C 7/744 297/180.15 |
| 2009/0099721 | A1 | 4/2009 | Imai et al. |
| 2014/0217785 | A1* | 8/2014 | Arens ............ A47C 7/748 297/180.12 |
| 2015/0032037 | A1* | 1/2015 | Nakano ............ A61H 23/0263 601/46 |
| 2015/0061347 | A1 | 3/2015 | Sugiyama et al. |
| 2015/0202991 | A1 | 7/2015 | Sugiyama et al. |
| 2016/0089084 | A1 | 3/2016 | Sugiyama et al. |
| 2016/0354026 | A1* | 12/2016 | Zohar ............ B60N 2/976 |
| 2017/0066121 | A1* | 3/2017 | Huang ............ B25H 1/00 |
| 2017/0135490 | A1* | 5/2017 | Andrix ............ H02J 7/0042 |
| 2017/0313319 | A1* | 11/2017 | Kishi ............ B60R 1/00 |

FOREIGN PATENT DOCUMENTS

| | | |
|---|---|---|
| JP | S58-179129 U | 11/1983 |
| JP | S60-54453 U | 4/1985 |
| JP | S61-163563 U | 10/1986 |
| JP | S61-193826 U | 12/1986 |
| JP | S61-196740 U | 12/1986 |
| JP | S61-196741 U | 12/1986 |
| JP | S63-42259 U | 3/1988 |
| JP | S63-085247 U | 6/1988 |
| JP | S63-176444 U | 11/1988 |
| JP | H01-135933 U | 9/1989 |
| JP | H02-008082 U | 1/1990 |
| JP | H03-51621 U | 5/1991 |
| JP | H03-086859 U | 9/1991 |
| JP | H03-127373 U | 12/1991 |
| JP | H05-330360 A | 12/1992 |
| JP | H05-028250 U | 4/1993 |
| JP | H05-082342 U | 11/1993 |
| JP | H06-015555 U | 3/1994 |
| JP | H06-064458 A | 3/1994 |
| JP | H06-253953 A | 9/1994 |
| JP | H07-028560 U | 5/1995 |
| JP | H07-322938 A | 12/1995 |
| JP | H08-115481 A | 5/1996 |
| JP | H08-117048 A | 5/1996 |
| JP | H09-164863 A | 6/1997 |
| JP | H10-59035 A | 3/1998 |
| JP | H10-080455 A | 3/1998 |
| JP | 2578214 Y | 8/1998 |
| JP | 2000-512175 A | 9/2000 |
| JP | 2003-038283 A | 2/2003 |
| JP | 2005-279064 A | 10/2005 |
| JP | 2005-287623 A | 10/2005 |
| JP | 2005-287784 A | 10/2005 |
| JP | 2005-536251 A | 12/2005 |
| JP | 2006-015023 A | 1/2006 |
| JP | 2006-503599 A | 2/2006 |
| JP | 2007-055321 A | 3/2007 |
| JP | 2007-301175 A | 11/2007 |
| JP | 2008-086614 A | 4/2008 |
| JP | 2009-106673 A | 5/2009 |
| JP | 2009-255809 A | 11/2009 |
| JP | 2012-136134 A | 7/2012 |
| JP | 2013-046548 A | 3/2013 |
| JP | 2013-188435 A | 9/2013 |
| JP | 2013-220810 A | 10/2013 |
| JP | 2014-071628 A | 4/2014 |
| JP | 2014-180415 A | 9/2014 |
| WO | 01/15573 A1 | 3/2001 |
| WO | 2009/157117 A1 | 12/2009 |
| WO | 2013/080369 A1 | 6/2013 |
| WO | 2014/010568 A1 | 1/2014 |
| WO | 2014/185532 A1 | 11/2014 |

OTHER PUBLICATIONS

Office Action issued in related application JP 2015-067213, dated Dec. 4, 2018, with machine generated English language translation, 6 pages.
Office Action issued in related application JP 2015-074039, dated Dec. 4, 2018, with machine generated English language translation, 6 pages.
Office Action issued in related application JP 2015-074040, dated Dec. 4, 2018, with machine generated English language translation, 7 pages.
Office Action issued in related application JP 2015-074041, dated Dec. 4, 2018, with machine generated English language translation, 8 pages.
Office Action issued in related application JP 2015-074043, dated Dec. 4, 2018, with machine generated English language translation, 7 pages.
Office Action issued in related application JP 2015-074044, dated Dec. 4, 2018, with machine generated English language translation, 7 pages.
Office Action issued in related application JP 2015-074045, dated Dec. 4, 2018, with machine generated English language translation, 8 pages.
Office Action issued in related application JP 2015-074040, dated Aug. 6, 2019, with machine generated English language translation, 6 pages.

* cited by examiner

CHAIR

CROSS REFERENCE TO RELATED APPLICATIONS

This application is a National Stage Entry application of PCT Application No. PCT/JP2016/059638, filed Mar. 25, 2016, which claims the priority benefit of Japanese Patent Application Nos. JP 2015-067212 and JP 2015-067213, both filed Mar. 27, 2015; and Japanese Patent Application Nos. JP 2015-074039, JP 2015-074040, JP 2015-074041, JP 2015-074042, JP 2015-074043, JP 2015-074044 and JP 2015-074045, all filed Mar. 31, 2015, the contents being incorporated herein by reference.

BACKGROUND

The present disclosure relates to a chair, and particularly relates to a chair provided with an awakening device that provides stimulation to a seated person.

For the purpose of preliminarily preventing generation of an accident at the time of driving a vehicle, there is a known technique of preventing a decrease in an awake state of a driver of the vehicle. For example, Japanese Patent Publication JP A 2013-220810 describes a technique of providing a vibrating stimulation to a seated person by using a vehicle seat including a heartbeat sensor or a breathing sensor, and an electric device such as a motor. The technique of preventing the decrease in an awake state, in other words, preventing a doze, can be used not only for the vehicle seat but also for an office legged chair or the like for the purpose of efficiently studying or working.

However, in a case where the electric device is attached to the legged chair, unlike the vehicle seat with which the electric device can be disposed inside the vehicle, attachment spaces and attachment strength for a battery, an ECU (Electrical Control Unit), and the like are not easily ensured. Thus, as a technique in which an electric device is used in a legged chair, Japanese Patent Publication JP T 2006-503599 describes a technique of, in order to correct a posture of a seated person, arranging a sensor on a seating surface of a legged chair, attaching a control unit including a battery and a control device (a member holding the battery and the control device is referred to as a holding member) to a lower surface of a cushion pan, and detecting a posture of the seated person on the basis of presence or absence of a sensor detection signal.

In the above legged chair described in JP T 2006-503599, when legs or the like of the seated person hit the control unit and the control unit is bumped, the control unit may sometimes be removed from the cushion pan. Therefore, there is a need for ensuring attachment strength of the control unit to the legged chair.

When heat generated from the battery and the control device is kept in the control unit, operation speed of the control device may sometimes be decreased. Further, a space for arrangement of a harness attached to the control unit is not easily ensured. In particular, in a legged chair with casters, the harness easily gets entangled with the chair, and attachment of the harness is a problem.

Since the control unit is provided on the lower side of a seated portion, the seated person does not easily perform a task of replacing the battery forming the control unit or charging the battery in a seated state.

SUMMARY

Various embodiments of the present disclosure address the problems described above, and an embodiment of the present disclosure provides a chair in which attachment strength of a holding member and the chair is enhanced and an attachment state can be stably maintained. In an embodiment, the chair is configured to suppress a thermal influence on a control device to prevent a decrease in operation speed. In an embodiment, the chair provides a space in which a harness is arranged in the chair. In an embodiment, the chair is configured for a user to more easily perform a task of replacing or charging a battery provided in the chair.

One or more of the above-described problems are solved by a chair according to various embodiments of the present disclosure, including a leg member, a support post connected to the leg member, a metal frame integrated with the support post, the metal frame forming a seated portion, an awakening device that awakens a seated person, the awakening device having a stimulation device that provides a stimulation to the seated person, a control device that controls the stimulation device, a battery that supplies electric power to the awakening device, and a holding member holding the battery and the control device, wherein the holding member is attached to the metal frame.

In an embodiment, the holding member holding the battery and the control device is attached to the metal frame integrated with the support post which is provided in the chair. Thereby, an attachment state of the holding member to the chair can be stably maintained.

In addition, preferably, the metal frame is formed to be curved. With the above configuration, the metal frame whose rigidity is enhanced by forming the curved metal frame is an object to which the holding member is attached. Thereby, a support state of the holding member can be stably maintained.

Further, preferably, the holding member has a projecting portion attached to the metal frame, the projecting portion projecting on an upper side of one of the battery and the control device held by the holding member, and in a state where the holding member is attached to the metal frame, a space is formed between the battery or the control device and the metal frame. With the above configuration, the space is formed between the metal frame and the one of the battery and the control device. Thereby, a heat radiation property becomes favorable and a harness can be arranged in the space.

In particular, preferably, the holding member holds the battery on the lower side of the control device. With the above configuration, the holding member holds the battery on a lower side at a position distant from the seated portion. Thereby, a user of the chair can more easily attach and detach the battery in a state where the user remains seated in the seated portion. Alternatively, a power feeding cord can be more easily plugged into or unplugged from a plug connected to a rechargeable battery. Thereby, workability becomes favorable. Further, since the control device is held by the holding member on the upper side of the battery, a dead space on the upper side of the battery can be effectively utilized.

Preferably, a portion of the holding member is a resin portion, and the chair comprises a fastening member that fastens the resin portion to the metal frame. With the above configuration, the fastening member sandwiches and fastens the metal frame and the less rigid resin portion in the holding member. Thereby, fitting length of the fastening member can be extended, so that the attachment strength can be enhanced.

According to an embodiment of the present disclosure, the attachment strength of the holding member to the chair can be enhanced, so that the attachment state can be stably maintained. According to an embodiment of the present disclosure, the heat radiation property becomes favorable, and the harness can be arranged in the space. The user of the chair can more easily attach and detach or charge the battery in a state where the user remains seated in the seated portion, so that the workability becomes favorable. Further, the dead space on the upper side of the battery can be effectively utilized.

BRIEF DESCRIPTION OF DRAWINGS

Various embodiments of the invention are illustrated in the drawings, in which.

DETAILED DESCRIPTION

The present disclosure relates to a chair, and particularly relates to a chair provided with an awakening (doze prevention) device. Embodiments described below do not limit the present disclosure but only serve as one example for facilitating understanding of the present disclosure. That is, the shape, size, arrangement, and the like of members to be described below can be modified or improved without departing from the gist of the present disclosure, and the present disclosure includes equivalents thereof as a matter of course.

First Embodiment

Hereinafter, a legged chair S according to a first embodiment of the present disclosure, an ECU 7, a battery 8, and a holding cover 71 holding these components provided in the legged chair S is described with reference to the drawings. In the following description, the front to back direction will indicate the front to back direction of the chair, and the right and left direction will indicate the right and left direction of the chair (also referred to as the chair width direction).

Figure 1:
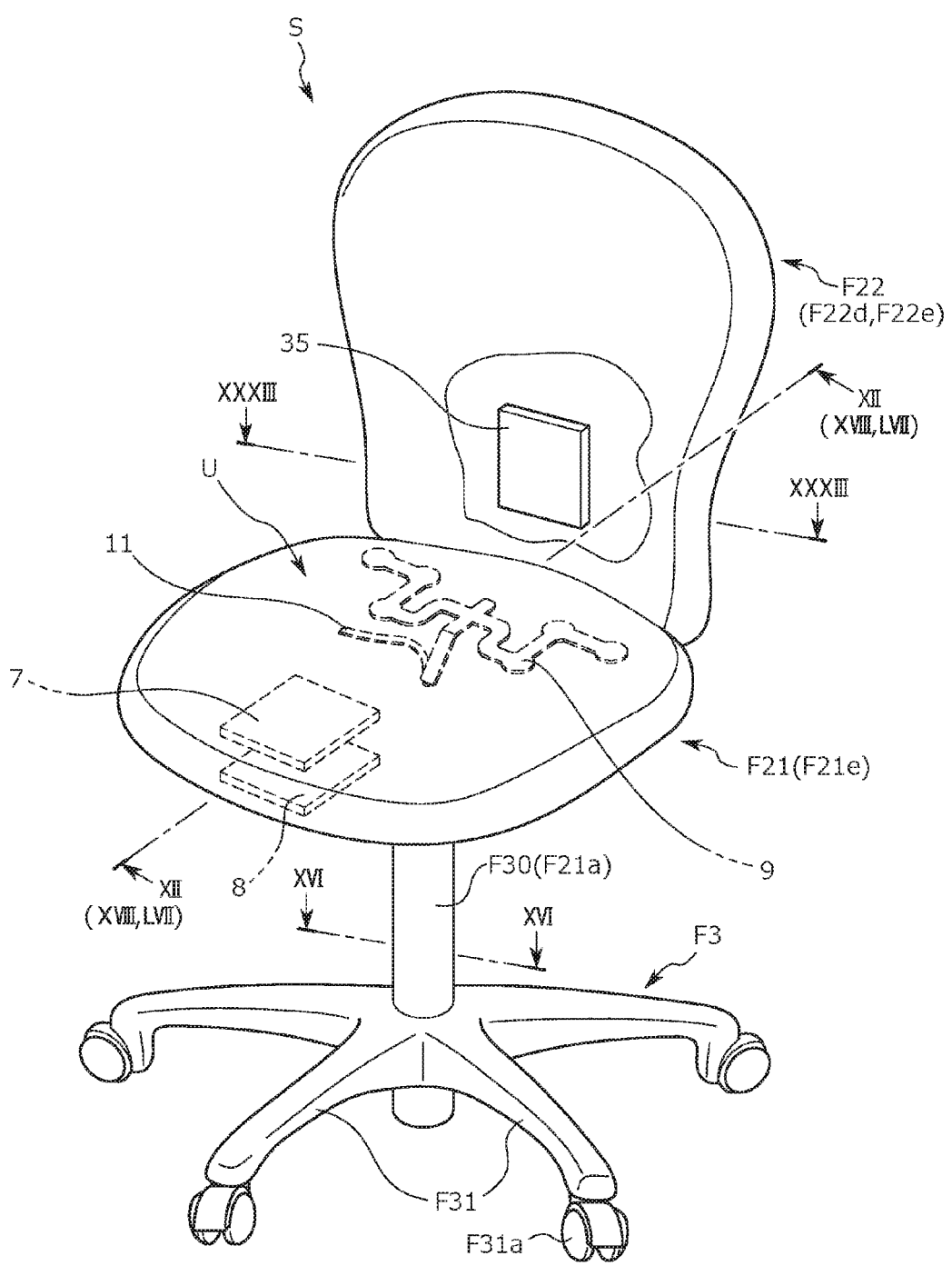
FIG. 1 is a perspective, schematic view of a legged chair according to a first embodiment of the present disclosure.
Figure 2:
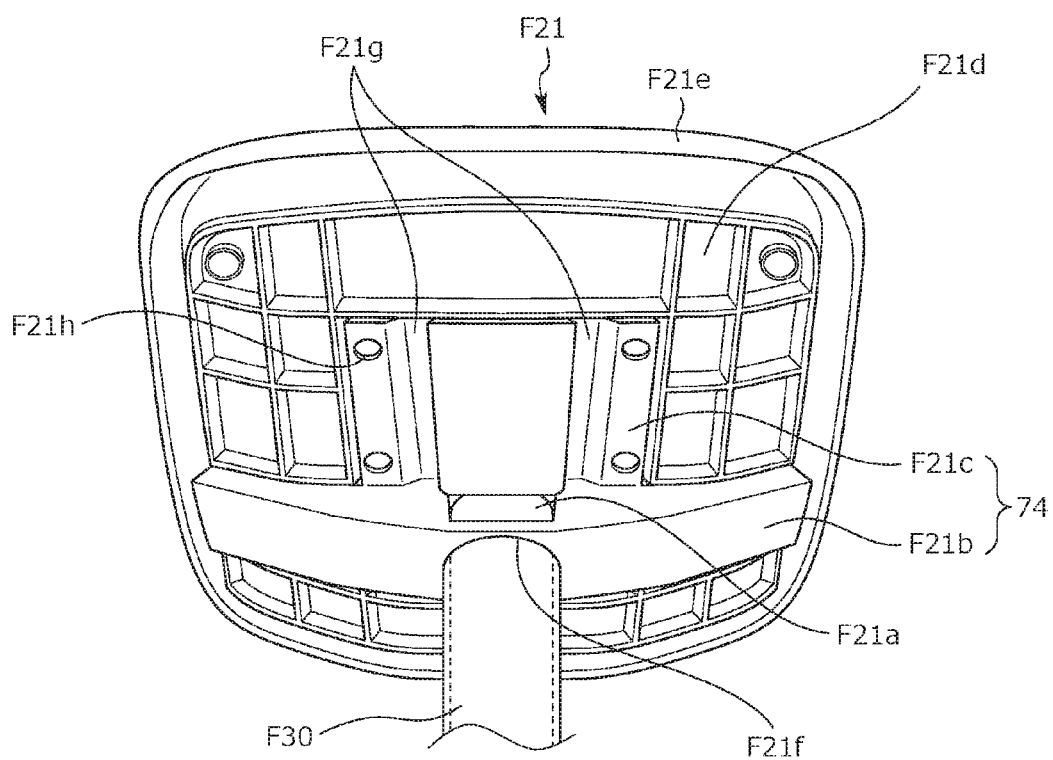
FIG. 2 is a lower side perspective view of the chair of FIG. 1 showing a lower surface of a cushion pan to which a holding cover is attached.

With reference to FIGS. 1 and 2, a first configuration of the legged chair S is described. FIG. 1 is an perspective schematic view of the legged chair S according to the first embodiment of the present disclosure. FIG. 2 is a lower side perspective view showing a lower surface of a cushion pan F21 to which the holding cover 71 is attached. The legged chair S is mainly formed from a leg member F3 serving as a leg portion, the cushion pan F21 serving as a seated portion attached to the leg member F3 to support a bottom portion of a seated person, a back pan F22 serving as a backrest portion coupled to the cushion pan F21, and an awakening device U.

The leg member F3 is formed from foot portions F31 branching into four portions, and a support barrel F30 formed continuously to the foot portions F31, and mainly made of a resin material. Casters F31a are respectively attached to four branching leading ends in the foot portions F31. The foot portions F31 branch into the four portions in the present embodiment. However, the foot portions may branch into three or more portions, and further, casters F31a may be omitted, in various embodiments.

The support barrel F30 is fixed to a center of the foot portions F31 and extends upward. A support post F21a described below passes through and is fixed inside the support barrel F30.

The cushion pan F21 corresponds to the seated portion according to the present disclosure, and as shown in FIG. 2, is formed from a metal seated portion frame 74, a resin plate F21d corresponding to a plate member attached to an upper portion of the seated portion frame 74, and a pad portion F21e with a skin attached to an upper portion of the resin plate F21d. The seated portion frame 74 is formed from a lower side frame portion F21b extending in the chair width direction, and an upper side frame portion F21c placed on the upper side of the lower side frame portion F21b, the upper side frame portion extending to cross the lower side frame portion F21b in a crisscross manner.

The lower side frame portion F21b extends in the chair width direction in a rear portion of the cushion pan F21, and a through hole F21f is formed in a center of the lower side frame portion F21b through which the support post F21a passes.

The upper side frame portion F21c corresponds to a metal frame according to the present disclosure, extends in the front to back direction of the chair in a center in the chair width direction, and is bonded to the lower side frame portion F21b by welding. In a center of the upper side frame portion F21c, the pipe shaped support post F21a extending perpendicularly is bonded to and integrated with a peripheral part by welding or the like. In the upper side frame portion F21c on the front side of the lower side frame portion F21b in the front to back direction of the chair, two recess portions F21g extending in the front to back direction are formed. By curving and making the recess portions F21g wave in the chair width direction, rigidity of the upper side frame portion F21c is enhanced.

In portions of the upper side frame portion F21c not overlapping with the lower side frame portion F21b, the portions being placed on both the outer sides of the recess portions F21g in the chair width direction, through-holes F21h, through which self-tapping screws N1 (refer to FIG. 3) corresponding to a fastening member (retainer) according to the present disclosure pass, are formed in such a manner that two through-holes are formed on the front side and other two are formed on the rear side. Specifically, the through-holes F21h are to let the self-tapping screws N1, which attach the upper frame portion F21c, the lower side frame portion F21b integrally bonded to the upper frame portion, and the holding cover 71 (described below) to the resin plate F21d, to pass through.

The pad portion F21e with the skin is formed from a pad made of a cushion material such as urethane, and a skin covering the pad, and a breathing sensor 9 (described below) is disposed between the skin and the pad.

The back pan F22 is coupled to a rear portion of the cushion pan F21 and formed to extend substantially vertically upward from the cushion pan F21. In a center inside the back pan F22, a vibration device 35 is attached as shown in FIG. 1. Although details are described below, this vibration device 35 is a constituent element of the awakening device U and provides a vibrating stimulation to the seated person in accordance with a control signal of the ECU 7.

Awakening Device

Now, the awakening device U is described. The awakening device U according to the present embodiment is mainly formed from the ECU 7, the battery 8, the breathing sensor 9, and the vibration device 35.

The vibration device 35 corresponds to a stimulation device according to the present disclosure and a drive unit that provides physical force to the seated person, the device including a so-called "vibration motor" which is a known unbalanced mass motor that receives the signal of the ECU 7 and starts vibration. At least part of the vibration device 35 is arranged at the same position as the breathing sensor 9 in the seat width direction.

The ECU 7 corresponds to a control device according to the present disclosure, and has a central function of comprehensively executing electrical control, which is in this example, a function of controlling drive of the vibration device 35 on the basis of a potential difference signal converted into a digital signal indicating an interval of breathing. The ECU 7 according to the present embodiment is an ECU of general-purpose hardware formed by including a CPU, a ROM, a RAM, and the like for arithmetic control.

The signal inputted to the ECU 7 is the potential difference signal converted into a digital signal by a signal processing circuit, and electric power for driving the vibration device 35 is outputted. The RAM is configured to temporarily store parameters including signals during the arithmetic control and signals to be inputted and outputted, and functions as a storage unit that stores the potential difference signal converted into a digital signal and other signals.

The ROM is configured to store programs to be executed by the CPU and parameters of predetermined values, and for example, a reference value setting unit that sets a predetermined reference value, a determination unit that determines an awake state on the basis of the reference value, a driving unit that drives the vibration device 35, and the like are recorded as the programs. This driving unit is configured to drive the vibration device 35 by supplying the electric power in accordance with a command of the CPU. A command signal of this CPU is formed by calculating a signal from the breathing sensor 9. That is, the CPU is configured to determine an awake state of the seated person on the basis of the signal sent from the breathing sensor 9, and in a case of determining that the seated person is not in an awake state, to transmit the signal for driving the vibration device 35. A known configuration may be used as the above configuration, and a heartbeat sensor may be used instead of the breathing sensor 9.

Figure 5:
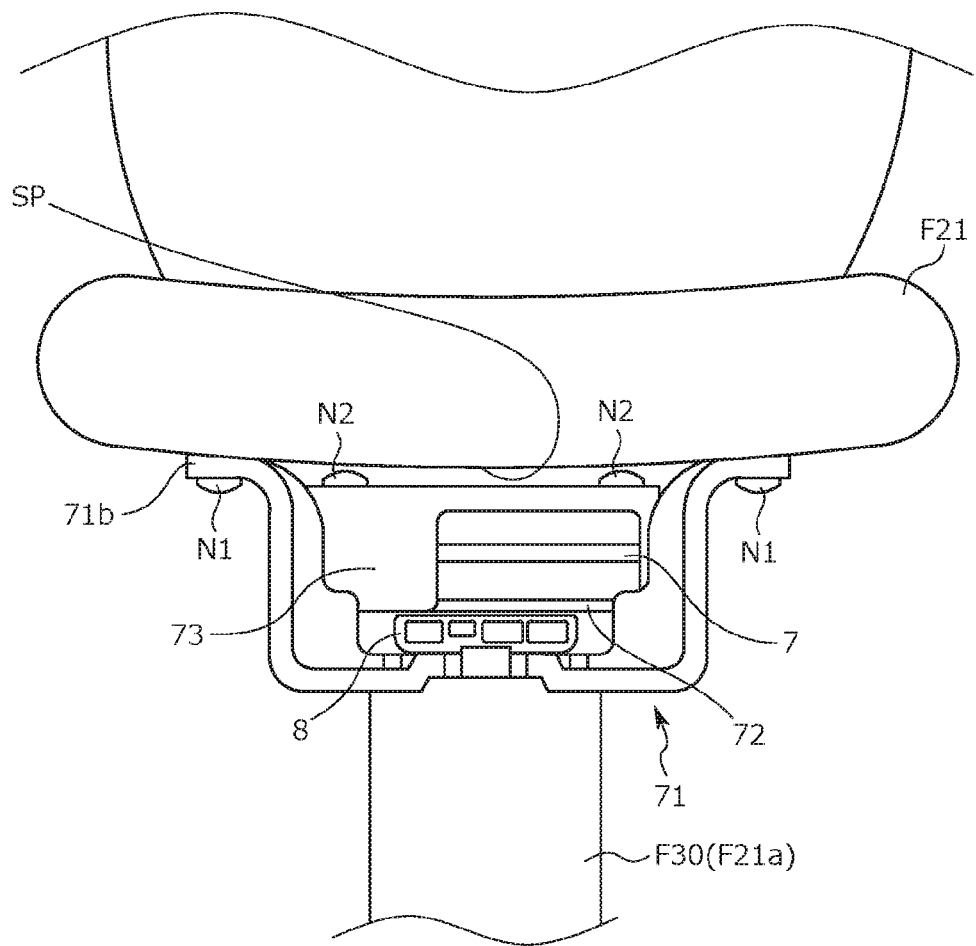
FIG. 5 is a schematic front view showing a state where the holding cover holding the control device and the battery is attached to the lower surface of the cushion pan.

The ECU 7 forming the awakening device U is attached to the cushion pad F21 on the lower surface side by the holding cover 71 (refer to FIG. 5). The vibration device 35 is attached to the vicinity of a center portion of a surface of the back pan F22, the surface facing the seated person as shown in FIG. 1.

The battery 8 is configured to supply the electric power to the ECU 7 and the vibration device 35, and is formed in a plate-like shape in the present embodiment. The battery 8 is attached on the lower side of a control device U1 described below to overlap with the control device, and a charging jack 80a (refer to FIG. 3) is formed on a front surface of the battery. The battery 8 is charged from a household power source by connecting a charging cable 67 from the charging jack 80a. A battery used for charging a smartphone or the like can also be used as the battery 8. The battery 8 is not limited to a rechargeable type battery but a replaceable type battery may be used.

Figure 3:
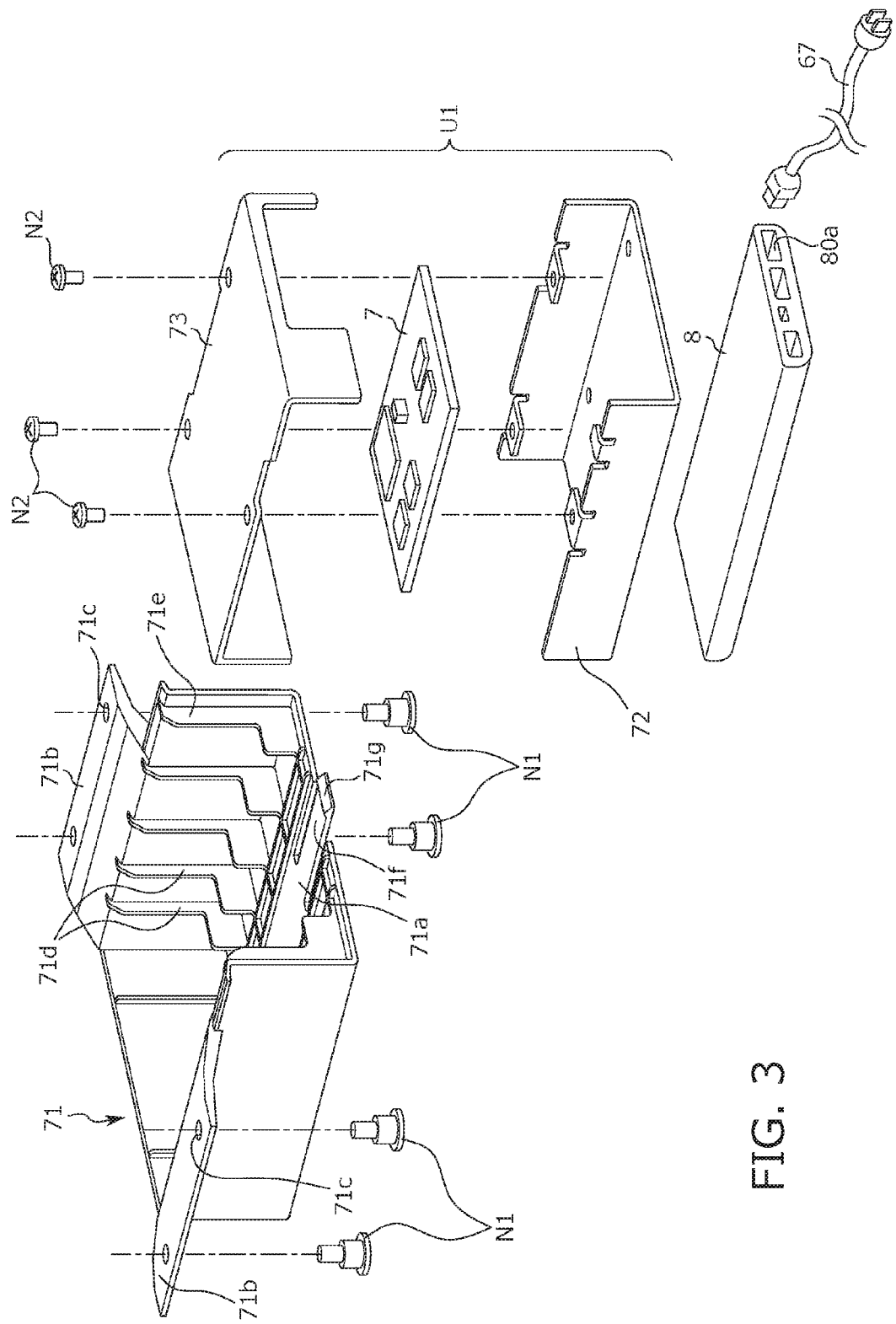
FIG. 3 is an exploded perspective view of a control device, a battery, the holding cover, and the like which are attached to the legged chair.
Figure 4:
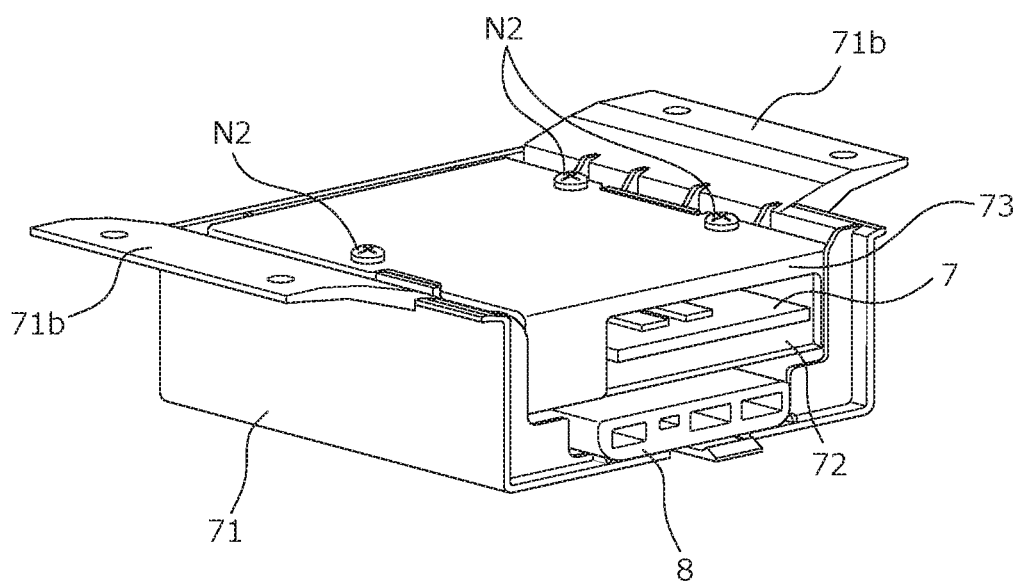
FIG. 4 is a perspective view showing the holding cover in a state of holding the control device and the battery.

Now, attachment of the ECU 7 and the battery 8 is described with reference to FIGS. 3 to 5. FIG. 3 is an exploded perspective view of the control device U1, the battery 8, the holding cover 71, and the like which are attached to the legged chair S. FIG. 4 is a perspective view showing the holding cover 71 in a state of holding the control device U1 and the battery 8. FIG. 5 is a schematic front view showing a state where the holding cover 71 holding the control device U1 and the battery 8 is attached to the lower surface of the cushion pan F21.

In the present embodiment, the ECU 7 is covered and supported by a base member 72 and a cover member 73, and together with the battery 8, held by the holding cover 71 and attached to the upper side frame portion F21c. A unit in which the ECU 7, the base member 72, and the cover member 73 are combined is also referred to as the control device U1.

As shown in FIG. 3, the holding cover 71 corresponds to a holding member and a resin portion according to the present disclosure. The holding cover includes a housing recess groove 71a opened on the upper side, the housing recess grove having a vertical section formed in a substantially U shape, and pan attachment portions 71b extending from both ends of an upper portion of the accommodation recess groove upward on the outer sides in a flange form, and is made of a resin material. The pan attachment portions 71b correspond to a projecting portion according to the present disclosure. The pan attachment portions 71b are also fastened portions where pan attachment holes 71c through which the self-tapping screws N1 pass are formed.

On inner walls of the holding cover 71 on both sides in the chair width direction, a plurality of L-shaped ribs 71d whose lower portions are formed to be long in the chair width direction are formed side by side in the front to back direction. The base member 72 described below is mounted on the ribs 71d. The lower portions of the pair of ribs 71d facing each other in the chair width direction are spaced with a gap longer than a length of the battery 8 in the chair width direction and formed to have height greater than a thickness in the up and down direction of the battery 8 in such a manner that that the battery 8 is housed between the lower portions. Further, ribs 71e in forefront of the holding cover 71 in the front to back direction of the chair are formed in such a manner that upper portions extend in the chair width direction more than the other ribs 71d. More specifically, a length between the pair of ribs 71e on both the sides in the chair width direction is set to be shorter than the length of the cover member 73 described below in the chair width direction. Therefore, forward movement of the cover member 73 covering the ECU 7 and being held by the holding cover 71 is restricted by the ribs 71e.

A cantilever piece 71f formed by cutting both side portions in the chair width direction from front ends to the rear side is formed on the front side of a bottom wall of the holding cover 71. A ridge-shaped locking projection 71g projecting upward and continuing in the chair width direction is formed in a front end of the cantilever piece 71f. This cantilever piece 71f is configured to detachably support the battery 8 described below from the holding cover 71. In detail, in a normal state where no external force is applied, the cantilever piece 71f holds the battery 8 by locking the locking projection 71g with the battery. When the battery 8 attached in the holding cover 71 is pulled forward, the battery 8 is abutted with the locking projection 71g and the cantilever piece 71f is bent, so that the battery 8 can be removed.

The base member 72 and the cover member 73 are frame bodies having vertical sections formed in a substantially U-shape. In detail, the base member 72 has a substantially U-shaped section and extends in the front to back direction of the chair longer than a length in the chair width direction. The cover member 73 has a substantially U-shaped section and extends in the chair width direction longer than length in the front to back direction of the chair. In particular, in order to expose a coupler (not shown) of the ECU 7 and connect the ECU 7 and the breathing sensor 9 or the vibration device 35 by the coupler, a square shaped cutout is formed on a front surface of the cover member 73. By superimposing these members in the up and down direction, a storage space for the ECU 7 is formed inside. The base member 72 and the cover member 73 are fastened by fixing screws N2 in a state where the ECU 7 is stored, laminated on the battery 8, and held in the housing recess groove 71a.

By mounting the base member 72 on the ribs 71d arranged to be spaced in the front to back direction, the air having heat generated from the ECU 7 passes between the ribs 71d via an open portion of the base member 72. Therefore, a heat radiation property of the ECU 7 can be improved. Further, by forming the lower portions of the ribs 71d to have the height greater than the thickness in the up and down direction of the battery 8, the holding cover 71 arranged on the ribs 71d and the battery 8 can be separated. By separately arranging the holding cover 71 and the battery 8 in such a way, heat between the holding cover and the battery is prevented from directly transmitting, so that a mutual temperature increase between the holding cover and the battery can be suppressed.

The battery 8 is provided on the lower side of the ECU 7 more distant from the cushion pan F21. By arranging the battery 8 in such a way, the seated person can more easily extend his/her hand to the battery 8 in a state where the seated person remains seated in the cushion pan F21. That is, the seated person can more easily attach and detach or charge the battery 8 in a state where the seated person remains seated in the cushion pan F21, so that the usability becomes favorable. By arranging the ECU 7 to be not frequently touched except for maintenance on the upper side of the battery 8, a "dead" space of the legged chair S can be effectively utilized.

In such a way, a complex of the base member 72 and the cover member 73 is stored together with the battery 8 inside the groove of the holding cover 71 in a state where the ECU 7 is stored in the storage space. In this state, the complex is attached to the cushion pan F21 by the self-tapping screws N1 from the pan attachment holes 71c (four pan attachment holes in this example) formed in the pan attachment portions 71b (two pan attachment portions in this example). In detail, the self-tapping screws N1 pass through the pan attachment holes 71c and the through-holes F21h of the upper side frame portion F21c and are self-tappingly fixed to the resin plate F21d. That is, the holding cover 71 is fixed by the self-tapping screws N1 in a state where the holding cover is abutted with the upper side frame portion F21c having the recess portion F21g with high rigidity due to integration with the support post F21a. Thus, attachment strength can be enhanced.

Further, the self-tapping screws N1 are self-tappingly fixed in a state where lower surfaces of screw heads are abutted with the resin pan attachment portions 71b. Therefore, fastening strength by the self-tapping screws N1 is enhanced more than a case where the lower surfaces are abutted with metal surfaces. Reaction force acting on the lower surfaces of the screw heads is enhanced more than a case where the holding cover 71 is not attached for thickness of the pan attachment portions 71b and the upper side frame portion F21c is directly attached to the resin plate F21d. Thereby, looseness of the self-tapping screws N1 can be made less likely to occur. The cover member 73 is preferably made of a resin material. However, in embodiments focusing only on obtainment of the above result, only portions to be fastened by the self-tapping screws N1 may be made of a resin material.

The holding cover 71 holding the control device U1 is attached on the lower side of a portion of the upper side frame portion F21c and does not overlap with the lower side frame portion F21b in the up and down direction. By attaching the holding cover 71 to the upper side frame portion F21c and arranging the control device U1 in such a way, a space of the legged chair S can be more effectively utilized. That is, the control device U1 is suppressed from projecting from the cushion pan F21, so that the control device U1 can be prevented from disturbing legs or the like of the seated person. Further, by unitizing the holding cover 71 while holding the battery 8 and the control device U1, these can be more easily attached to the cushion pan F21.

As shown in FIG. 5, in a state where the holding cover 71 is attached to the upper side frame portion F21c, the pan attachment portions 71b abutted with the upper side frame portion F21c project on the upper side of the cover member 73. Thus, a space SP is formed in a gap between the cover member 73 and the upper side frame portion F21c. By distributing the air through the formed space SP in such a way, a heat radiation effect against heat generation from the ECU 7 and the battery 8 can be enhanced. Further, a harness (not shown) connected to at least any of the breathing sensor 9, the vibration device 35, the ECU 7, and the battery 8 can also be disposed in part of the space SP.

For example, an extension cable (not shown) including male-female terminals may be connected to the charging jack 80a of the battery 8 held by the holding cover 71, and a charging port may be disposed in a leading end of the foot portion F31 on the upper side of the caster F31a. By doing so, since the seated person can more easily visually confirm the leading end of the foot portion F31 than the vicinity of the lower surface of the cushion pan F21, the charging cable 67 of the battery 8 can be more easily connected. In this case, in particular, the extension cable (not shown) is preferably disposed inside the support barrel F30 and the foot portion F31. Although not shown, a light emitting diode (LED) for displaying power distribution or the like may be installed.

Second Embodiment

A seat according to a second embodiment of the present disclosure is a seat capable of suppressing disconnection of conductor wires provided in an electrode portion which forms a heartbeat sensor and favorably detecting cardiac signals. In recent years, in order to promptly issue notification in a case where a physical condition of a passenger of a vehicle becomes abnormal, a configuration in which abnormality of the physical condition is determined by detecting various parameters showing a state of the passenger is proposed.

For example, JP A 2009-106673 describes a vehicle seat including a heartbeat sensor (described as a cardiac sensor in the same patent literature) which is formed by a heartbeat sensor electrode arranged in a seatback (described as a cardiac sensor electrode in the same patent literature), and an ground electrode arranged in a seat cushion. This heartbeat sensor detects potential signals from a heart of the seated person as parameters showing the state of the passenger to monitor a health state.

JP A 2007-301175 describes an invention relating to a biological signal collection device in which planar electrode groups are provided at positions to be abutted with a back surface, a waist portion, a bottom portion, and a thigh portion of a seated person, and biological signals are detected from signals of differences between potential signals detected from the planar electrode groups. More specifically, the potential signals are potential signals emitted from the vicinity of a heart or a lung. On the basis of this, by making one of the plurality of planar electrodes acquire neutral potential of an amplifier, the biological signal collection device suppresses signal noises and collects biological signals such as heartbeats and breathing of the seated person.

At the time of driving a vehicle, the vehicle is shaken and centrifugal force acts at the time of traveling in a curve. Thus, a contact portion between the seated person and the seat is not steady. When a build of the seated person is different, points where the biological signals can be favorably detected are different. Therefore, the biological signals are not easily stably detected from the seated person in the vehicle seat.

In particular, this problem is apparent in a case where the biological signals are detected by a sensor provided in the seatback. This is because a contact portion between the seatback and the seated person is changed by the seated person swinging front to back and right to left by shake of the vehicle, and also greatly differentiated by a difference of the build of the seated person. In the heartbeat sensor described in JP A 2009-106673, the heartbeat sensor electrode is provided only in the seatback. Thus, from the above reason, the cardiac signals are not easily favorably detected.

In the planar electrode groups described in JP A 2007-301175, arbitrary one of the planar electrodes serves as the ground electrode, the potential signals are acquired from the other two, and the potential signals relate to heartbeats and breathing. Thus, the potential signals can be more stably acquired than the heartbeat sensor described in JP A 2009-106673. However, weight of the seated person is greatly applied to the planar electrode provided in the seat cushion. Thus, conductor wires disposed in the planar electrode may sometimes be disconnected.

A vehicle seat Sa according to the second embodiment of the present disclosure for solving these problems is specifically described with reference to the attached drawings. In the following description, the forward direction of a vehicle is the front direction, the opposite direction is the back direction, and the height direction of the vehicle is the up and down direction. In the following description, the same names and the same reference signs is used for the same configurations as the other embodiments, and description thereof is omitted to make different points clear.

Figure 6:
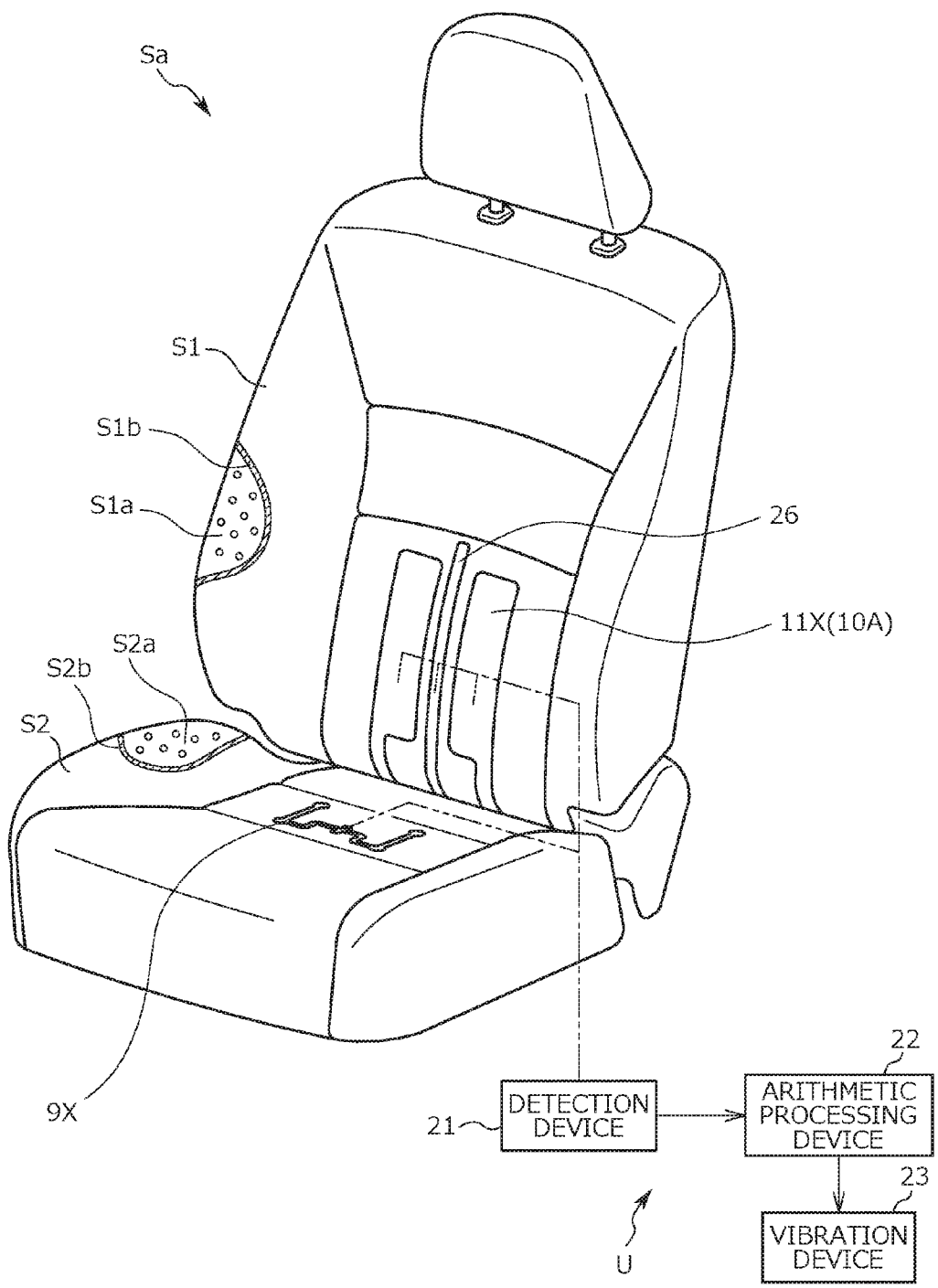
FIG. 6 is a perspective, schematic view showing the entire configuration of a vehicle seat according to a second embodiment of the present disclosure.
Figure 7A:
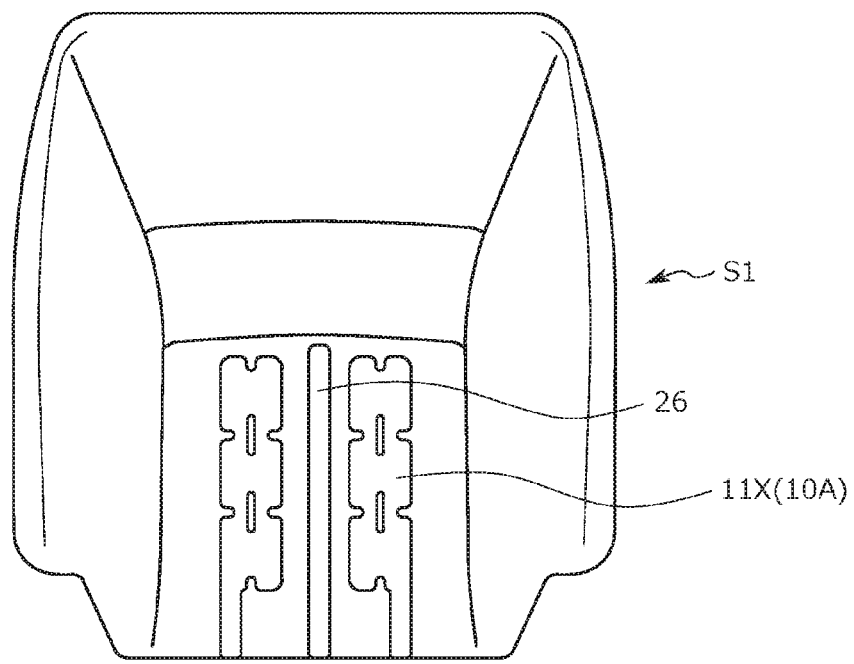
FIG. 7A is a schematic front view showing a seatback including electrode portions which form a heartbeat sensor.
Figure 7B:
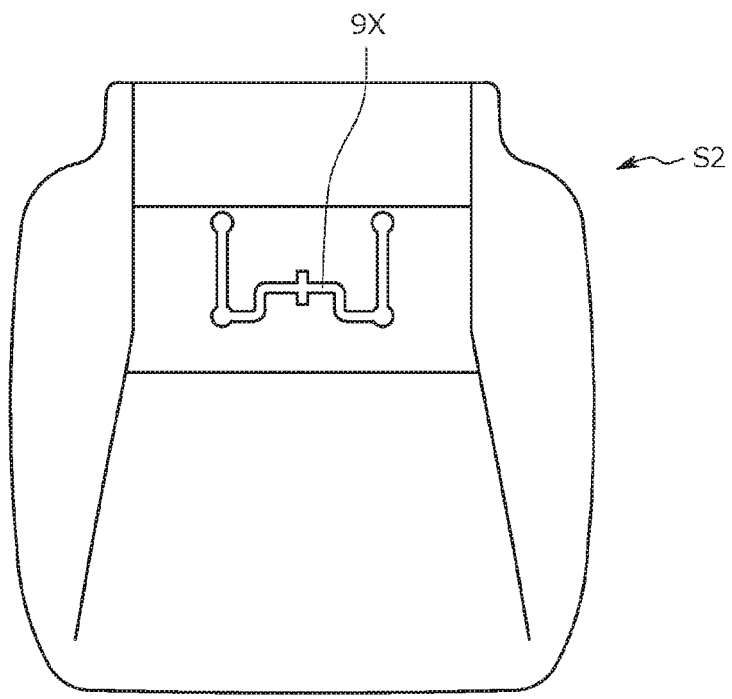
FIG. 7B is a schematic top view showing a seat cushion including a breathing sensor.

The configuration of the vehicle seat Sa is described with reference to FIGS. 6, 7A, and 7B. FIG. 6 is a perspective view showing the entire configuration of the vehicle seat Sa according to the second embodiment of the present disclosure. FIG. 7A is a schematic front view showing a seatback S1 including electrode portions 11X and a conductive cloth 26 which form a heartbeat sensor 10A. FIG. 7B is a schematic top view showing a seat cushion S2 including a breathing sensor 9X. In FIGS. 6, 7A, and 7B, in order to make arrangement positions of the breathing sensor 9X, the heartbeat sensor 10A, and the like easily understandable, some of portions forming these (such as conductor wires 11d) are omitted. As shown in FIG. 6, the vehicle seat Sa includes the seat cushion S2 which is a portion in which the seated person is seated, the seatback S1 which is a portion rotatably attached to a rear portion of the seat cushion S2, serving as a backrest for the seated person, and an awakening device U that maintains an awake state of the seated person.

The seatback S1 includes a urethane cushion pad S1a, and a skin material S1b provided to cover this cushion pad. As shown in FIGS. 6 and 7A, the electrode portions 11X and the conductive cloth 26 are disposed at positions facing the waist portion of the seated person in the seatback S1.

The seat cushion S2 includes a urethane cushion pad S2a, and a skin material S2b provided to cover this cushion pad. As shown in FIGS. 6 and 7B, the breathing sensor 9X is disposed at a position facing the bottom portion of the seated person in the seat cushion S2.

FIGS. 6, 7A, 7B and the like show a configuration in which the breathing sensor 9X, the electrode portions 11X, and the conductive cloth 26 are arranged on a seating surface. These may be arranged between the cushion pad S1a and the skin material S1b, or between the cushion pad S2a and the skin material S2b. By doing so, an outer appearance can be favorable. The breathing sensor 9X, the heartbeat sensor 10A, a detection device 21, an arithmetic processing device 22, and a vibration device 23 form the awakening device U, and details are described below.

Configuration of Awakening Device

Figure 8:
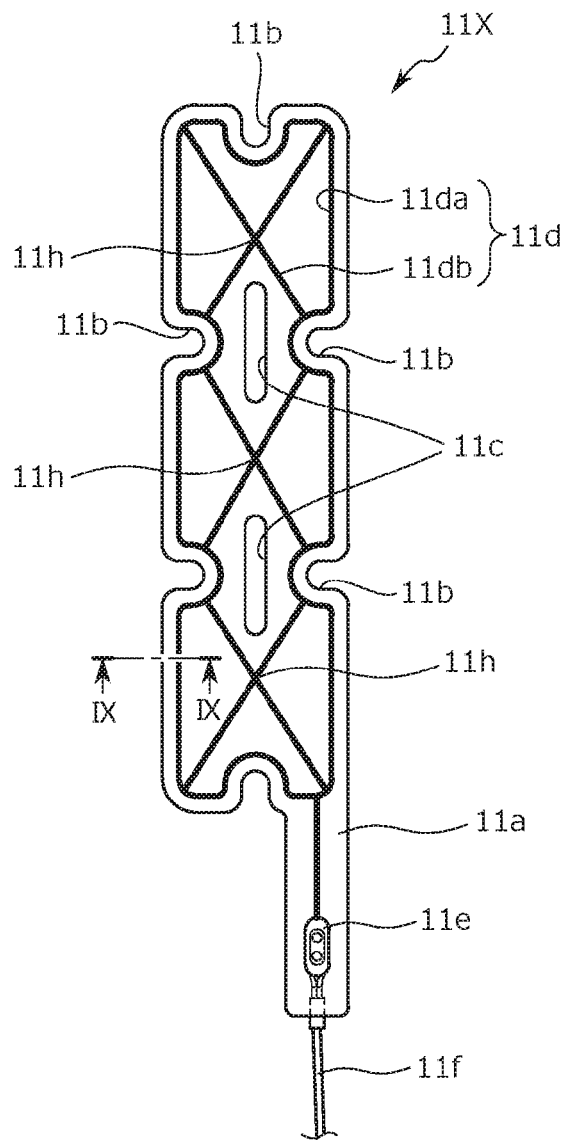
FIG. 8 is an enlarged view showing the electrode portion.
Figure 9:
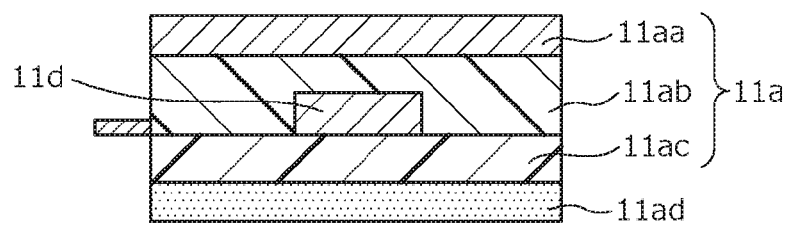
FIG. 9 is a sectional view taken along the line IX-IX of FIG. 8, the view showing part of the electrode portion.
Figure 10A:
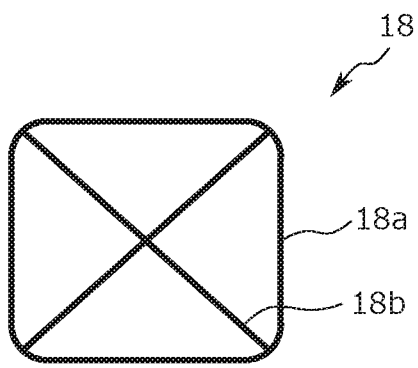
FIG. 10A is a conceptual view showing a basic pattern of conductor wires.
Figure 10B:
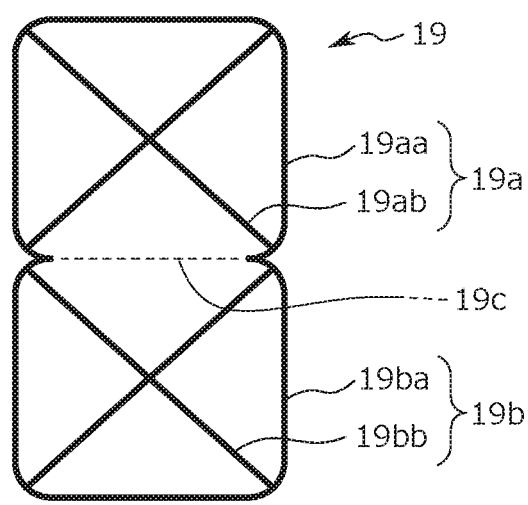
FIG. 10B is a conceptual view showing a coupled pattern in which the basic patterns are combined.

The awakening device U is described with reference to FIGS. 8 to 10 in addition to FIGS. 6 and 7. FIG. 8 is an enlarged view showing the electrode portion 11X. FIG. 9 is a sectional view taken along the line IX-IX of FIG. 8, the view showing part of the electrode portion 11X. FIG. 10A is a concept view showing a basic pattern 18 of a square shape. FIG. 10B is a concept view showing a coupled pattern 19 in which square portions 19a, 19b are combined.

The awakening device U is a device for mainly maintaining an awake state of the seated person serving as a driver, and is formed from the breathing sensor 9X, the heartbeat sensor 10A, the detection device 21, the arithmetic processing device 22, and the vibration device 23 as described above.

The breathing sensor 9X is formed by a known pressure sensor, to detect a pressure signal which is a signal indicating a consciousness level to be changed in accordance with breathing of the seated person. For example, the breathing sensor 9X is formed by a piezo-sensor type pressure sensor, a semiconductor piezoresistance type pressure sensor, a strain gauge type pressure sensor, an electrostatic capacitance type pressure sensor, a silicon resonant type pressure sensor, or the like. The breathing sensor 9X in the example of the present embodiment is formed in a substantially M-shape and disposed in the seat cushion S2 in such a manner that an open portion faces the rear side.

The heartbeat sensor 10A is configured to detect action potential signals generated in accordance with pulsation of a heart of the seated person, or cardiac signals which are signals indicating a consciousness level, and is formed from the pair of electrode portions 11X provided in the seat width direction. The band shaped conductive cloth 26 having smaller width than the electrode portion 11X and being long in the height direction is disposed between the pair of electrode portions 11X in the seat width direction. The conductive cloth 26 is a cloth having conductivity with part containing a metal material, connected to a body of a vehicle body to function as a grounding portion and acquire a potential serving as a reference potential at the time of removing an offset signal included in the signal of the electrode portions 11X.

Electrode Portion

As shown in FIG. 8, the electrode portion 11X is formed in an oblong sheet shape whose longer side runs in the substantially up and down direction, and has an area of about 100 cm$^2$, and electrostatic capacitance of about 3,000 pF. The electrode portion 11X is mainly formed from a conductive sheet 11a, and applied onto the cushion pad S1a of the seatback S1 by a double-stick tape 11ad applied to a back surface of the conductive sheet 11a.

As shown in FIG. 9, the conductive sheet 11a has a laminating structure formed from a first resin film 11ac, the conductor wires 11d attached onto the first resin film 11ac and made of silver, a second resin film 11ab applied to the first resin film 11ac to sandwich the conductor wires 11d, and an ink 11aa applied to the second resin film 11ab. In the present embodiment, the first resin film 11ac is made of PET (Polyethylene Terephthalate).

Part of the conductive sheet 11a including the conductor wires 11d comes out of the above oblong shape and extends downward in a lower portion of the electrode portion 11X on the outer side in the seat width direction, and an end portion of the part is coupled to a cable 11f by a terminal coupling member 11e.

The terminal coupling member 11e is formed by a metal piece having conductivity. The end portion of the conductor wires 11d is fastened to one end portion of the terminal coupling member, and an end portion of the cable 11f is fastened to the other end portion. The cable 11f is connected to the detection device 21 described below. The second resin film 11ab is made of carbon resin. The ink 11aa is a metal ink containing BaTiO$_3$ (barium titanate).

A total of six slit portions 11b are formed in the conductive sheet 11a in such a manner that one slit portion is formed in an intermediate portion of each of upper and lower edges on the short side in the present embodiment, two slit portions are paired in each of right and left edges on the long side, and two pairs of the slit portions are spaced from each other in the up and down direction. The slit portion 11b is formed in a half long hole shape having an arc end edge. Each of cutout portions 11c formed in a long hole shape extending in the up and down direction is formed between the slit portions 11b in the right and left direction, two of the slit portions being formed in the right edge and the other two being formed in the left edge of the conductive sheet 11a, and between each two of three crossing portions 11h placed above or below crossing conductor wires 11db described below. The cutout portion 11c is formed to be longer in the up and down direction than the slit portion 11b and formed in a long hole shape having both arc end edges. In such a way, the cutout portion 11c is formed between each two of the three crossing portions 11h. Thereby, a bending load applied to the crossing portions 11h can be reduced by the cutout portions 11c, so that disconnection of the conductor wires 11d at the crossing portions 11h can be suppressed. By the two pairs of slit portions 11b paired in the short direction and provided in the up and down direction, a bending load in the seat width direction (the right and left direction, the short direction) can be released. Thus, while forming the electrode portion 11X long in the seat width direction, disconnection of the conductor wires 11d can be suppressed. By the slit portions 11b each of which is provided in the intermediate portion of the upper or lower edge on the short side, the short side of the electrode portion 11X can be elongated. Thus, while forming a detection area of the electrode portion 11X large, an influence of the bending load is suppressed, so that generation of disconnection of the conductor wires 11d can be suppressed.

The conductor wires 11d are formed from a basic conductor wire 11da disposed along an outer circumference of the electrode portion 11X, and the crossing conductor wires 11db extending to cross on the inner side of the basic conductor wire 11da. In detail, the crossing conductor wires 11db are extended throughout to couple four corner portions in the basic conductor wire 11da and portions along the slit portions 11b formed on the outer circumference extending in the seat up and down direction (longitudinal direction) of the electrode portion 11X. In particular, two crossing conductor wires 11db extend toward the basic conductor wire 11da along the slit portions 11b formed on both the sides in the seat width direction (short direction), and the crossing conductor wires 11db are disposed in such a manner that these conductor wires are connected at different positions.

As described above, the slit portions 11b and the cutout portions 11c are formed. Thus, in accordance with bending of the skin material S1b, stress applied to the electrode portion 11X is divided by the slit portions 11b and the cutout portions 11c. By dividing the stress in such a way, the electrode portion 11X is suppressed from locally bending at a sharp angle, so that generation of wrinkles in the electrode portion 11X can be prevented. By the slit portions 11b and the cutout portions 11c, in a case where the skin material S1b is bent, the electrode portion 11X is bent along the skin material S1b without generating wrinkles. Thus, concentration of the stress on part of the conductor wires 11d can be restricted, so that disconnection of the conductor wires 11d can be suppressed.

The conductor wires 11d are extended throughout in a planar form to cross in the conductive sheet 11a. At a crossing point thereof, two or less conductor wires 11d cross each other but not three or more conductor wires 11d cross each other. In such a way, the number of the conductor wires 11d crossing at the crossing point of the conductor wires 11d is suppressed to be two or less. Thereby, while the conductor wires 11d can be arranged in the conductive sheet 11a in a planar form, an influence at the time of disconnection can be limited. In other words, a plurality of three or more conductor wires do not cross each other at one point but part of the conductor wires and the other parts of the conductor wires cross each other at distant positions. Thus, collective disconnection of a plurality of conductor wires can be prevented, and the cardiac signals can be favorably detected.

Wiring Pattern

A wiring pattern of the above conductor wires 11*d* is described with reference to FIG. 10. The basic pattern 18 shown in FIG. 10A is formed from a frame-shaped (square-shaped in this example) basic conductor wire 18*a* formed along an outer circumference of each electrode portion, and crossing conductor wires 18*b* extending from four corners of the basic conductor wire 18*a* to the facing corners and crossing each other. The crossing conductor wires 18*b* extend from the four corners of the highly rigid basic conductor wire 18*a* unsusceptible to an influence of the bending load. Thus, generation of a disconnected state is suppressed. In a case where slits are formed in the conductive sheet, the basic pattern 18 is formed along the inner side of edges of the slits.

The coupled pattern 19 shown in FIG. 10B has a shape in which two basic patterns 18 are connected adjacently to each other. Specifically, the square portions 19*a*, 19*b* are coupled, and the basic conductor wire 18*a* (basic conductor wires 19*aa*, 19*ba* described below) is not disposed in a coupled portion 19*c*. The square portion 19*a* is formed from the basic conductor wire 19*aa* provided in portions other than the side adjacent to the square portion 19*b* among an outer circumference of a square shape, and crossing conductor wires 19*ab* extending to cross inside the basic conductor wire 19*aa*. Similarly, the square portion 19*b* is formed from the basic conductor wire 19*ba* provided in portions other than the side adjacent to the square portion 19*a* among an outer circumference of a square shape, and crossing conductor wires 19*bb* extending to cross inside the basic conductor wire 19*ba*. That is, as shown in the coupled pattern 19, each electrode portion is formed in such a manner that a plurality of basic patterns 18 are provided side by side and no basic conductor wire 18*a* is disposed in the coupled portion 19*c*. By forming in such a way, the conductor wires can be arranged throughout the electrode portion, and by providing no conductor wire in the coupled portion 19*c*, expensive silver serving as a material of the conductor wires can be saved.

Other Configurations

The detection device 21 shown in FIG. 6 is configured to detect the biological signals relating to the cardiac signals from the potential signals detected by the electrode portions 11X and the reference potential supplied from the conductive cloth 26, and to detect the biological signals relating to breathing signals from pressure signals obtained from the breathing sensor 9X. The detection device is formed from a ferrite core, a common mode noise filter, an operational amplifier, and the like (not shown). The ferrite core and the common mode noise filter are attached to a DC power source line, and have a function of removing conductive noises.

The arithmetic processing device 22 applies the breathing signals and the cardiac signals relating to the biological signals detected by the detection device 21 to predetermined reference values for the respective signals, and in a case of determining that an awake state (conscious level) of the seated person is decreased, sends a drive signal to the vibration device 23.

The vibration device 23 is a device including a so-called "vibration motor" which is a known unbalanced mass motor as well as the vibration device 35, drives the vibration motor for a predetermined period of time in accordance with the drive signal received from the arithmetic processing device 22 and provides a vibrating stimulation to the seated person. For example, the vibration device 23 is provided inside the seatback S1.

Since the heartbeat sensor 10A of the vehicle seat Sa according to the present embodiment compares the potential signals detected from the pair of electrode portions 11X provided in the seatback S1 near the heart, a probability that electric noises other than the cardiac signals are added can be lowered. The electrode portions 11X of the heartbeat sensor 10A may be provided in the seat cushion S2.

Further, the breathing sensor 9X provided in a rear portion of the seat cushion S2 is disposed in a portion facing the bottom portion of the seated person. Thus, contact between the breathing sensor 9X and the seated person is easily maintained, so that the breathing signals can be stably detected. By the arithmetic processing device 22 using the signals detected from the breathing sensor 9X and the heartbeat sensor 10A together and determining an awake state of the seated person, determination precision can be more enhanced.

In the above embodiment, the vibration device is described as an example of a portion forming the awakening device. However, the present disclosure is not limited to such a configuration. For example, the seated person or other passengers may be notified with video, light, or sound by using a display, a light, a buzzer, or the like provided inside the vehicle, so that an awake state of the seated person may be maintained directly or indirectly.

Further, the vehicle seat is described as an example in the above embodiment. However, the present disclosure is not limited to such a configuration but can be applied to a seat used for other purposes such as industrial devices, airplanes, vessels, or theaters.

Third Embodiment

A chair according to a third embodiment of the present disclosure is a chair to which an awakening device is attached by effectively utilizing a space of the chair.

In the above legged chair described in JP A 2006-503599, the control unit is simply attached to a lower surface of a seated portion. Thus, a projecting amount of the control unit from the lower surface of the seated portion is great. Therefore, legs or the like of the seated person may sometimes hit the control unit and the seated person may feel uncomfortable. In a case where the control unit and an operation lever that adjusts height of the chair or the like are placed on the same side in the chair width direction, and when the operation lever is operated, a hand may sometimes hit the control unit and the seated person may feel uncomfortable.

When heat generated from the battery and the control device is kept in the control unit, operation speed of the control device may sometimes be decreased. Further, a space for arrangement of the harness attached to the control unit is not easily ensured.

Since the control unit is provided in a lower portion of the chair, the seated person does not easily perform the task of replacing the battery forming the control unit or charging the battery in a seated state. In particular, in the legged chair with casters, when a charging cable or the like is attached to the legged chair, the charging cable or the like may sometimes get entangled with the chair, and attachment of the charging cable is a problem.

A legged chair S according to the third embodiment of the present disclosure for solving these problems, and an ECU 7, a battery 8, and a holding cover 71X holding these provided in the legged chair S is described with reference to the drawings.

Figure 11:
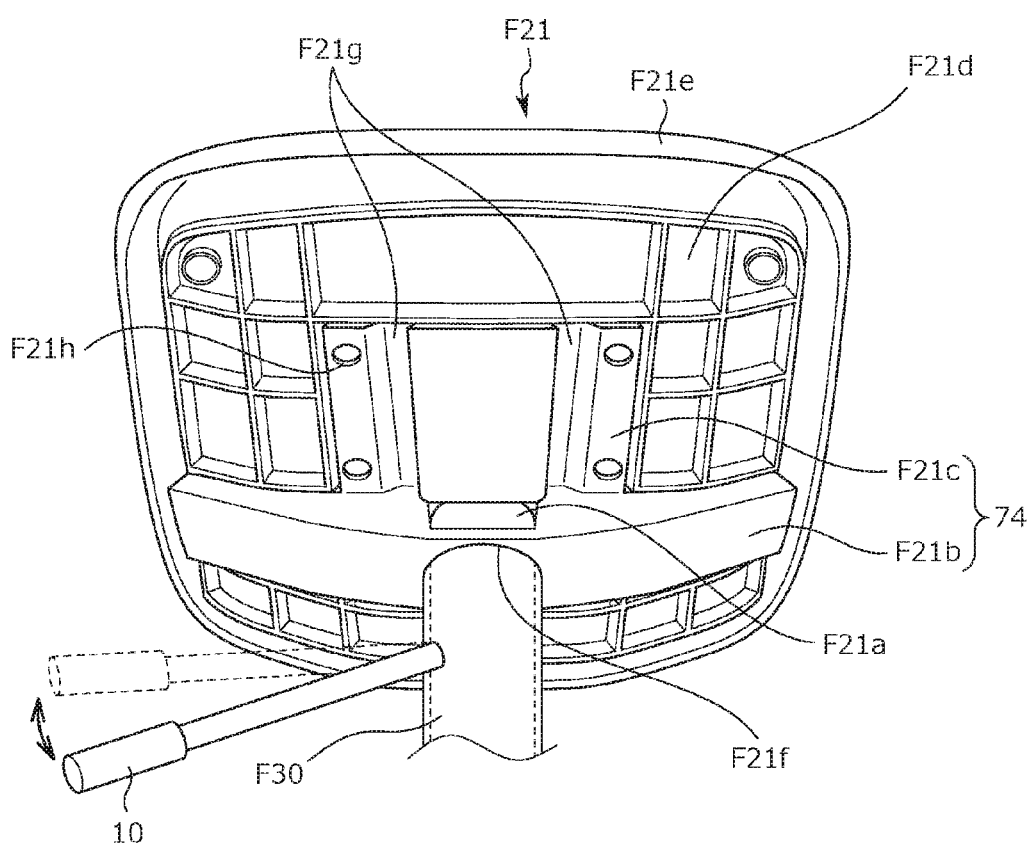
FIG. 11 is a lower side perspective view showing a lower surface of a cushion pan to which a holding cover is attached in a legged chair according to a third embodiment of the present disclosure.
Figure 12:
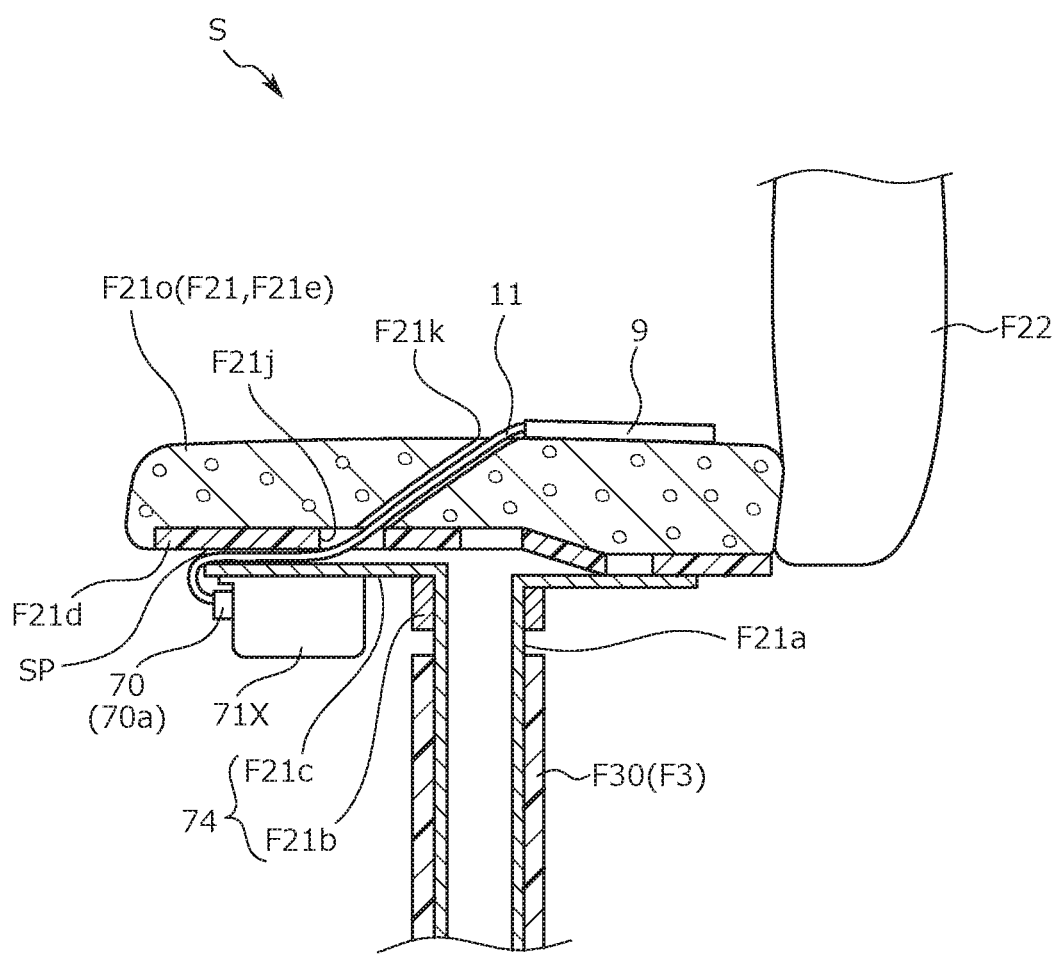
FIG. 12 is a schematic sectional view taken along the line XII-XII of FIG. 1.

With reference to FIGS. 11 and 12 in addition to FIG. 1, a main configuration of the legged chair S is described. FIG. 11 is a lower side perspective view showing a lower surface of a cushion pan F21 to which the holding cover 71X is attached. FIG. 12 is a schematic sectional view taken along the line XII-XII of FIG. 1.

As shown in FIG. 11, unlike the first embodiment, an operation lever 10 having a movable region in the up and down direction is disposed on one side in the chair width direction in a support barrel F30. The operation lever 10 according to the present embodiment corresponds to an operation unit according to the present disclosure, and is configured to adjust a height of the cushion pan F21. The operation lever 10 is not limited to the operation lever having the function of adjusting height but may be, for example, an operation lever capable of changing an angle of a back pan F22 with respect to the cushion pan F21 or an operation lever having a function of adjusting repulsion strength against the seated person leaning on the back pan F22.

As shown in FIG. 12, a resin plate F21d according to the present embodiment has a plurality of boreholes F21j formed in the up and down direction for radiating heat transmitted from the bottom portion of the seated person. The boreholes F21j have a heat radiation function, and also have a function of inserting a harness 11 described below through the resin plate F21d in the up and down direction.

Figure 18:
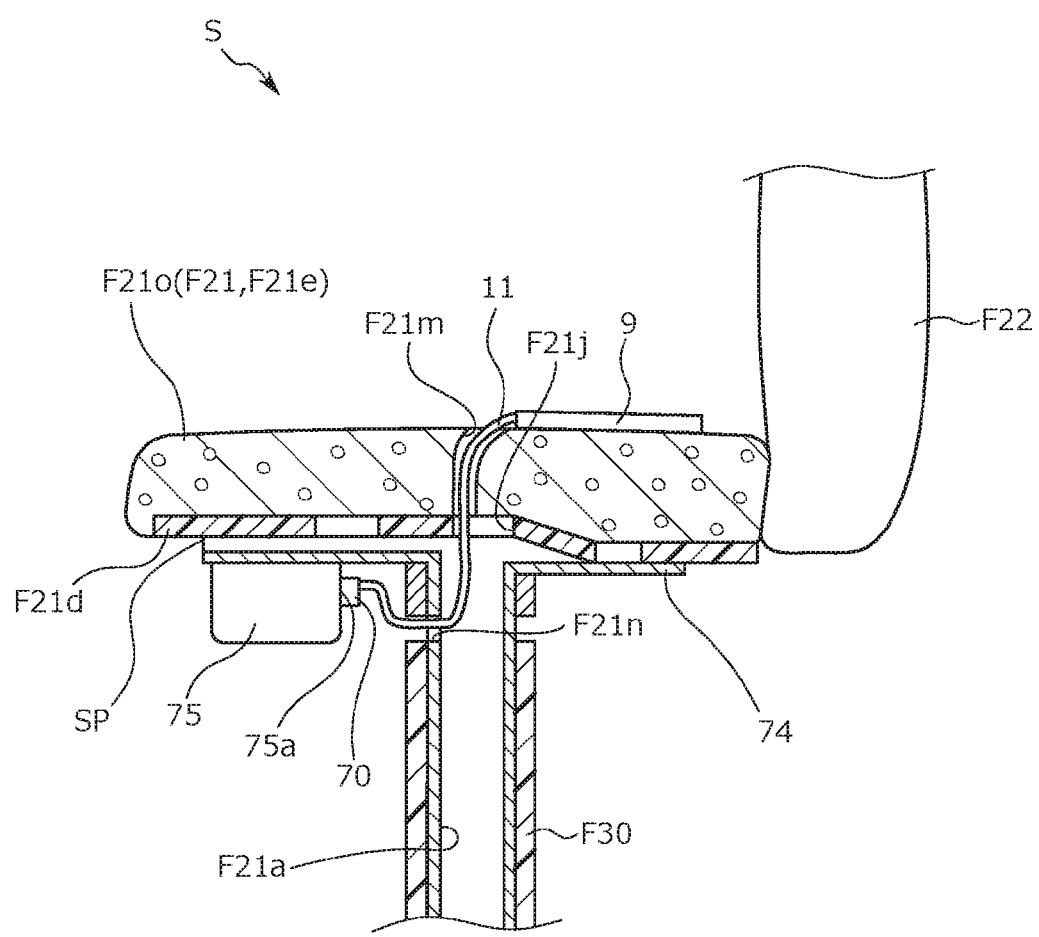
FIG. 18 is a schematic sectional view taken along the line XVIII-XVIII of FIG. 1, the view showing an example in which a harness is connected on the rear side of the control device.

A pad portion F21e with a skin is formed from a pad portion F21o made of a cushion material such as urethane, and a skin covering the pad portion F21o, and a breathing sensor 9 described below is disposed between the skin and the pad portion F21o. In FIG. 12 and FIG. 18 and the like described below, the pad portion F21e with the skin is shown while omitting the skin. As shown in FIG. 12, a guide hole F21k that guides the harness 11 to the ECU 7 described below is formed in the pad portion F21o. The guide hole F21k is formed to extend obliquely forward and downward to the vicinity of the ECU 7 from the front side of the breathing sensor 9 provided on an upper surface of the pad portion F21o. In such a way, the inclined guide hole F21k extends through the side of the breathing sensor 9 and the side of the ECU 7 in the pad portion F21o. Thereby, length of the harness 11 connected to the breathing sensor 9 and the ECU 7 through the guide hole F21k can be shortened. Therefore, the harness 11 can be more easily attached and material cost can be reduced.

In the present embodiment, as shown in FIG. 12, the harness 11 connected to the breathing sensor 9, a harness (not shown) connected to a vibration device 35, and a cable (not shown) connected to the battery 8 are connected to a connection port 70a of a connector 70 provided in the ECU 7.

Figure 13:
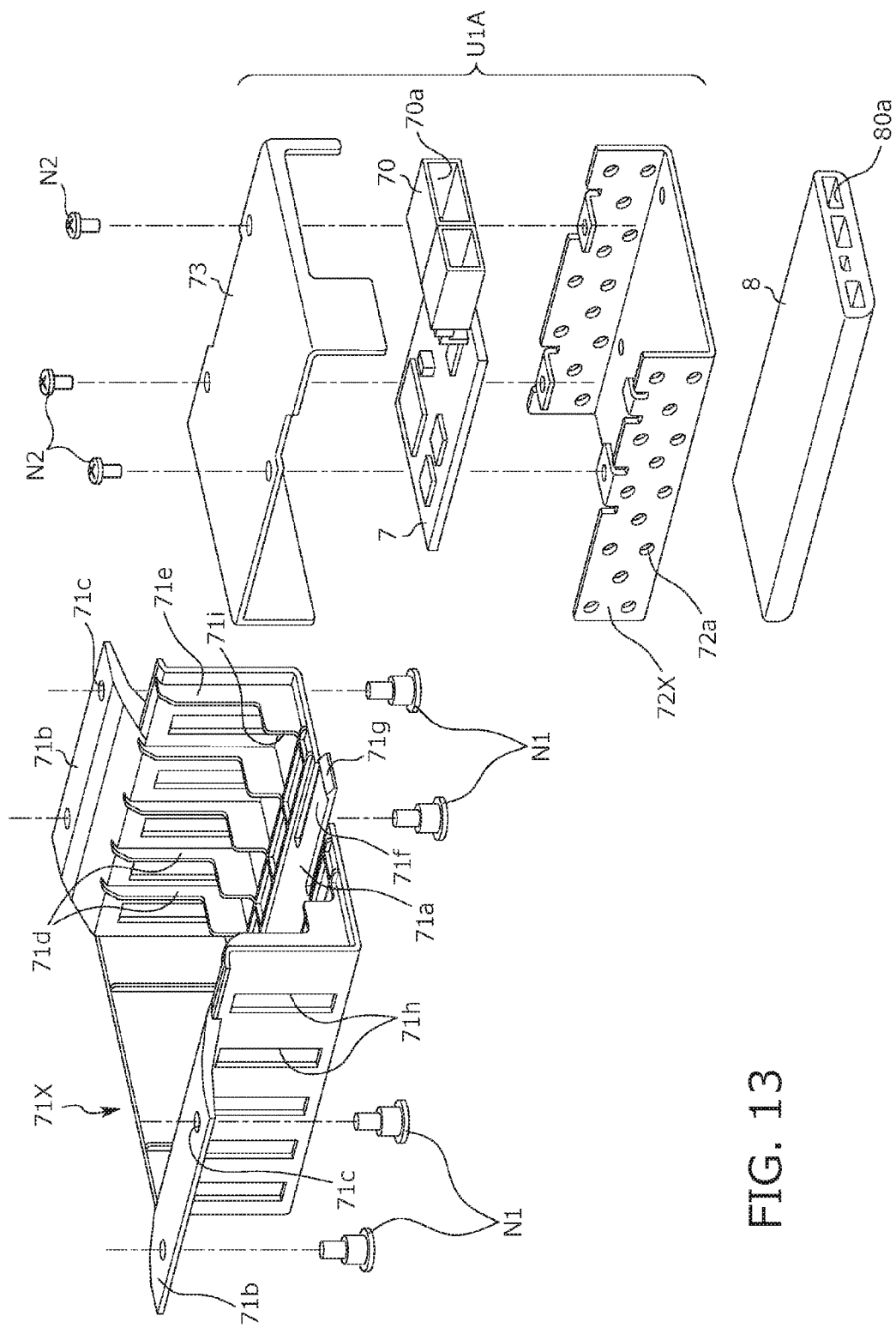
FIG. 13 is an exploded perspective view of a control device, a battery, the holding cover, and the like which are attached to the legged chair.
Figure 14:
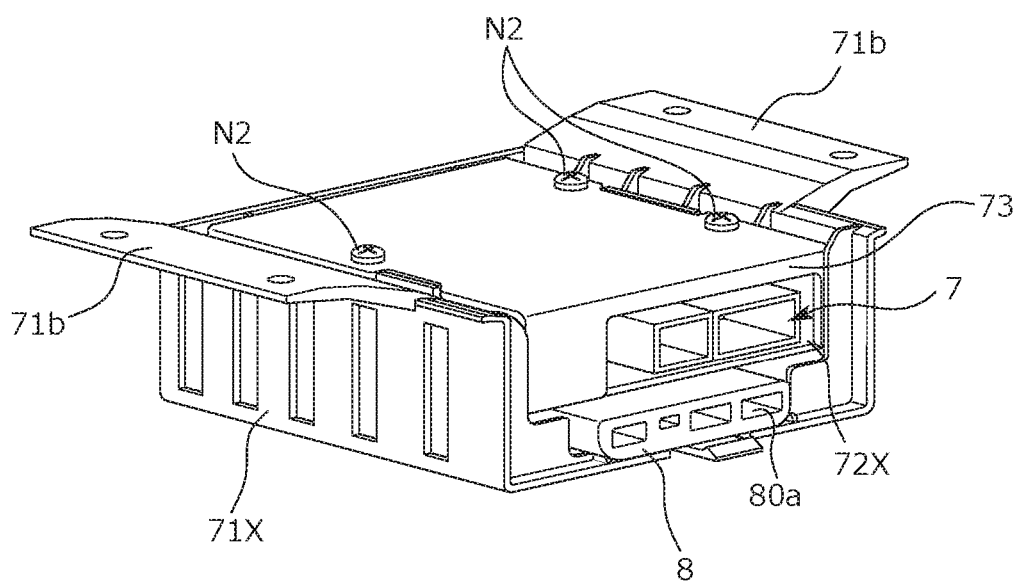
FIG. 14 is a perspective view showing the holding cover in a state of holding the control device and the battery.
Figure 15:
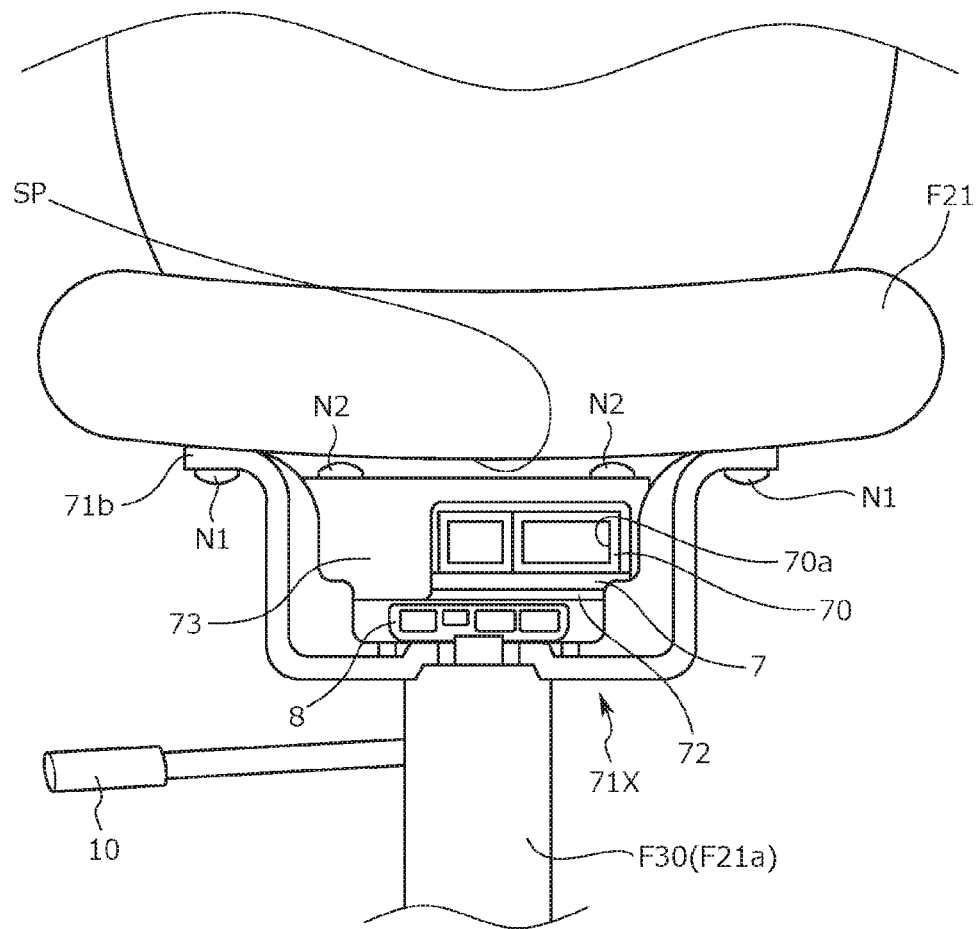
FIG. 15 is a schematic front view showing a state where the holding cover holding the control device and the battery is attached to the lower surface of the cushion pan.

With reference to FIGS. 13 to 15 in addition to FIGS. 1, 11, and 12, members to be used for attaching the ECU 7 and the battery 8 are now described. FIG. 13 is an exploded perspective view of a control device U1A, the battery 8, the holding cover 71X serving as a case, and the like which are attached to the legged chair S. FIG. 14 is a perspective view showing the holding cover 71X in a state of holding the control device U1A and the battery 8. FIG. 15 is a schematic front view showing a state where the holding cover 71X holding the control device U1A and the battery 8 is attached to the lower surface of the cushion pan F21. Front ends of pan attachment portions 71b serving as fastened portions in the holding cover 71X according to the present embodiment are not formed up to a front end of the holding cover 71X, in other words, formed on the rear side of the front end of the holding cover 71X. By forming the pan attachment portions 71b in such a way, an upper side frame portion F21c fastened by self-tapping screws N1 together with the pan attachment portions 71b can be arranged on the rear side of the front end of the holding cover 71X. Therefore, a forward extension amount of the upper side frame portion F21c for attachment of the pan attachment portions 71b can be suppressed, so that a hand of the seated person can be suppressed from touching the upper side frame portion F21c to feel uncomfortable.

Square shaped slits 71h extending in the up and down direction are formed between ribs 71d adjacent to each other in the front to back direction in the holding cover 71X according to the present embodiment. By forming the slits 71h in such a way, the air can be distributed through the interior and the exterior of the holding cover 71X, so that the heat radiation property of the ECU 7 and the battery 8 held by the holding cover 71X can be enhanced.

A plurality of punch holes 72a are formed on a side surface of a base member 72X according to the present embodiment. When the air can be more readily distributed, the heat radiation property of the ECU 7 supported inside is enhanced. A square shaped cutout is formed on a front surface of a cover member 73 for exposing the connector 70 of the ECU 7 and connecting the ECU 7 and the breathing sensor 9 or the vibration device 35 by the connector 70.

By mounting the base member 72X on the ribs 71d arranged to be spaced in the front to back direction, the air having heat generated from the ECU 7 passes between the ribs 71d via the punch holes 72a of the base member 72X. Therefore, the heat radiation property of the ECU 7 can be favorable.

Further, in the present embodiment, the control device U1A is formed to be larger in the width direction and the depth direction of the chair than the battery 8. Therefore, the control device U1A is preferably provided to overlap on the upper side of the battery 8. By disposing the member formed to be larger in the width direction or the depth direction of the chair on the upper side, for example, making the holding cover 71X sized for the size of the relatively small battery 8, a space where legs of the seated person are placed, the space being on the lower side of the holding cover 71X can be extended.

When the battery 8 overlaps on the lower side of the control device U1A, the battery 8 is provided at a position distant from the cushion pan F21, so that a hand of the seated person easily reaches a charging jack 80a of the battery 8. Therefore, the seated person can easily attach and detach the battery 8 in a state where the seated person remains seated in the cushion pan F21. However, the battery 8 is not limited to such a configuration but may be provided to overlap on the upper side of the control device U1A, for example. By disposing the control device U1A and the battery 8 to overlap in the up and down direction in such a way, extension of the control device U1A or the battery 8 in the chair width direction of the legged chair S is suppressed, so that contact with legs or the like of the seated person can be suppressed.

When one of the ECU 7 and the battery 8 having the greater heat generation amount is disposed on the upper side in the up and down direction, heat is kept between this member and the upper side frame portion F21c. Therefore, one of the ECU 7 and the battery 8 having the greater heat generation amount is preferably disposed on the lower side in the up and down direction since the heat radiation property is favorable.

As shown in FIG. 12, to utilize a space SP corresponding to a gap formed between the cover member 73 and the upper side frame portion F21c, for example, the harness 11 connecting the breathing sensor 9 and the ECU 7 can be disposed in the space SP. In addition, the harness or the cable (not shown) connecting the vibration device 35 or the battery 8 and the ECU 7 may pass through part of the space SP.

The holding cover 71X that stores the control device U1A and the battery 8 is provided at a position to keep away from a movable range of the operation lever 10. Therefore, disturbance of operations of the operation lever 10 can be avoided, so that comfortable use of the operation lever 10 is improved.

Similarly, the connector 70 is provided at a position to keep away from the movable range of the operation lever 10. More specifically, as shown in FIG. 15, the connector is provided on the opposite side of the operation lever 10 provided on one side in the chair width direction, that is, on the other side at a position where the connector and the operation lever do not overlap in the up and down direction. By disposing the connector 70 in such a way, when the seated person extends his/her hand from the up and down direction of the operation lever 10 and operates the operation lever 10, disturbance of operations by the connector 70 and the harness 11 connected to the connector 70 can be avoided. Similarly, when the seated person extends his/her hand from one side in the width direction of the legged chair S, disturbance by the connector 70 and the harness 11 connected to the connector 70 can be avoided, so that comfortable use of the operation lever 10 is improved.

The holding cover 71X is attached on the front side of the support barrel F30, and attached to the cushion pan F21 in such a manner that the connection port 70a of the connector 70 faces the front side. Therefore, the seated person can plug and unplug the harness 11 in a state where the seated person is seated in the legged chair S without disturbance by the support barrel F30 on the rear side of the holding cover 71X, so that maintenance can be more easily performed.

Size and Attachment Position of Holding Cover

Figure 16:
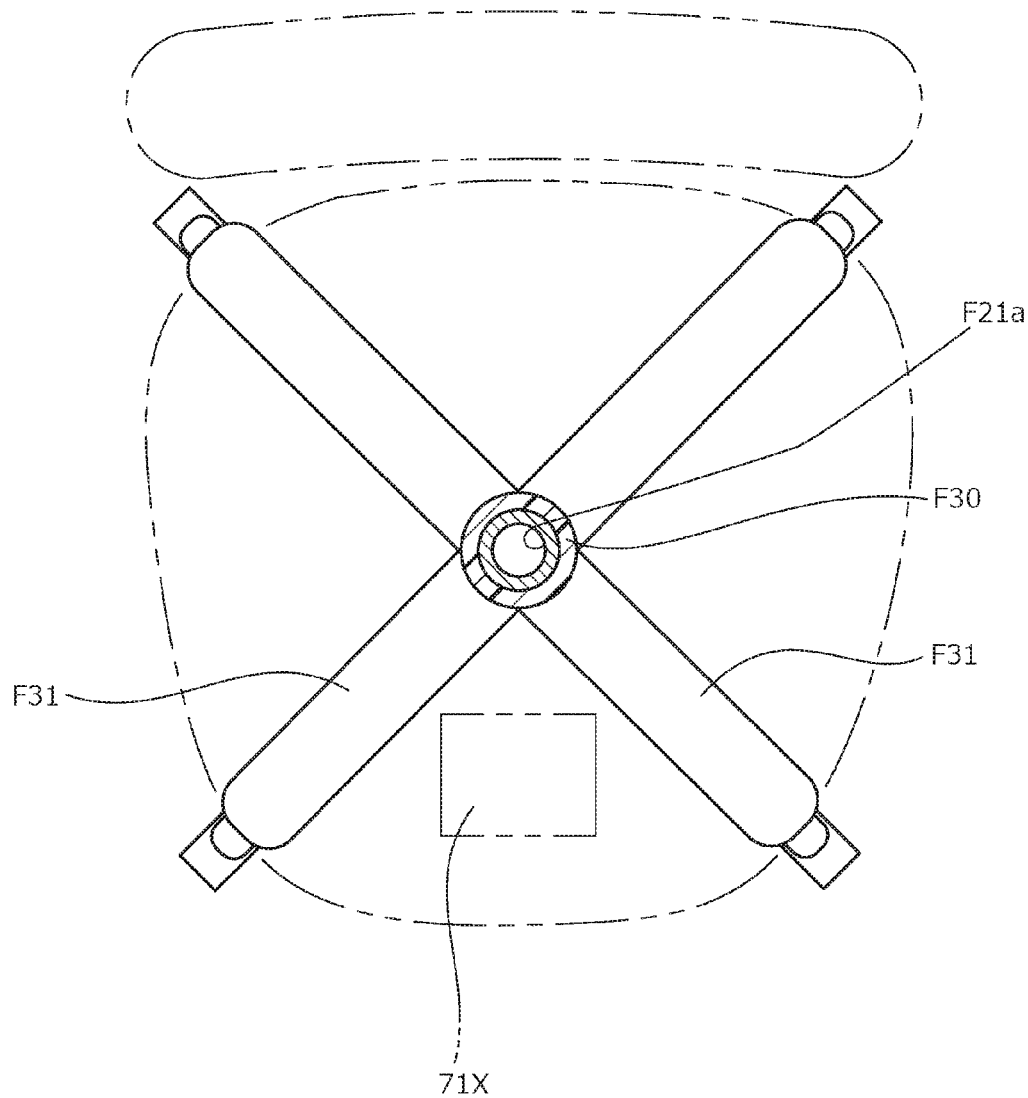
FIG. 16 is a schematic sectional view taken along the line XVI-XVI of FIG. 1.
Figure 17:
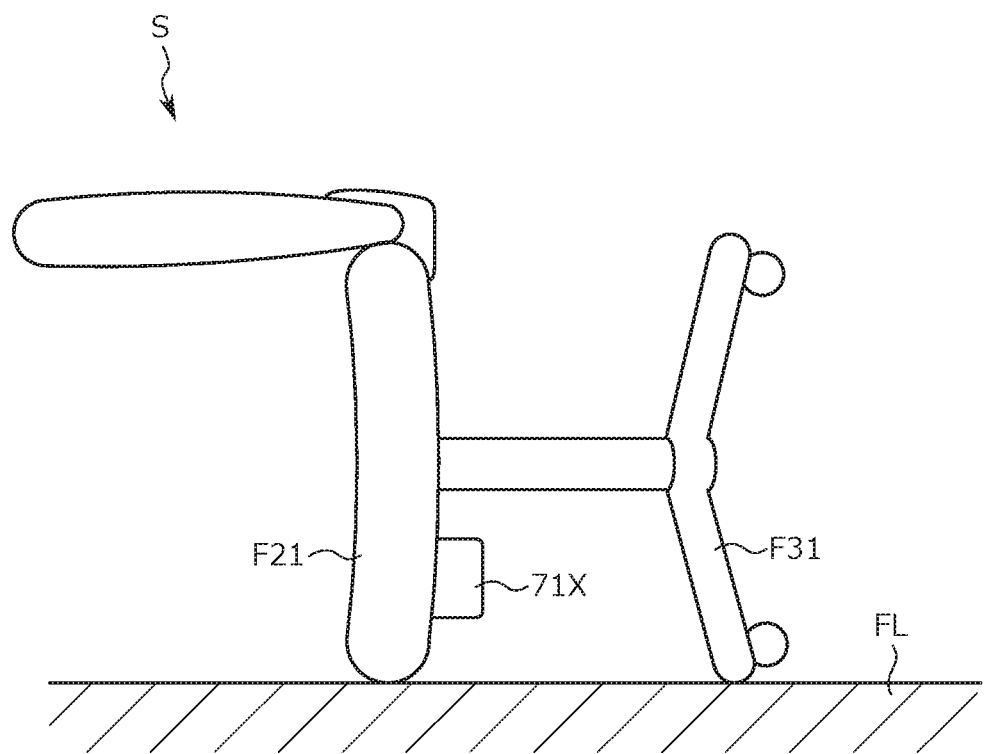
FIG. 17 is a schematic side view showing a state where the legged chair lies on the side.

Now, with reference to FIGS. 16 and 17, size and an attachment position of the holding cover 71X is described. FIG. 16 is a schematic sectional view taken along the line XVI-XVI of FIG. 1. FIG. 17 is a schematic side view showing a state where the legged chair S lies on the side.

As shown in FIG. 16, the holding cover 71X is formed to have such size that the holding cover is housed between adjacent foot portions F31 on a horizontal plane. By forming the holding cover 71X in such a way, in a state where the seated person arranges the two adjacent foot portions F31 on the front side and sets his/her legs on the two leg portions F31, abutment of the legs of the seated person with the holding cover 71X can be more easily avoided. Therefore, an uncomfortable feeling of the seated person upon abutting the legs of the seated person with the holding cover 71X can be avoided.

Further, as shown in FIG. 17, even in a state where the legged chair S lies on any of the sides on a floor FL, the holding cover 71X is preferably arranged at least on the upper side of a straight line connecting an abutment portion of the cushion pan F21 with the floor FL and an abutment portion of the foot portion F31 with the floor FL. In other words, the holding cover 71X is preferably arranged at a position not extending from any regions connecting any position of the cushion pan F21 and an end portion of the foot portion F31. By attaching the holding cover 71X to the cushion pan F21 in such arrangement, even in a case where the legged chair S suddenly falls down, the holding cover 71X is abutted with the floor FL, so that damage to the holding cover 71X, and the ECU 8 and the battery 8 in the holding cover 71X can be prevented.

First Modified Example

Now, a holding cover 75 holding the control device U1A according to a first modified example of the present embodiment is described with reference to FIG. 18. FIG. 18 is a schematic sectional view taken along the line XVIII-XVIII of FIG. 1, the view showing an example in which the harness 11 is connected on the rear side of the control device U1A.

The present modified example is characterized in that the breathing sensor 9 and the connector 70 can be connected by a short harness 11. In detail, the holding cover 75 according to the present modified example corresponds to a case according to the present disclosure, characterized by holding the control device U1A in such a manner that the connector 70 of the ECU 7 forming the control device U1A is arranged on the side of a support post F21a. An opening hole 75a from which the connector 70 is exposed to the rear side is formed on a rear side surface of the holding cover 75 unlike the holding cover 71X.

A through hole F21n communicating with a hollow portion from the exterior is formed in a portion of the support post F21a exposed between the lower side frame portion F21b and the upper side frame portion F21c, the portion on the front side facing the holding cover 75. Part of the plurality of boreholes F21j formed in the resin plate F21d is placed on the upper side of the hollow portion of the support post F21a and communicates with this hollow portion. A guide hole F21m is formed in the pad portion F21o to continue to the borehole F21j. The harness 11 connected to the connector 70 is connected to the breathing sensor 9 through the opening hole 75a of the holding cover 75, the through hole F21n of the support post F21a, the borehole F21j of the resin plate F21d, and the guide hole F21m of the pad portion F21o.

By arranging the connector 70 on the rear side of the holding cover 75, in other words, on the side facing the support post F21a and the support barrel F30 (in other words, in the direction to face the breathing sensor 9) in such a way, the connection port 70a of the connector 70 is protected by the support post F21a and the support barrel F30. Thus, foreign substances can be prevented from intruding. With such a configuration, a distance between the breathing sensor 9 and the connector 70 on the rear side of the holding cover 75 becomes shorter than a case where the connector 70 is arranged on the front side of the holding cover 75. Therefore, the harness 11 can be shortened, the harness 11 can be more easily attached, and the material cost can be reduced. Further, by making the connector 70 connected to the harness 11 of the breathing sensor 9 that the seated person is less required to touch face the side of the support post F21a (support barrel F30), a human error that the seated person erroneously detach the harness 11 from the connector 70 or the like can be avoided.

The harness 11 connecting the ECU 7 and the breathing sensor 9 is described above. However, needless to say, the harness (not shown) connecting the ECU 7 and the vibration device 35 and the cable (not shown) connecting the ECU 7 and the battery 8 can also be shortened by arranging the connector 70 in accordance with a positional relationship of the harness or the cable.

Second Modified Example

Figure 19:
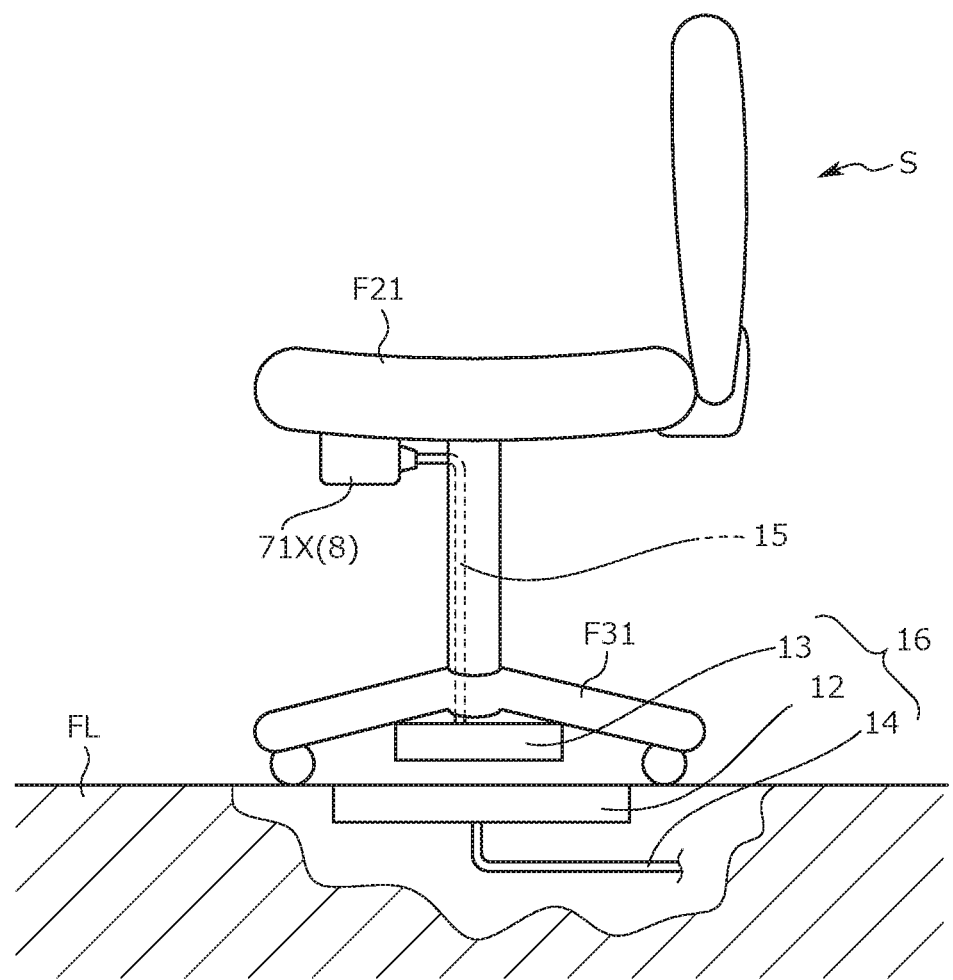
FIG. 19 is a schematic view showing the legged chair including a wireless power feeding device.

The legged chair S including a wireless power feeding device 16 according to a second modified example of the present embodiment is described with reference to FIG. 19. FIG. 19 is a schematic view showing the legged chair S including the wireless power feeding device 16.

The wireless power feeding device 16 according to this example is formed from a power transmission unit 12 embedded in the floor FL, a power receiving unit 13 to which the electric power is transmitted from the power transmission unit 12, and a cable 15 connected to the power receiving unit 13 and the battery 8. The power transmission unit 12 and the power receiving unit 13 include coils inside to generate electromotive force in the power receiving unit 13 via a magnetic flux produced by letting an electric current flow through the power transmission unit 12 from a household power source (not shown). In order to enhance efficiency of receiving the electric power from the power transmission unit 12, the power receiving unit 13 is attached on the lower side of the foot portions F31 to be close to the power transmission unit 12. The cable 15 extending from the power receiving unit 13 is connected to the battery 8 attached to the cushion pan F21 through the interior of the hollow portion of the support post F21a.

In this example, when the electric power of the battery 8 is depleted, there is no need for replacing the battery with a new battery 8 and there is also no need for plugging the charging cable 67 shown in FIG. 3 into the battery 8. Therefore, power feeding of the awakening device U is no more troublesome, and the charging cable 67 does not get entangled with for example the casters F31a of the leg member F3 when the legged chair S is moved. Thus, the legged chair S can be used comfortably. In addition to the electromagnetic induction method, the electric field coupling method and the resonant coupling method may be adopted for the wireless power feeding device 16.

Fourth Embodiment

A legged chair according to a fourth embodiment of the present disclosure is a legged chair capable of detecting body signals from the seated person with high precision.

In the legged chair described in JP T 2006-503599, by a change in the posture of the seated person, the seated person is sometimes away from the sensor, and body signals are not easily stably detected from the sensor. A harness coupling the sensor and the control device is sometimes long. In this case, cost is increased, and a failure in which a maintenance property is lowered due to entanglement with other members such as conductor wires, or the like is sometimes caused.

Further, in accordance with displacement of a pad portion in a seated portion from a main body portion by the change in the seating posture of the seated person, a position of the sensor attached to the pad portion is sometimes displaced. By displacing the position of the sensor from an optimal position for detecting the body signals in such a way, detection precision of the body signals is sometimes decreased. In a case where a hanging groove for hanging a skin is formed in the seated portion, by part of the sensor falling into the hanging groove, contact pressure between the sensor and the seated person is lowered, so that the detection precision of the body signals is sometimes decreased. For example, in a case where the chair is brought upside down at the time of cleaning and mounted on a desk, the sensor is sometimes broken down by weight of the chair applied to the sensor which is provided in the seated portion or impact applied to the sensor from the floor or the like when the chair falls down.

A legged chair S according to the fourth embodiment of the present disclosure for solving these problems, and an ECU 7, a battery 8, and a holding cover 71 holding these provided in the legged chair S is described with reference to the drawings.

Attachment Position of Breathing Sensor

Figure 20:
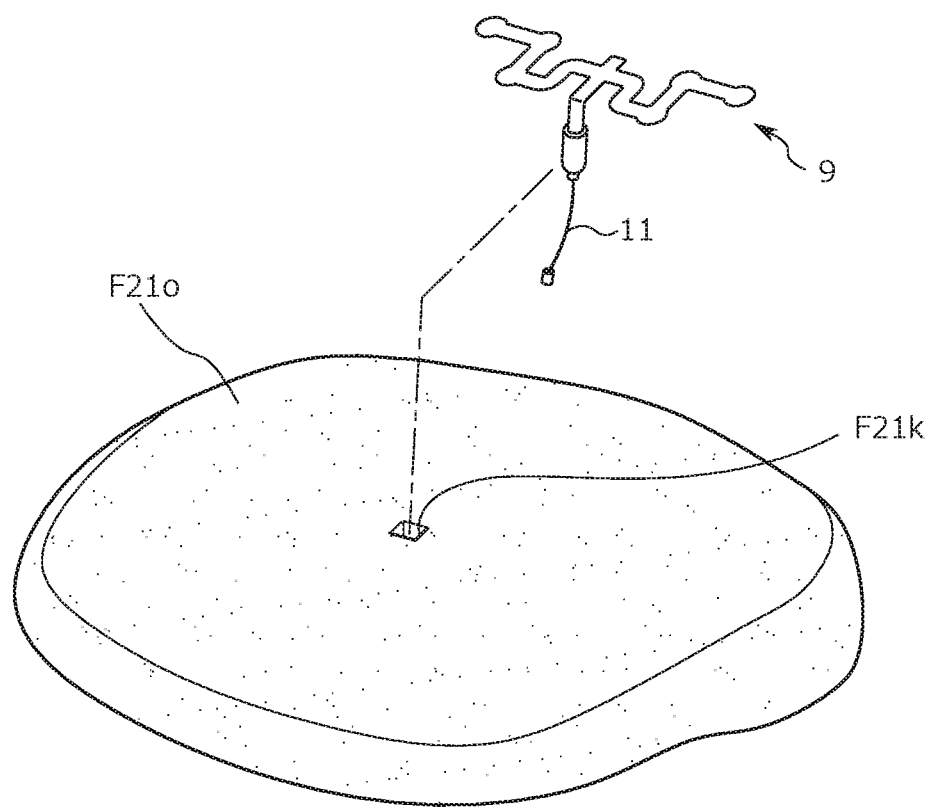
FIG. 20 is an exploded schematic view showing a state where a breathing sensor according to a fourth embodiment of the present disclosure is attached to a pad portion.
Figure 21:
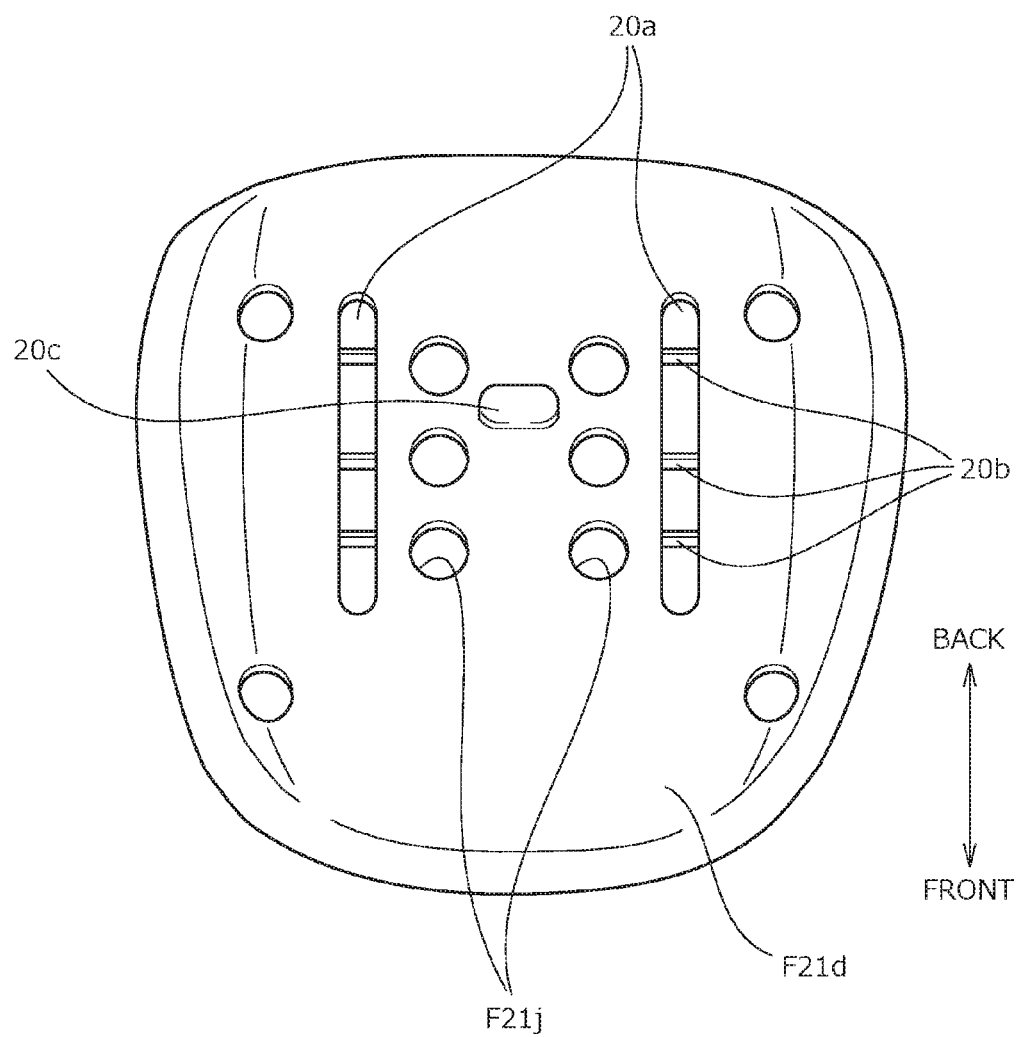
FIG. 21 is a top view showing a resin plate.
Figure 22:
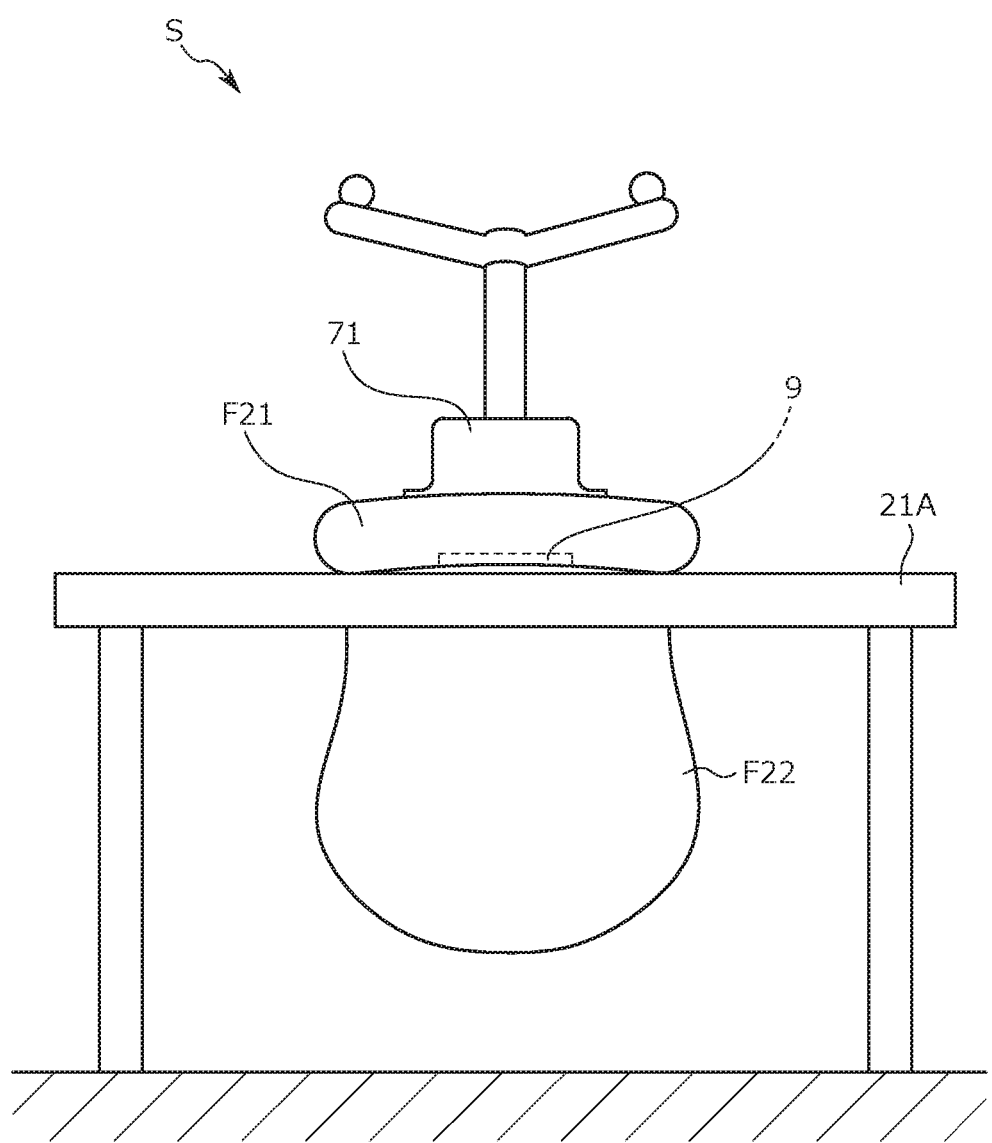
FIG. 22 is a schematic front view showing a state where a legged chair is brought upside down and mounted on a desk.
Figure 23:
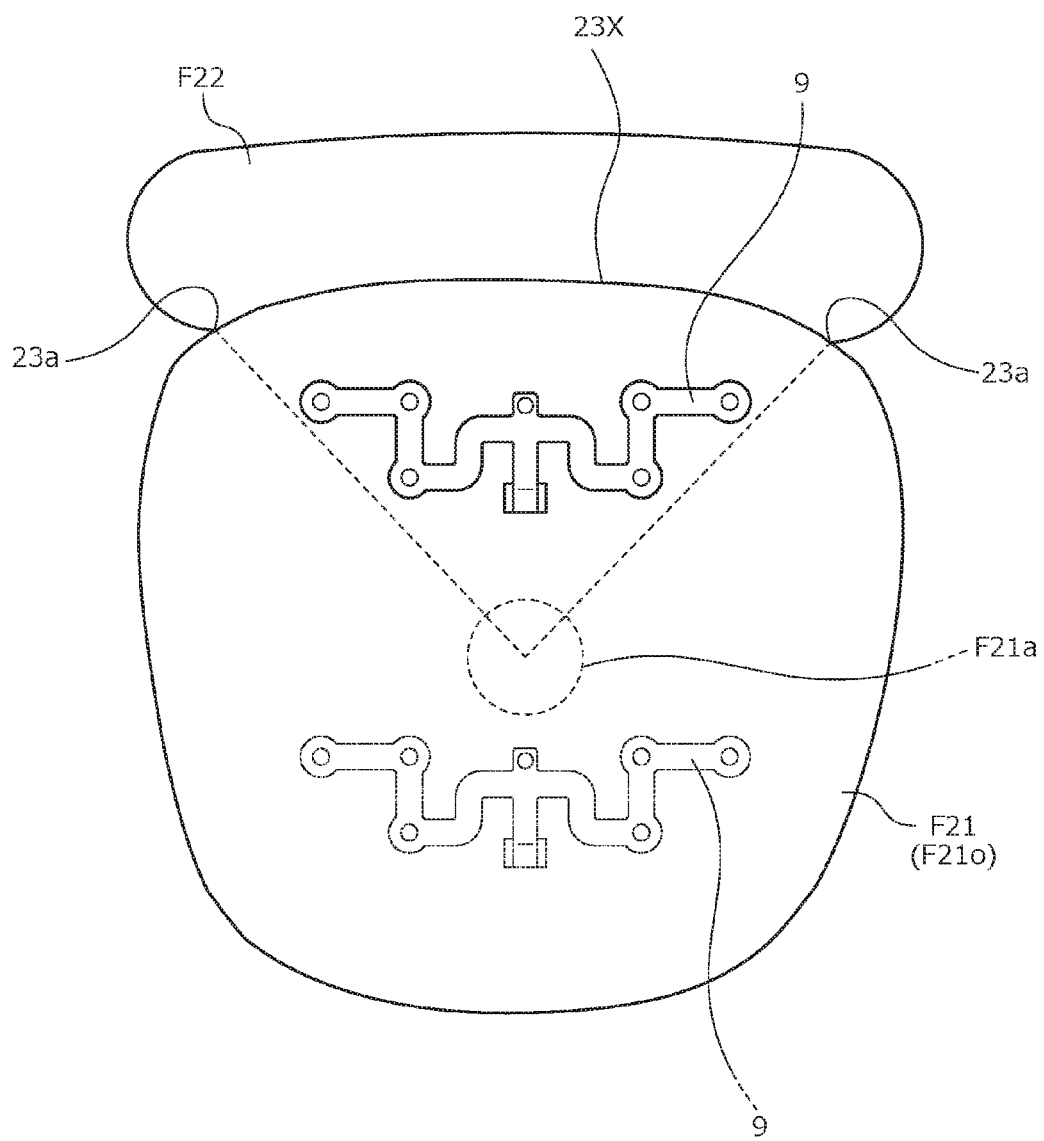
FIG. 23 is a schematic top view of a cushion pan, showing arrangement of the breathing sensor.
Figure 24:
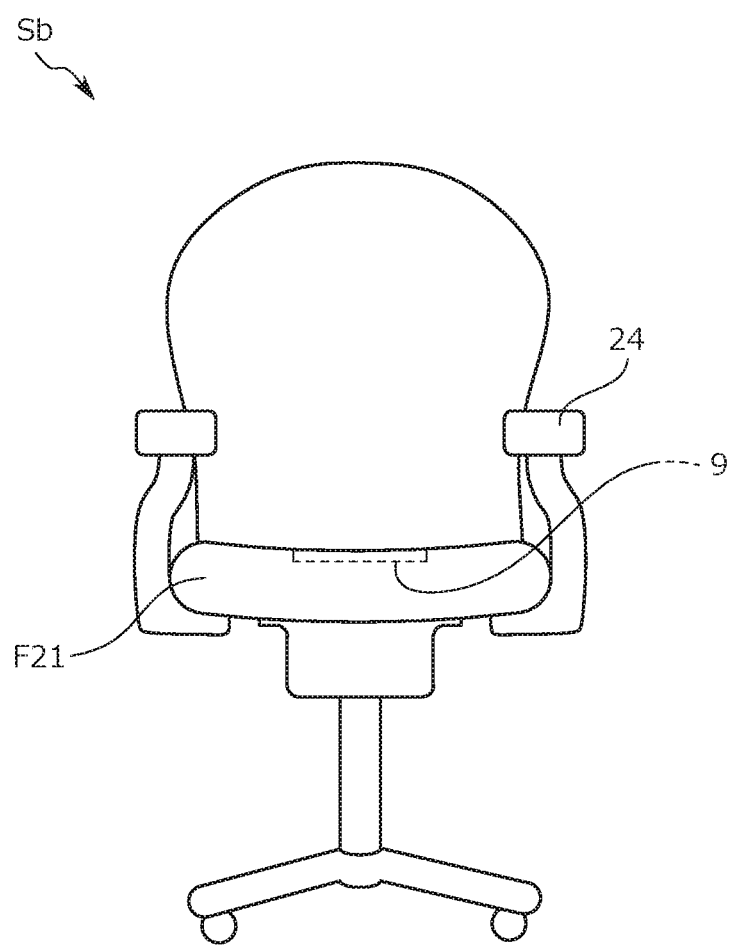
FIG. 24 is a schematic front view of a legged chair including armrests, showing arrangement of the breathing sensor.

With reference to FIGS. 20 to 24 in addition to FIGS. 1 to 5 and 12, an attachment position of a breathing sensor 9 is described. FIG. 20 is a view showing a state where the breathing sensor 9 is attached to a pad portion F21o. FIG. 21 is a top view showing a resin plate F21d. FIG. 22 is a schematic front view showing a state where the legged chair S is brought upside down and mounted on a desk 21A. FIG. 23 is a schematic top view of a cushion pan F21, showing arrangement of the breathing sensor 9. FIG. 24 is a schematic front view of a legged chair Sb including armrests 24, showing arrangement of the breathing sensor 9.

As shown in FIG. 20, a harness 11 passes through a guide hole F21k formed in substantial center of the pad portion F21o and the breathing sensor 9 is attached to an upper surface of the pad portion F21o by a double-stick tape, an adhesive, or the like.

In particular, a portion of the pad portion F21o to which the breathing sensor 9 is attached is formed to be thicker in the up and down direction than the other portions. The thick portion of the pad portion F21o has a relatively larger extension and contraction amount in the up and down direction. Thus, the portion is deformed to be fit for the bottom portion of the seated person, so that contact with the bottom portion is easily maintained. Therefore, by attaching the breathing sensor 9 to the thick portion of the pad portion F21o, the breathing sensor 9 is deformed in accordance with deformation of the pad portion F21o to be fit for the seated person. Therefore, a plurality of electrodes 9a arranged in the longitudinal direction of the breathing sensor 9 are favorably brought into contact with the seated person, so that body signals can be stably detected.

The upper surface of the pad portion F21o in the portion to which the breathing sensor 9 is attached, and a lower surface of the pad portion F21o on the lower side of this portion are formed to be flat and smooth. By forming the pad portion F21o in such a way, a decrease in precision to detect the body signals by the breathing sensor 9 due to a difference in shape of the pad portion F21o serving as an external factor can be avoided.

On an upper surface of the resin plate F21d serving as a main body portion on which the pad portion F21o is mounted, as shown in FIG. 21, a pair of elongated recess grooves 20a having circular ends is formed side by side in the chair width direction while extending in the front to back direction of the chair, and being recessed downward from the upper surface of the resin plate F21d. In each of the recess grooves 20a, three plate shaped ribs 20b are formed side by side to be spaced from each other in the front to back direction of the chair while extending in the chair width direction, and being formed from a bottom of the recess groove 20a to a position of the upper surface of the resin plate F21d. In a center of the upper surface of the resin plate F21d, one long circle shaped projection portion 20c is formed while extending in the chair width direction and projecting on the upper side of a peripheral part. On a back surface of the pad portion F21o, projections (not shown) formed in a shape and in arrangement matching the recess grooves 20a and the ribs 20b are formed, and a recess (not shown) formed in a shape and in arrangement matching the projection portion 20c is formed.

By combining and attaching the resin plate F21d and the pad portion F21o formed in such a way in the up and down direction, position displacement of the pad portion F21o from the resin plate F21d is prevented. That is, the recess grooves 20a, the ribs 20b, and the projection portion 20c function as a position displacement prevention unit. Since the pad portion F21o is not displaced from the resin plate F21d by the recess grooves 20a, the ribs 20b, and the projection portion 20c, the breathing sensor 9 provided on the surface of the pad portion F21o is not displaced. Thus, the body signals can be stably detected from the breathing sensor 9. The position displacement prevention unit is not limited to recessed and projecting portions such as the ribs 20b and the projection portion 20c but an adhesive may be used. The resin plate F21d and the pad portion F21o are not necessarily attached by bonding but the pad portion F21o may be integrally formed on the resin plate F21d. After simply mounting the pad portion F21o on the resin plate F21d, the resin plate and the pad portion are attached by fixing a skin (not shown) covering the pad portion F21o to the resin plate F21d.

At the time of cleaning the floor or the like, the legged chair S is sometimes brought upside down and mounted on the desk 21A as shown in FIG. 22. In such a state, the breathing sensor 9 is disposed not in the highest portions on both the end sides in the chair width direction on a seating surface of the cushion pan F21, but in a central recessed portion in no contact with the desk 21A even in a state where the cushion pan F21 is compressed by the weight of the legged chair S. Therefore, a supporting force applied to the breathing sensor 9 from the desk 21A due to the weight of the legged chair S can be avoided, so that failure of the breathing sensor 9 can be avoided. Other than a case where the legged chair is mounted on the desk 21A, in a case where other objects touch the cushion pan F21 in a planar manner for example upon placing a box shaped object on the cushion pan F21, a load is received at the highest position on the seating surface of the cushion pan F21 at first. Thus, a load applied to the breathing sensor 9 can be restricted, so that the breathing sensor 9 can be protected.

For example, in a case where the holding cover 71 holding a control device U1 and the battery 8 attached on the front side is heavier than a back pan F22 attached on the rear side of the cushion pan F21, the load is greatly applied to a front portion of the cushion pan F21. In this case, by disposing the breathing sensor 9 on the rear side of the cushion pan F21, contact between the breathing sensor 9 and the desk 21A can be avoided, and even when the breathing sensor and the desk are brought into contact, application of a great load due to reaction force of the weight can be avoided.

FIG. 23 shows a case where the cushion pan F21 and the back pan F22 are in contact with each other, and a contact portion 23X is formed in an arc shape in a top view. In this case, the breathing sensor 9 is disposed between both end portions 23a of the contact portion 23X in the chair width direction on a rear side of a center of a support post F21a, more preferably, inside a triangle connecting both the end portions 23a of the contact portion 23X in the chair width direction and the center of the support post F21a.

With such a configuration, by forming the contact portion 23X in an arc shape, deformation of the cushion pan F21 can be suppressed. Therefore, by arranging the breathing sensor 9 in that region, a load due to deformation of the cushion pan F21 applied to the breathing sensor 9 is suppressed, so that the body signals can be stably detected. By covering a rear portion of the breathing sensor 9 in the triangle in the cushion pan F21 with the back pan F22, a load from other objects is not easily applied, so that the breathing sensor is protected. Further, when the breathing sensor 9 is placed in the above triangle, the breathing sensor 9 is arranged in a region where a load from the seated person is the most greatly applied in the cushion pan F21 (greatest load region), so that the body signals can be stably detected. In a case where the breathing sensor 9 is disposed in the back pan F22, by adopting the opposite configuration, the same effects can be exerted.

In a case where the seated person is seated in a front edge of the cushion pan F21 (in a front portion of the cushion pan F21), the above greatest load region is sometimes positioned on the front side of the support post F21a. In this case, as shown by double dotted lines in FIG. 23, the breathing sensor 9 may be arranged on the front side of the center of the support post F21a, or a plurality of breathing sensors 9 may be arranged on both the front side and the rear side of the center of the support post F21a.

Depending on detection sensitivity or pressure resistance ability of the breathing sensor 9, there is sometimes a case where when the breathing sensor 9 is arranged in a portion where a fluctuation of pressure applied from the seated person at the time of breathing of the seated person is great while keeping away from the position where a load of the seated person is the most greatly applied, the body signals can be favorably detected. Assuming such a case, when the seated person is seated in the front edge of the cushion pan F21 (in the front portion of the cushion pan F21), that is, when the above greatest load region is positioned on the front side of the support post F21a, by arranging the breathing sensor 9 on the rear side of the center of the support post F21a, the body signals can be favorably detected. When the seated person is seated back in the cushion pan F21 (in a rear portion of the cushion pan F21), that is, when the above greatest load region is positioned on the rear side of the support post F21a, by arranging the breathing sensor 9 on the front side of the center of the support post F21a, the body signals can be favorably detected. In a case of assuming a seated person who would possibly be seated in both the postures, a plurality of breathing sensors 9 is preferably arranged on both the front side and the rear side of the center of the support post F21a.

As shown in FIG. 24, in the legged chair Sb having the armrests 24, in a case where the armrests 24 are formed to extend to the inner side in the chair width direction of the cushion pan F21, the breathing sensor 9 is desirably disposed on the inner side of the armrests 24. By disposing the breathing sensor 9 in such a way, in a case where external force is applied to the legged chair Sb, the breathing sensor 9 can be protected from other objects by the armrests 24, so that possibility of failure of the sensor can be reduced.

First and Second Modified Examples

Figure 25:
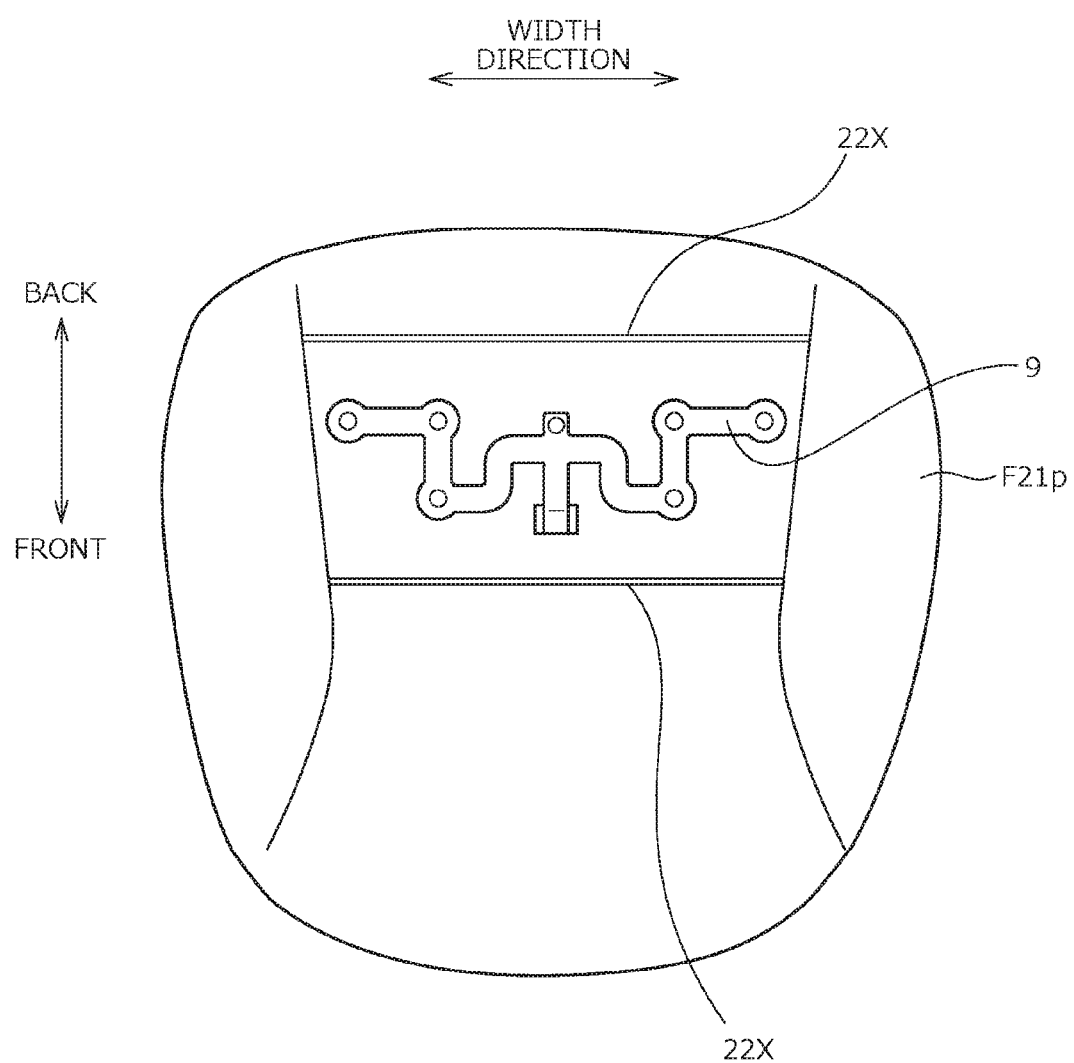
FIG. 25 is a schematic top view showing arrangement of the breathing sensor on a pad portion according to a first modified example.
Figure 26:
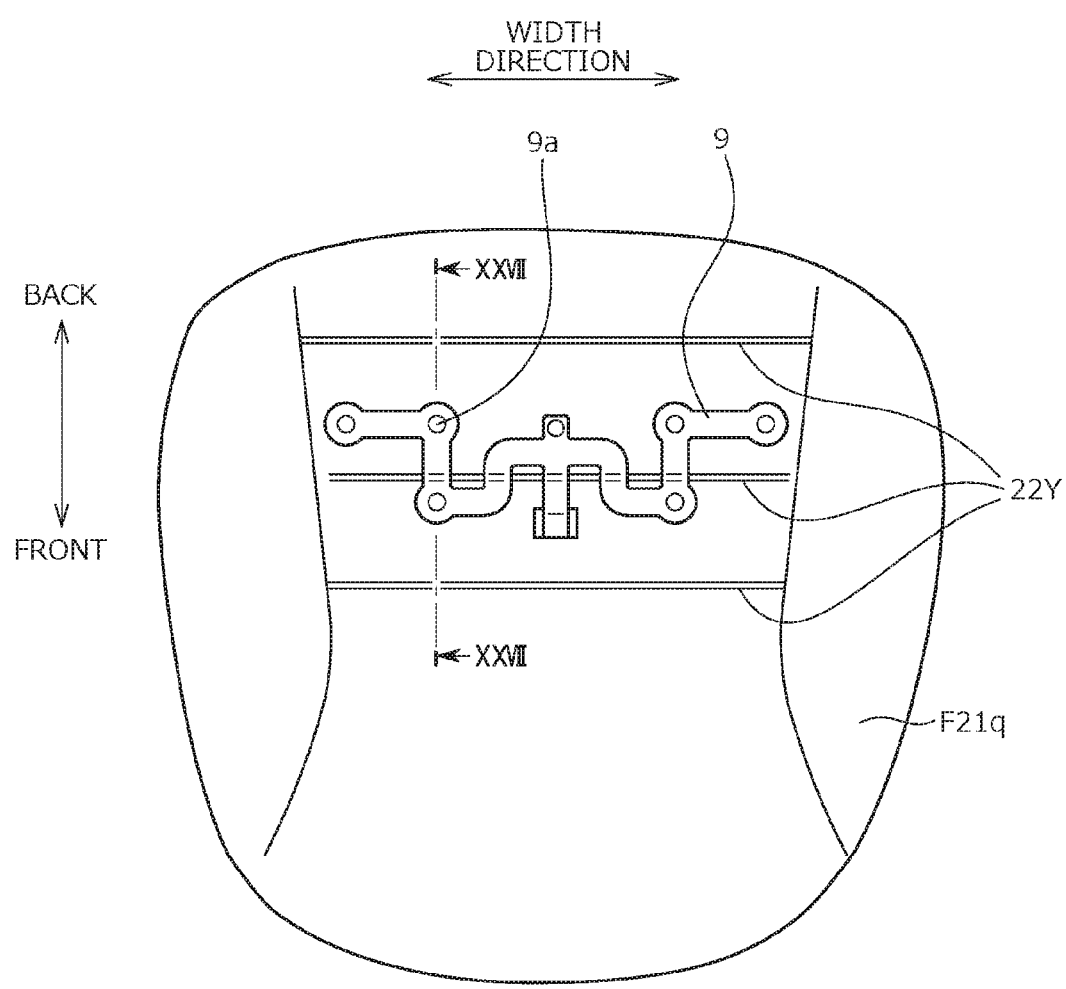
FIG. 26 is a schematic top view showing arrangement of the breathing sensor on a pad portion according to a second modified example.
Figure 27:
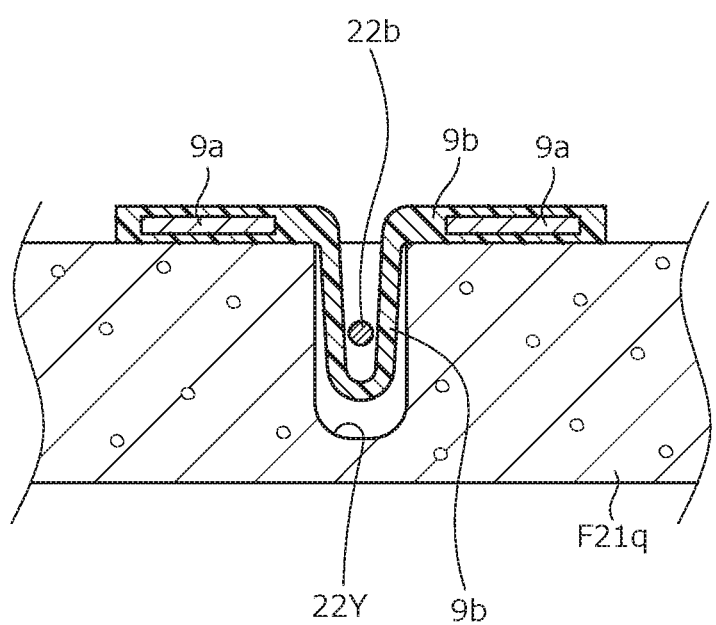
FIG. 27 is a schematic sectional view taken along the line XXVII-XXVII of FIG. 26, showing the breathing sensor partly coming into a hanging groove.

Arrangement of the breathing sensor 9 attached to a pad portion F21p according to a first modified example is described with reference to FIG. 25, and arrangement of the breathing sensor 9 attached to a pad portion F21q according to a second modified example is described with reference to FIGS. 26 and 27. FIG. 25 is a schematic top view showing arrangement of the breathing sensor 9 on the pad portion F21p according to the first modified example, and FIG. 26 is a schematic top view showing arrangement of the breathing sensor 9 on the pad portion F21q according to the second modified example. FIG. 27 is a schematic sectional view taken along the line XXVII-XXVII of FIG. 26, showing the breathing sensor 9 partly coming into a hanging groove 22Y.

The cushion pan F21 of the legged chair S is sometimes formed in such a manner that hanging grooves 22X are provided for the purpose of making seating feel favorable and enhancing a design property and a skin (not shown) is hanged into the hanging grooves 22X.

For example, the pair of hanging grooves 22X formed side by side in the front to back direction of the chair while extending in the chair width direction is formed in the pad portion F21p shown in FIG. 25. In a case where the breathing sensor 9 is disposed in such a pad portion F21p, the breathing sensor 9 is preferably disposed at a position not overlapping with the hanging grooves 22X, specifically between the hanging grooves 22X. By disposing in such a way, even in a case where a load is applied to the breathing sensor 9 from the bottom portion of the seated person and the pad portion F21p is deformed, an influence of a fluctuation of stress distribution by the hanging grooves 22X on the breathing sensor 9 can be suppressed to be small. Therefore, a fluctuation of contact stress of the breathing sensor 9 with the seated person is suppressed, so that erroneous detection of the body signals can be suppressed.

Three hanging grooves 22Y formed in the front to back direction of the chair while extending in the chair width direction are formed in the pad portion F21q according to the second modified example. In a case where the breathing sensor 9 is disposed in such a pad portion F21q, and when the breathing sensor 9 cannot be disposed while keeping away from the hanging grooves 22Y, the breathing sensor may be disposed in such a manner that the electrodes 9a do not overlap with the hanging grooves 22Y.

By disposing in such a way, even in a case where a load is applied to the breathing sensor 9 from the bottom portion of the seated person and the pad portion F21q is deformed, an influence of a fluctuation of stress distribution by the hanging grooves 22Y on the electrodes 9a can be suppressed to be small. Therefore, a fluctuation of contact stress of the breathing sensor 9 with the seated person is suppressed, so that erroneous detection of the body signals can be suppressed. Specifically, by the breathing sensor 9 touching edges of the hanging grooves 22Y, local application of a load to the breathing sensor 9 can be avoided. Further, since restriction of the arrangement of the breathing sensor 9 by the hanging grooves 22Y is suppressed, freedom of design is improved.

In a portion of the pad portion F21q divided by the hanging grooves 22Y, by application of a load from the seated person, position displacement is generated in the up and down direction and in the horizontal direction. Due to generation of position displacement in the pad portion F21q in such a way, when the breathing sensor 9 is applied onto the pad portion F21q over the hanging grooves 22Y in a tension state, repeated stress in the compressing and pulling directions is applied to the breathing sensor 9 in accordance with this position displacement. By applying the repeated stress to the breathing sensor 9 in such a way, conductor wires in the breathing sensor 9 may be broken. Therefore, as shown in FIG. 27, on the lower side of a wire 22b for hanging a skin (not shown) into the hanging groove 22Y, a film 9b with a conductor wire forming the breathing sensor 9 is preferably brought in and set into a bent state. By disposing the breathing sensor 9 in such a way, application of the repeated stress to the interior of the breathing sensor 9 by a change in a sagging amount of the breathing sensor 9 in accordance with position displacement of the support post F21a can be avoided.

Fifth Embodiment

A legged chair according to a fifth embodiment of the present disclosure is a legged chair capable of effectively providing a vibrating stimulation to the seated person to enhance an awakening effect. A technique of providing a vibrating stimulation in order to prevent a decrease in an awake state, in other words, in order to prevent a doze can be used not only for a vehicle seat but also for a legged chair or the like for the purpose of efficiently studying and working or for the purpose of calling for a specific person.

For example, as a legged chair used at the time of calling for a specific person in a theater or a meeting room, JP A 7-322938 describes a legged chair including a vibration device (described as a vibrator in the same patent literature) which has a motor inside a seated portion of the chair. In more detail, the patent literature describes a configuration in which a lower portion of the vibration device is supported via a compression spring, an upper portion of the vibration device is disposed to touch a skin of the seated portion (described as a skin cover in the same patent literature), a vibrating stimulation is provided to a seated person via the skin.

In the legged chair described in JP A 7-322938, the vibration device is provided in contact with the skin made of synthetic resin or the like. Thus, transmission efficiency of vibration generated from the vibration device is low, and a high awakening effect is not easily exerted.

Further, a range in which the vibration is propagated is limited to the vicinity of the skin in contact with the vibration device. In order to propagate the vibration in a wide range for enhancing the awakening effect more, there is a need for attaching a large vibration device to the seated portion, and high cost is often required. In a case where vibration amplitude is increased for increasing a vibrating stimulation, it is thought that by letting people around the seated person know the fact that the seated person is in a doze state by vibrating sound, some inconveniencies may be caused.

In a case where the vibration device is attached to the chair, it is thought that thickness of the chair is increased by an amount of the volume of the vibration device. In this case, in a case where a recess portion is formed in the chair to house the vibration device in this recess portion, the thickness of the chair can be suppressed by the recess portion. However, rigidity is sometimes not easily maintained.

A legged chair S according to the fifth embodiment of the present disclosure for solving these problems, and an ECU 7, a battery 8, and a vibration device 35 provided in the legged chair S is described with reference to the drawings.

Figure 28:
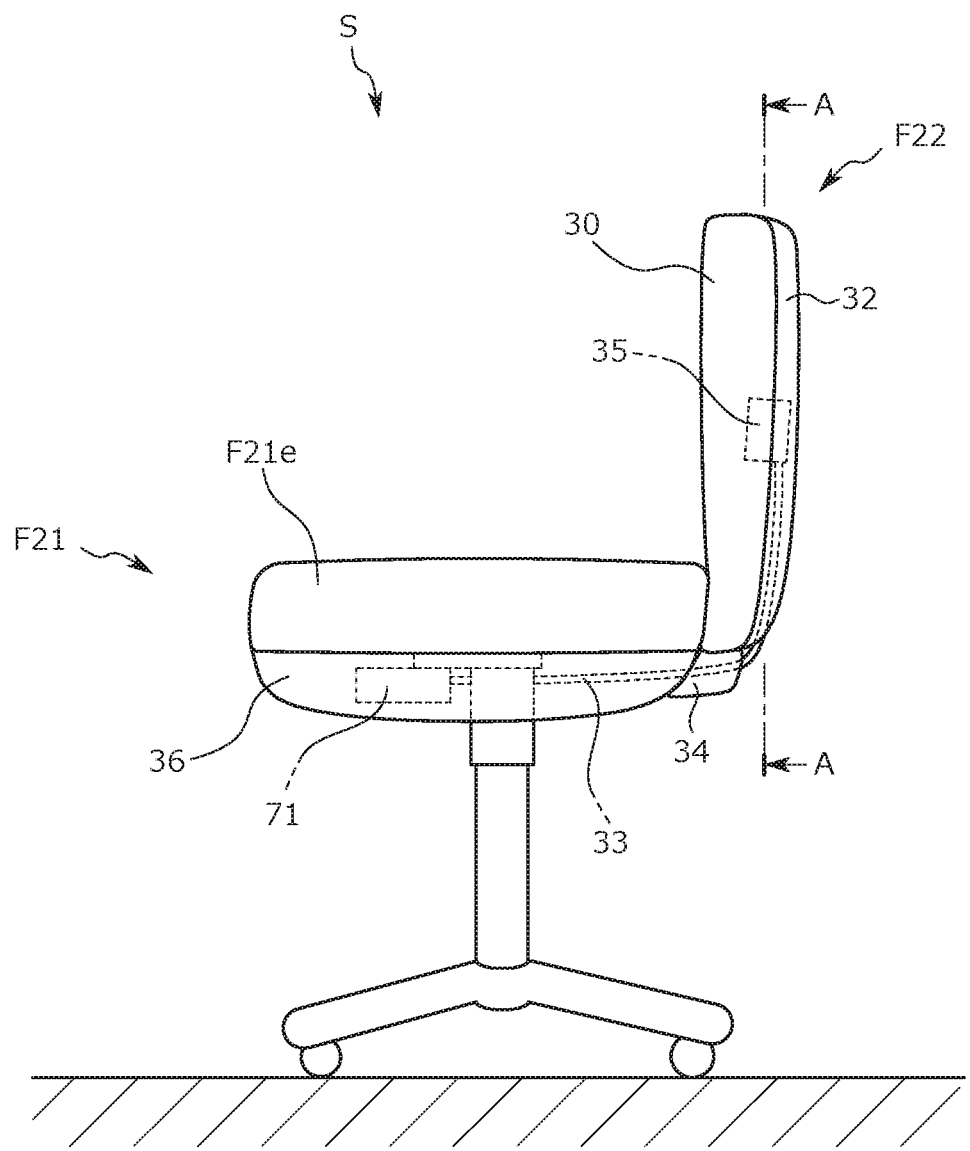
FIG. 28 is a side view of a legged chair, showing arrangement of a vibration device with respect to a backrest main body according to a fifth embodiment of the present disclosure.

With reference to FIG. 28 in addition to FIG. 1, a main configuration of the legged chair S of the fifth embodiment is described. As shown in FIG. 28, a cushion pan F21 according to the present embodiment is formed from a pad portion F21e with a skin, and a seated portion cover 36 attached to a back surface of the pad portion F21e with the skin.

The seated portion cover 36 is made of a resin material, and covers the entire back surface of the pad portion F21e with the skin including a holding cover 71 attached to the back surface of the pad portion F21e with the skin while holding a control device U1 and the battery 8.

A back pan F22 is coupled to a rear portion of the cushion pan F21 by a connection member 34, and formed to extend substantially vertically upward from the cushion pan F21. The connection member 34 is formed from a resin portion 34a having a hollow part 34b, and two metal coupling pipes F22c passing through the hollow part 34b (refer to FIG. 29).

As shown in FIG. 28, the back pan F22 serving as a backrest is formed from a backrest main body 30 provided on the side of the seated person, and a backrest cover 32 covering the entire back surface of the backrest main body 30. The backrest main body 30 is formed from a resin back frame 30a serving as a resin portion 30c which is a substrate formed all over the backrest main body, a pad portion 30b made of a cushion material provided on the front side in the front to back direction of the chair of the back frame 30a (refer to FIG. 33), and a skin 30d covering the pad portion 30b (refer to FIG. 33). As shown in FIG. 1, the vibration device 35 is attached in a center of the backrest main body 30 and covered with the backrest cover 32.

As shown in FIG. 28, at least part of the vibration device 35 is disposed on the front side of a planar region A-A formed by connecting an upper end portion and a lower end portion on the back surface of the backrest main body 30. In other words, the vibration device 35 is attached to the backrest main body 30 in such a manner that at least part of the vibration device 35 is embedded in the back surface of the backrest main body 30. By attaching the vibration device 35 to the backrest main body 30 in such a way, the vibration device 35 which is a generation source of vibration is disposed near the side of the surface of the backrest main body 30 in contact with the seated person. Thus, a vibrating stimulation can be effectively propagated to the seated person.

By covering the vibration device 35 with the backrest cover 32, maintainability of the vibration device 35 can be enhanced, an esthetic aspect can be favorable, and further, leakage of vibrating sound to a peripheral part can be suppressed.

Awakening Device

A harness 11 connected to a breathing sensor 9 and shown in FIG. 1, a harness 33 connected to the vibration device 35 and shown in FIG. 28, and a cable (not shown) connected to the battery 8 are connected to a connection port of a connector (not shown) provided in the ECU 7 according to the present embodiment.

In particular, the harness 33 passes through the hollow part 34b of the connection member 34 and connects the vibration device 35 and the ECU 7 in the holding cover 71 in a bent state. By disposing the harness 33 through the hollow part 34b of the connection member 34, the harness is pressed by an inner wall of the connection member 34 and suppressed from extending to the outer side of the legged chair S. Therefore, catching of external objects onto the harness 33 is suppressed, so that the harness 33 is protected by the connection member 34. Further, by the harness 33 connecting the vibration device 35 and the ECU 7 in a bent state, even when tensile force is applied to the harness 33 by reclining of the back pan F22, the harness can be extended by an amount of bending, so that a load applied to the harness 33 can be released. Therefore, disconnection of the harness 33 can be prevented. As shown in FIG. 28, the vibration device 35 according to the present embodiment is attached to a back surface of the back pan F22, that is, the vicinity of a center portion of a surface opposite to the side of the seated person.

Figure 29:
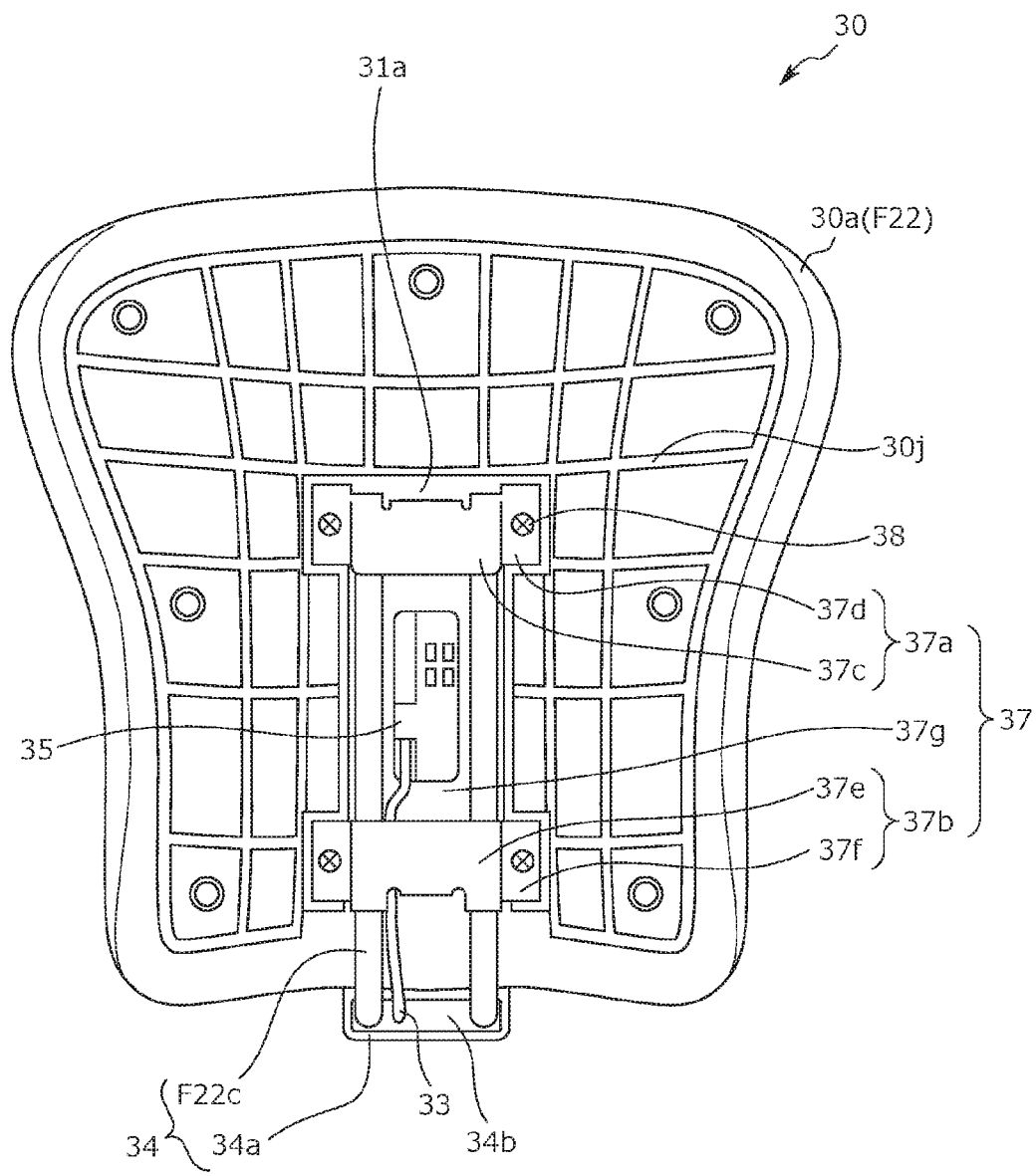
FIG. 29 is a rear schematic view showing a back surface of the backrest main body to which the vibration device is attached.
Figure 30:
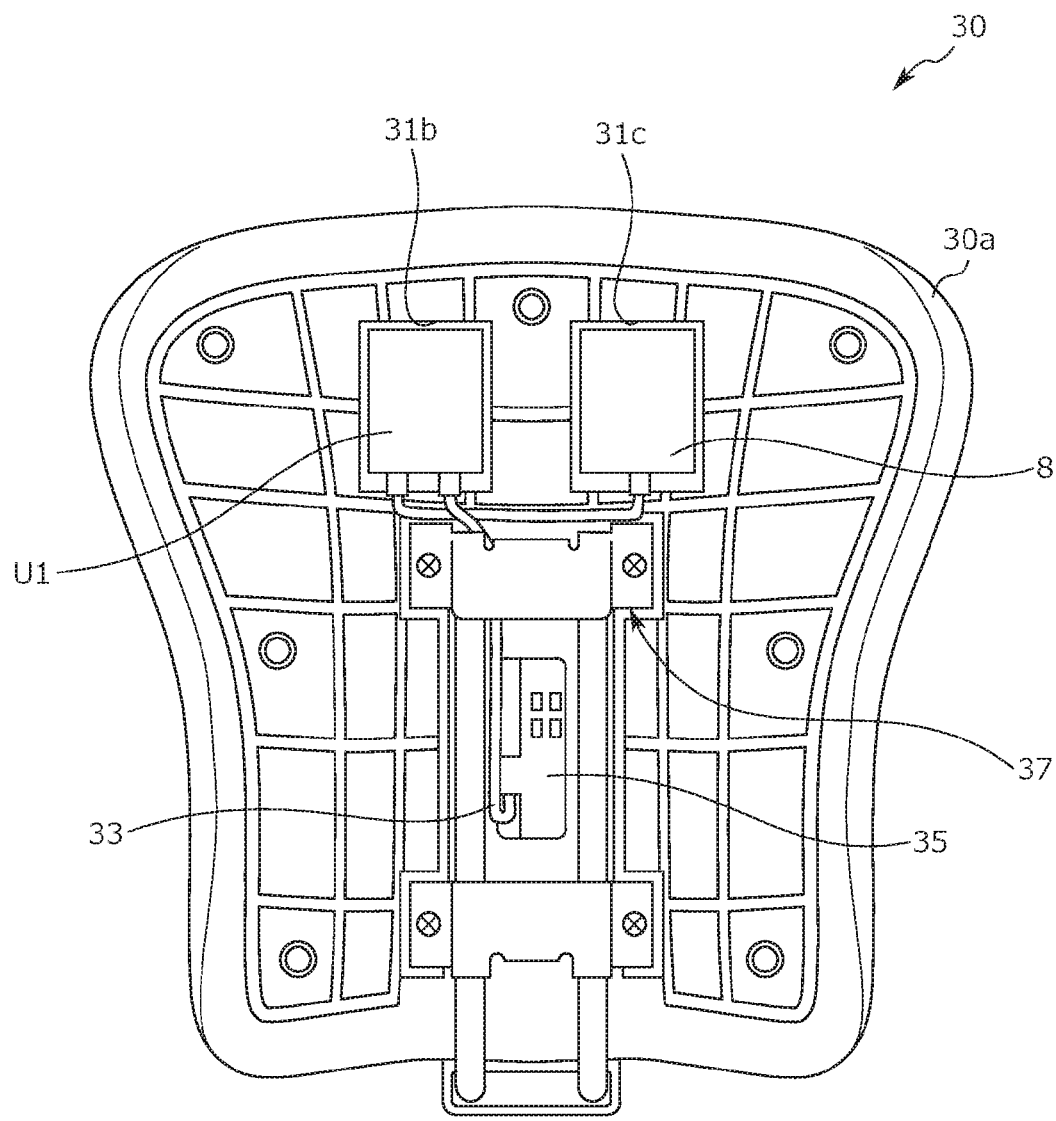
FIG. 30 is a rear schematic view showing the back surface of the backrest main body to which the vibration device, a control device, and a battery are attached.
Figure 31:
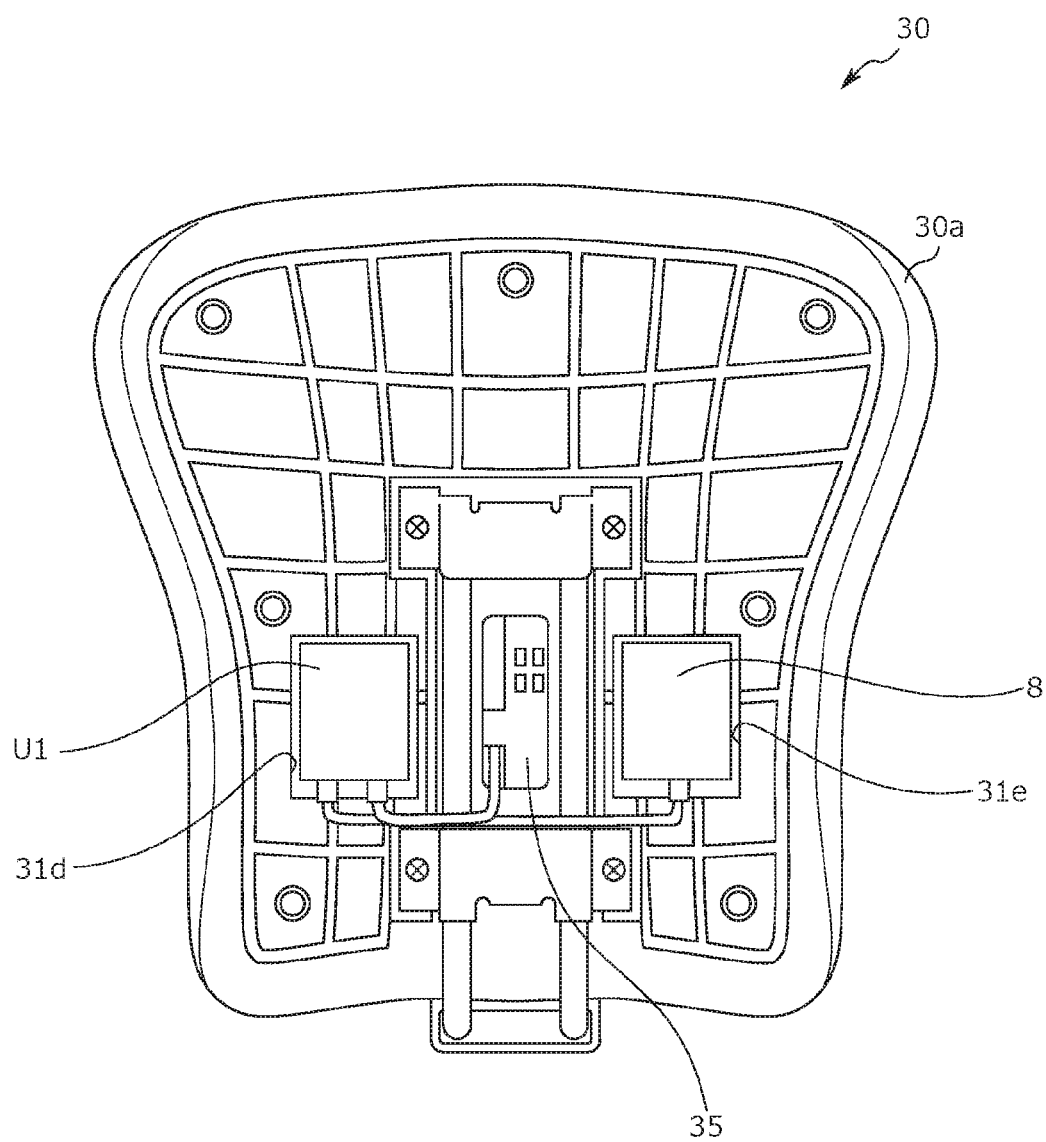
FIG. 31 is a rear schematic view showing the back surface of the backrest main body to which the control device and the battery are attached in another arrangement.
Figure 32:
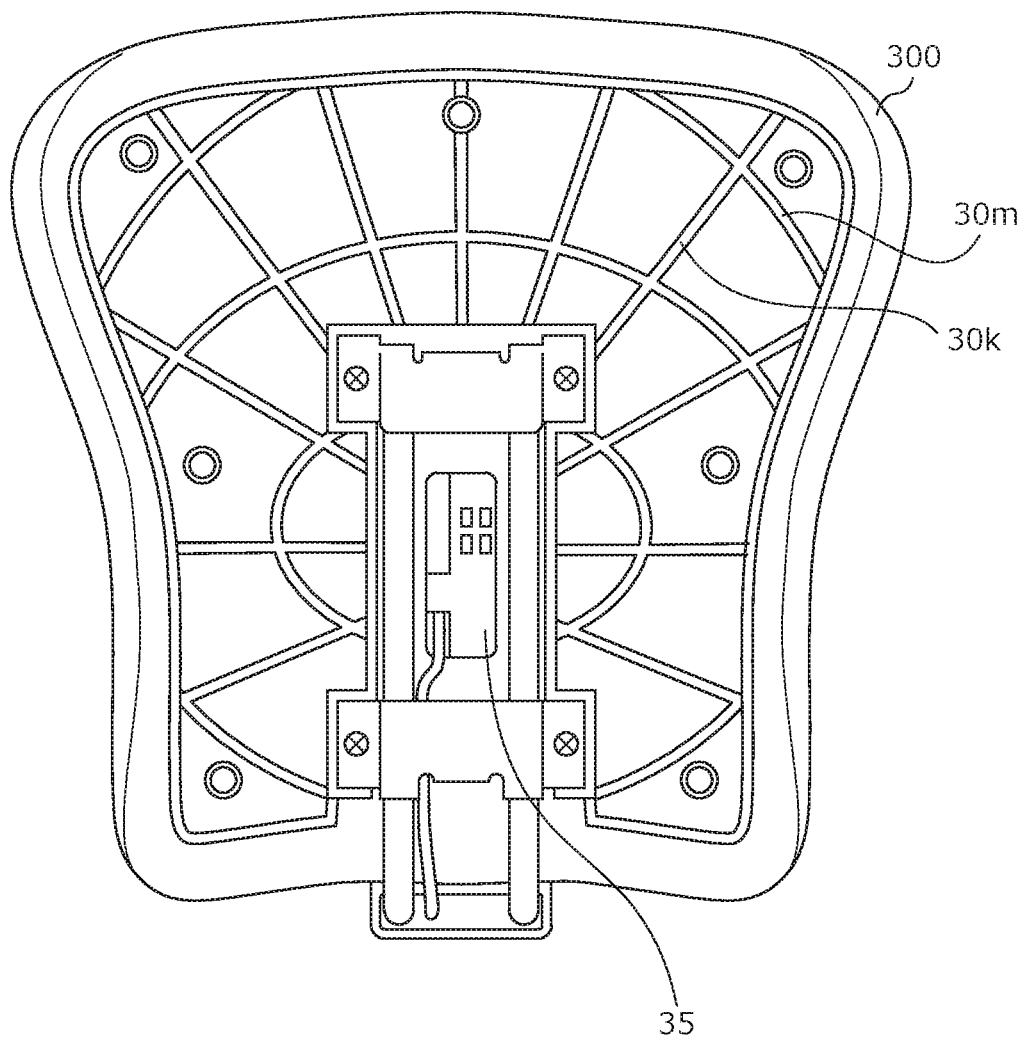
FIG. 32 is a rear schematic view showing a back surface of a back frame having ribs according to another example.

Now with reference to FIGS. 29 to 32, attachment positions of the vibration device 35, the control device U1, and the battery 8 to the back pan F22 are described. FIG. 29 is a view showing the back surface of the backrest main body 30 to which the vibration device 35 is attached. FIG. 30 is a view showing the back surface of the backrest main body 30 to which the vibration device 35, the control device U1, and the battery 8 are attached. FIG. 31 is a view showing the back surface of the backrest main body 30 to which the control device U1 and the battery 8 are attached in another arrangement. FIG. 32 is a view showing a back surface of a back frame 300 having ribs 30k, 30m according to another example.

As shown in FIG. 29, the vibration device 35 is attached on an attachment member 37 serving as a metal portion attached to a lower portion of the back frame 30a at a position to keep away from a position where a rib 30j serving as a projecting portion is formed in such a manner that the longitudinal direction of the vibration device is set in the up and down direction. Strictly speaking, since the vibration device 35 is attached to the attachment member 37, the vibration device is attached to the backrest main body 30 by attaching the attachment member 37 to the back frame 30a forming the backrest main body 30. By attaching the vibration device 35 at the position to keep away from the position where the rib 30j is formed, an increase in thickness of the back pan F22 can be suppressed.

In particular, by attaching the vibration device 35 to the metal attachment member 37, vibration generated from the vibration device 35 is propagated to the seated person via the attachment member 37. Thereby, the vibration can be effectively propagated while suppressing attenuation. Further, at least part of the vibration device 35 is preferably in contact with the back frame 30a serving as the resin portion 30c in addition to the attachment member 37. With such a configuration, since the resin portion 30c is formed over the entire backrest main body 30 as described above, the entire backrest main body 30, that is, the entire back pan F22 can be vibrated by the resin portion 30c touching the vibration device 35. Thus, the awakening effect for the seated person can be enhanced. A contact range between the seated person and the back pan F22 is wide in the up and down direction. Thus, by attaching the vibration device 35 along the contact range in such a manner that the longitudinal direction of the vibration device is set in the up and down direction, the vibration can be propagated widely in the contact range with the seated person, so that the awakening effect for the seated person can be improved.

Further, a lower portion of the back pan F22 often faces the waist portion of the seated person, and the waist portion of the seated person is hardly moved away by the posture. Therefore, by providing the vibration device 35 in the lower portion of the back pan F22, stimulation can be stably propagated to the seated person, so that the awakening effect can be improved.

The attachment member 37 is formed from an upper end portion 37a, a middle portion 37g, and a lower end portion 37b integrally formed all together, and disposed in a recess portion 31a formed in the back frame 30a.

The upper end portion 37a and the lower end portion 37b are plate shaped portions whose horizontal sections are formed in an Q shape, the portions being formed symmetrically on the upper and lower sides of the chair. In detail, the upper end portion 37a and the lower end portion 37b are formed from center parts 37c, 37e whose horizontal sections are formed in a U-shape, and both end parts 37d, 37f extending outward in the chair width direction from end portions of the center parts 37c, 37e, respectively. The attachment member 37 is fixed to a back surface of the back frame 30a at the both end parts 37d, 37f by self-tapping screws 38.

The middle portion 37g is a portion to which the vibration device 35 is attached, the portion being formed continuously to an upper end of the center part 37c in the upper end portion 37a and a lower end of the center part 37e in the lower end portion 37b, that is, the member whose vertical section is formed in a U-shape extending along the back frame 30a in the up and down direction. The middle portion 37g is formed to be spaced evenly from both ends in the chair width direction of the center parts 37c, 37e of the upper end portion 37a and the lower end portion 37b, and formed to be shorter in the chair width direction than the center parts 37c, 37e.

Each of two coupling pipes F22c is disposed between each ends of both the ends in the chair width direction of the center parts 37c, 37e of the upper end portion 37a and the lower end portion 37b and the center part 37e, and welded to the attachment member 37. That is, the vibration device 35 attached to the middle portion 37g between the two coupling pipes F22c is protected by the two coupling pipes F22c on both the sides in the chair width direction. The coupling pipes F22c correspond to a linear metal frame according to the present disclosure.

The rib 30j serving as a grid shaped vibration diffusion unit that diffuses vibration, a shielding plate that physically shields a space, and a projecting portion that enhances rigidity are formed in portions other than the central recess portion 31a on the back surface of the back frame 30a to project on the rear side in the front to back direction of the chair. By forming the rib 30j in such a way, weight can be reduced more than a portion having no space at all, so that a vibrating stimulation can be diffused without using a separate member requiring additional man-hours for attachment. A decrease in rigidity by the recess portion 31a formed for disposing the vibration device 35 and the backrest main body 30 can be suppressed by the rib 30j. Further, a vibrating stimulation generated from the vibration device 35 and transmitted to the attachment member 37 can be propagated throughout the back frame 30a by the rib 30j entirely formed in a grid shape, and can be effectively and widely diffused to the back pan F22. Thus, the awakening effect can be enhanced.

Further, in a state where the backrest cover 32 is attached to the back frame 30a, by forming a plurality of closed spaces between the rib 30j and the backrest cover 32, propagation of sound waves by vibration generated by the vibration device 35 can be blocked. Therefore, people around the legged chair S can be prevented from knowing the fact that the vibration device 35 is in operation by its sound.

The control device U1 and the battery 8 to be attached to the back surface of the cushion pan F21 is described above. However, the present disclosure is not limited to such a configuration but, for example, as shown in FIG. 30, the control device and the battery may be attached to the back surface of the back frame 30a, that is, attached to the back pan F22. In particular, the control device U1 and the battery 8 in the back frame 30a may be attached to an upper portion of the attachment member 37, and recess portions 31b, 31c may be formed in attachment portions. Bottom surfaces of the recess portions 31b, 31c are formed to be larger than abutment surfaces of the control device U1 and the battery 8. By providing the control device U1 and the battery 8 in the recess portions 31b, 31c and as described above, the vibration device 35 in the recess portion 31a in such a way, the increase in the thickness of the back pan F22 due to attachment of the vibration device 35, the control device U1, and the battery 8 can be suppressed. A space on the upper side of the attachment member 37 attached to the lower portion can be effectively utilized as an attachment space for the control device U1 and the battery 8.

If there are spaces for attaching the control device U1 and the battery 8, as shown in FIG. 31, preferably, recess portions 31d, 31e are formed at positions sandwiching the attachment member 37 in the chair width direction, and the control device U1 and the battery 8 are housed in the recess portions 31d, 31e.

With such a configuration, the spaces on the right and left sides of the vibration device 35 can be effectively utilized as the spaces for attaching the control device U1 and the battery 8. Further, a center of gravity of the back pan F22 can be set on the lower side of the attached control device U1 and the attached battery 8. Thus, weight balance of the legged chair S can be stabilized, so that the legged chair S can be less likely to fall over.

The legged chair including the grid shaped rib 30j is described in the above embodiment. However, the present disclosure is not limited to such a configuration. For example, as shown in FIG. 32, a rib 30k serving as a vibration diffusion unit which extends in a radial manner from the vicinity of the attachment member 37 to which the vibration device 35 is attached may be formed in the back frame 300. Further, an arc rib 30m serving as a vibration diffusion unit which extends in the direction crossing the rib 30k and couples the rib 30k is more preferably formed in the back frame 300. With the above configuration, vibration generated from the vibration device 35 can be propagated throughout the back frame 300 by the rib 30k extending in a radial manner. By coupling the rib 30k by the rib 30m, the vibration can be evenly propagated throughout the back frame 300.

The vibration device 35 to be attached onto the attachment member 37 corresponding to the metal portion is described in the above embodiment. However, the member in contact with the vibration device 35 is not the attachment member 37 only but the vibration device may be in direct contact with the back frame 30a. For example, a through hole is formed in part of the attachment member 37, and part of the back frame 30a is inserted into the through hole to touch the vibration device 35. By doing so, while a vibrating stimulation is enhanced by the vibration device 35 touching the attachment member 37 serving as the metal portion, by touching the back frame 30a, propagation efficiency of vibration throughout the back frame 30a can be enhanced.

Modified Example

Figure 33:
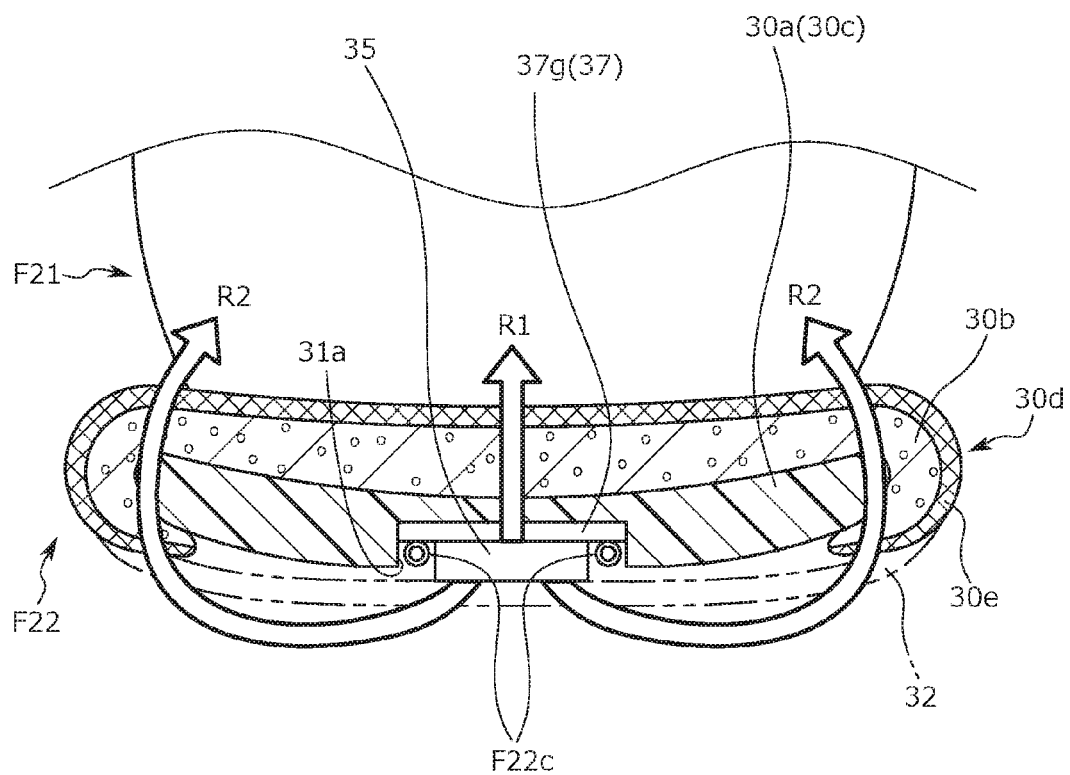
FIG. 33 is a sectional view taken along the line XXXIII-XXXIII of FIG. 1, showing arrangement of the vibration device in a back pan.
Figure 34:
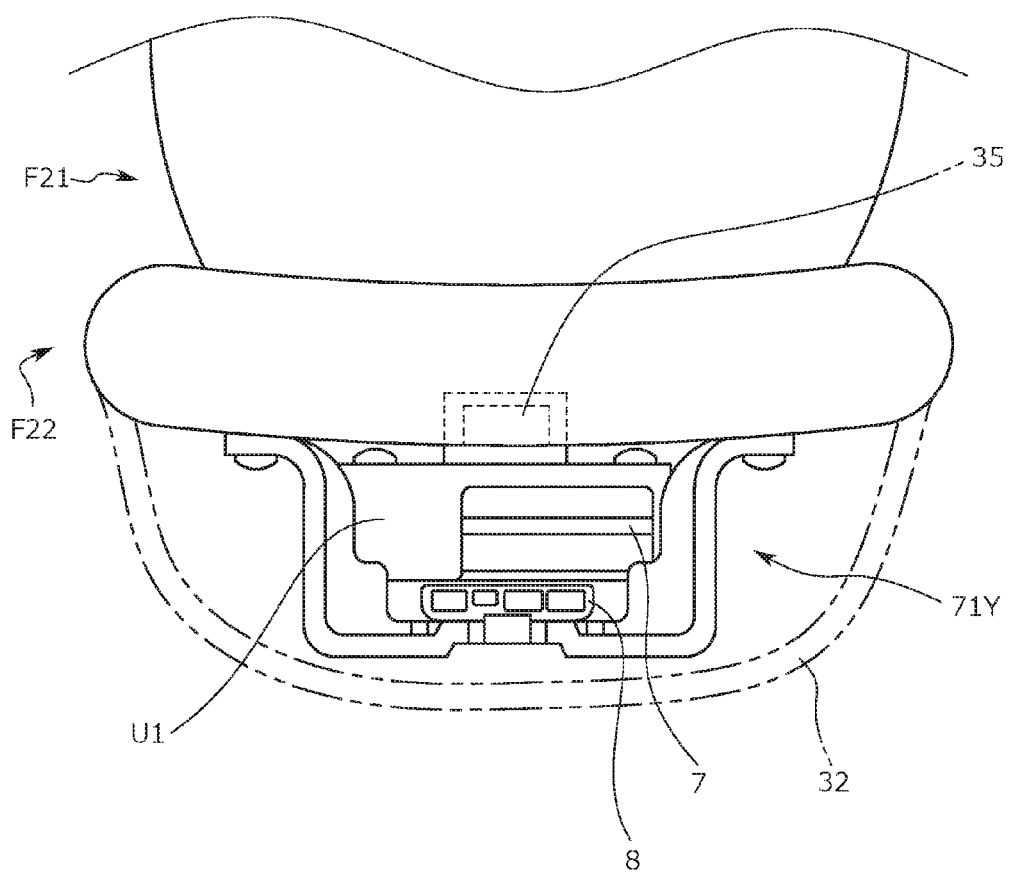
FIG. 34 is a top view showing a configuration example in which a holding cover holding the control device and the battery is attached to the back pan.

Now, a configuration according to a modified example is described with reference to FIGS. 33 and 34. FIG. 33 is a sectional view taken along the line XXXIII-XXXIII of FIG. 1, showing arrangement of the vibration device 35 in the back pan F22. FIG. 34 is a top view showing a configuration example in which a holding cover 71Y holding the vibration device 35, the control device U1, and the battery 8 is attached to the back pan F22.

In a case where the backrest cover 32 is attached to the back frame 30a, as shown in FIG. 33, preferably, the backrest cover 32 is attached to sandwich a peripheral edge portion of the pad portion 30b and a terminal 30e of the skin 30d with the back frame 30a, and the backrest cover 32 is brought into contact with the vibration device 35. With such a configuration, as propagation routes for vibration generated from the vibration device 35, as shown by arrows in FIG. 33, a route R1 running via the attachment member 37, the back frame 30a, the pad portion 30b, and the skin 30d, and a route R2 running via the backrest cover 32, the skin 30d, and the pad portion 30b can be formed. By doing so, the propagation efficiency of vibration can be improved, so that the awakening effect for the seated person can be enhanced.

Attachment of the control device U1 and the battery 8 to the back pan F22 is not limited to separate attachment as shown in FIGS. 30 and 31. For example, similar to the configuration shown in FIG. 28 in which the control device U1 and the battery 8 are unitized and attached to the cushion pan F21 by the holding cover 71, the vibration device may be attached by using the holding cover 71Y additionally holding the vibration device 35 as shown in FIG. 34. That is, as long as there is no problem in the thickness in the front to back direction of the back pan F22, the vibration device 35, the control device U1, and the battery 8 may be disposed collectively in the front to back direction. By doing so, wiring of the vibration device 35, the control device U1, and the battery 8 can be shortened, so that attachment to the back pan F22 can be more easily performed.

Sixth Embodiment

A legged chair according to a sixth embodiment of the present disclosure is a chair including an awakening device capable of suppressing a decrease in detection precision of a sensor by vibration generated from a vibration device. For efficiency of office work, regarding a legged chair including an awakening device, for example, JP A 6-253953 describes a configuration in which a vibration device (described as a vibration motor in the same patent literature) is disposed under a chair and a switch that switches ON/OFF of actions of this motor is provided. In detail, a technique described in JP A 6-253953 is to manually operate the switch by not using a sensor for detecting a doze but using a remote controller in order to favorably maintaining an awake state before falling into a doze.

In the above legged chair described in JP A 6-253953, the switch is manually switched to activate the motor. Thus, in a case of an unconscious dozing state, switching of the switch may sometimes be failed. It is thought that when determining a doze of the seated person, a person other than the seated person switches the switch by using the remote controller. However, the person other than the seated person does not always easily confirm the state before a doze, and unless always monitoring the seated person, the motor cannot easily appropriately be activated.

As described in JP A 2013-220810, by detecting the body signals by using the heartbeat sensor or the breathing sensor, the state before a doze can be detected. However, since vibration by a vibration device influences the heartbeat sensor or the breathing sensor, detection values of the body signals may sometimes include erroneous values, and determination precision of an awake state after activating the vibration device may sometimes be decreased. Since a contact surface between the seated person and the chair is changed by the posture of the seated person seated in the legged chair, vibration of the vibration device may sometimes be not easily propagated to the seated person.

In a case where a sensor, the vibration device and a control device, and a battery forming an awakening device are attached to the legged chair, there is a problem that a task thereof is troublesome.

Further, in a case where the vibration device described in JP A 6-253953 is attached to a front portion of the chair, legs of the seated person positioned on the front side of the chair may sometimes be abutted with the vibration device and the seated person may feel uncomfortable. Therefore, an attachment position of the vibration device is a problem.

A legged chair S according to the sixth embodiment of the present disclosure for solving these problems, and an ECU 7, a battery 8, and a holding cover 76 holding these provided in the legged chair S is described with reference to the drawings.

Figure 35:
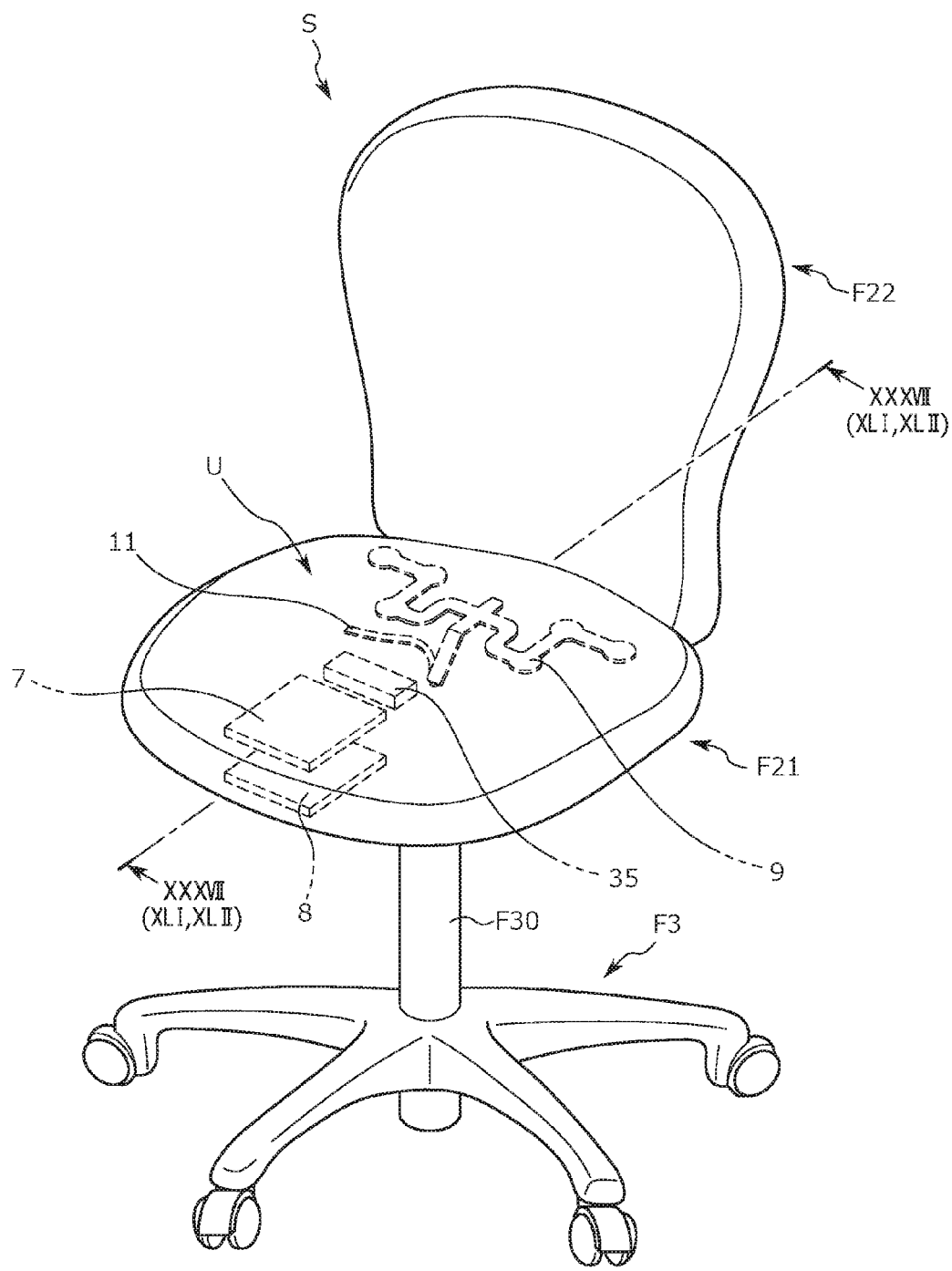
FIG. 35 is a perspective, schematic view of a legged chair according to a sixth embodiment of the present disclosure.
Figure 36:
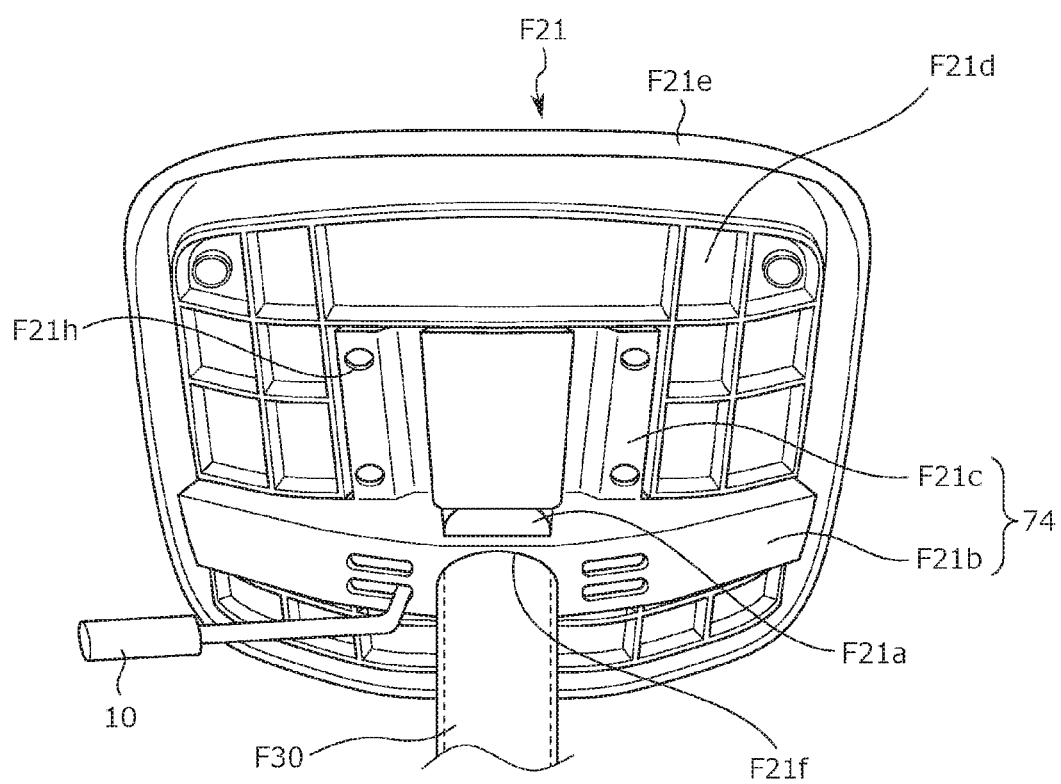
FIG. 36 is a lower side perspective view showing a lower surface of a cushion pan to which a holding cover is attached.
Figure 37:
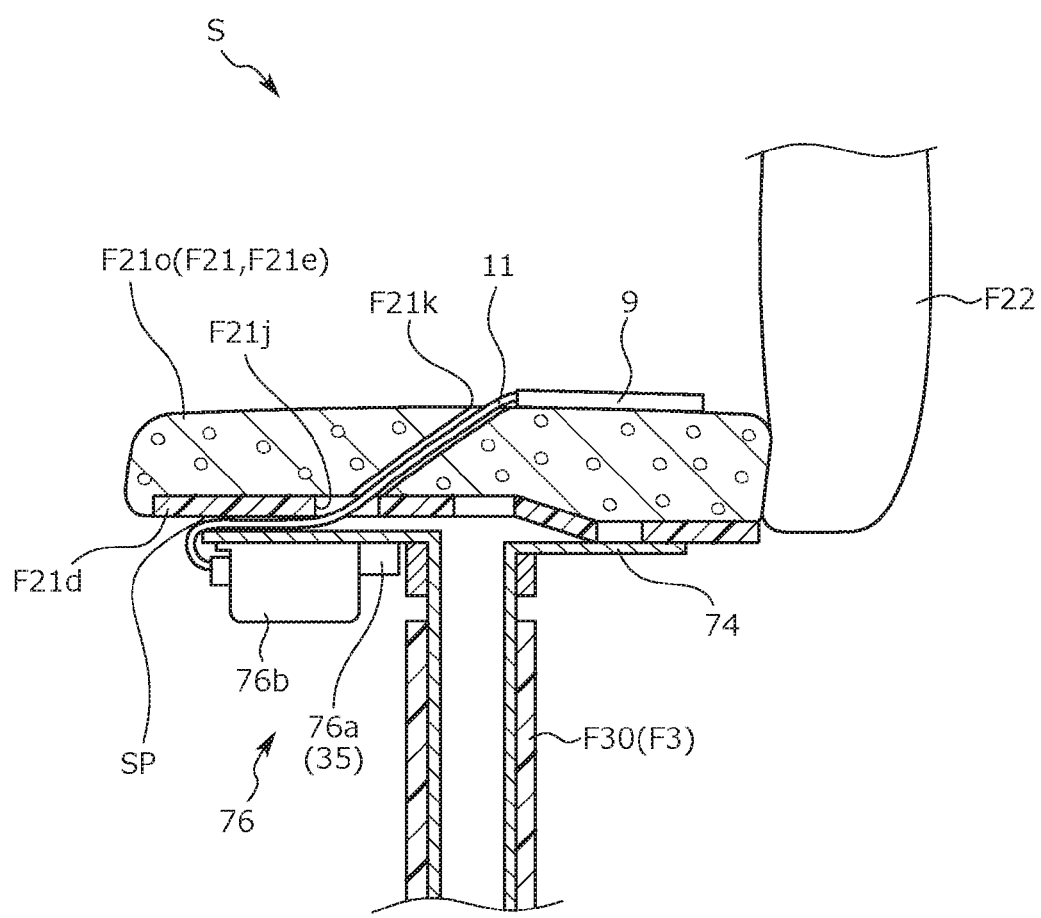
FIG. 37 is a schematic sectional view taken along the line XXXVII-XXXVII of FIG. 35.
Figure 38:
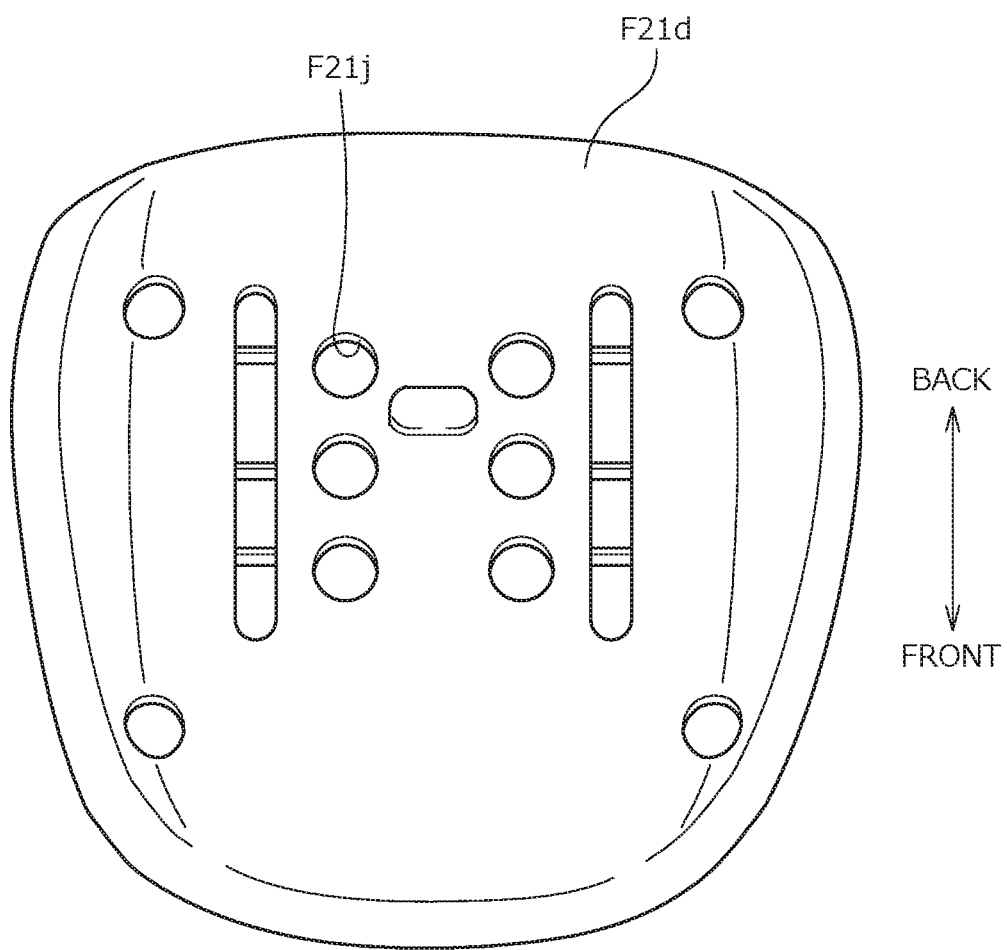
FIG. 38 is a top view showing a resin plate.

With reference to FIGS. 35 to 38, a main configuration of the legged chair S of the sixth embodiment is described. FIG. 35 is an perspective schematic view of the legged chair S according to the sixth embodiment of the present disclosure. FIG. 36 is a lower side perspective view showing a lower surface of a cushion pan F21 to which the holding cover 76 is attached. FIG. 37 is a schematic sectional view taken along the line XXXVII-XXXVII of FIG. 35. FIG. 38 is a top view showing a resin plate F21d.

A pad portion F21e with a skin provided in the legged chair S according to the present embodiment is formed from a pad portion F21o, and a skin 44 covering the pad portion F21o (refer to FIG. 42), and a breathing sensor 9 is disposed between the skin 44 and the pad portion F21o. In FIG. 37, and FIGS. 41, 44, 46, and the like described below, the pad portion F21e with the skin is shown while the skin 44 is omitted.

As shown in FIG. 37, the ECU 7 forming an awakening device U is attached on the lower surface side of the cushion pan F21 by a component accommodation portion 76b formed in a front portion of the holding cover 76. A vibration device 35 is attached on the lower surface side of the cushion pan F21 by a motor accommodation portion 76a formed in a rear portion of the holding cover 76. By providing the awakening device U including the vibration device 35 in the cushion pan F21 serving as a seated portion in such a way, these can be attached to a chair having no backrest. The battery 8 according to the present embodiment is attached in a front portion holding cover 76 to overlap on the lower side of a control device U1.

Attachment of ECU, Battery, and Vibration Device

Figure 39:
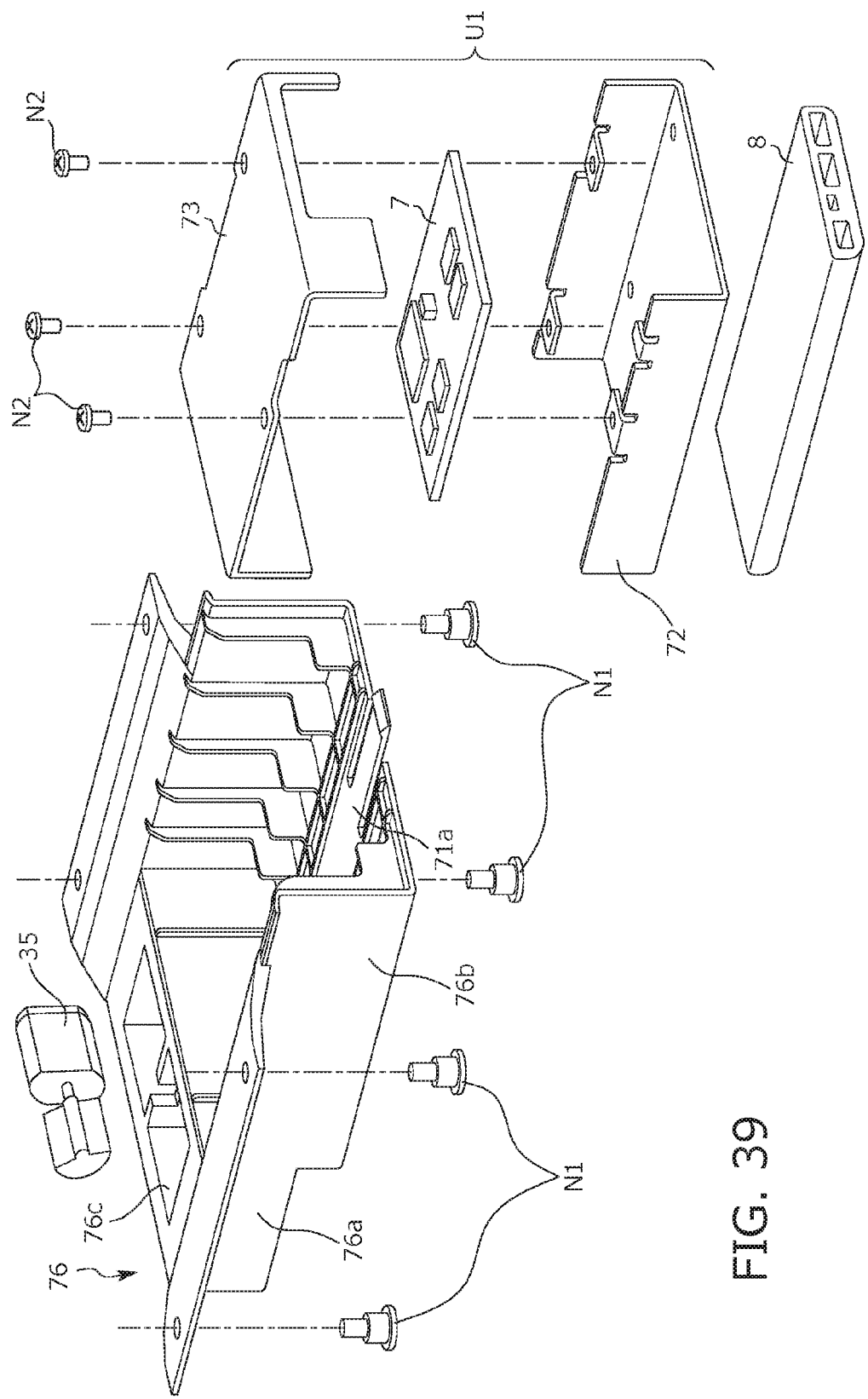
FIG. 39 is an exploded perspective view of a control device, a battery, a vibration device, the holding cover, and the like which are attached to the legged chair.
Figure 40:
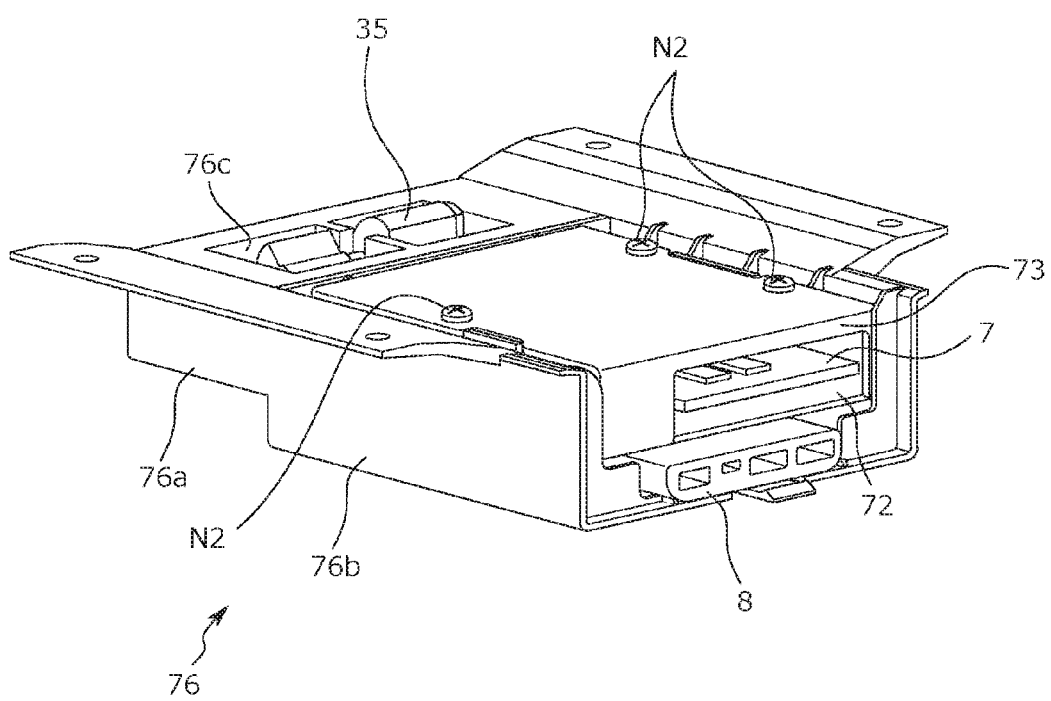
FIG. 40 is a perspective view showing the holding cover in a state of holding the control device, the battery, and the vibration device.

Now, with reference to FIGS. 39 and 40 in addition to FIGS. 35 to 38, attachment of the ECU 7, the battery 8, and the vibration device 35 is described. FIG. 39 is an exploded perspective view of the control device U1, the battery 8, the vibration device 35, the holding cover 76, and the like which are attached to the legged chair S. FIG. 40 is a perspective view showing the holding cover 76 in a state of holding the control device U1, the battery 8, and the vibration device 35.

In the present embodiment, the ECU 7 is covered with and supported by a base member 72 and a cover member 73, and together with the battery 8, held by the component accommodation portion 76b of the holding cover 76 and attached to an upper side frame portion F21c.

As shown in FIGS. 39 and 40, in the holding cover 76 according to the present embodiment, a motor accommodation hole 76c opened upward is formed on the rear side in the front to back direction of the chair partitioned from a housing recess groove 71a by a wall. The vibration device 35 is accommodated in and held by this motor accommodation hole 76c. By accommodating and holding the vibration device 35 in the motor accommodation hole 76c formed on the rear side of the control device U1 and the battery 8, an increase in thickness of a back pan F22 can be suppressed in comparison to a case where the vibration device is disposed to overlap the control device U1 and the battery 8 in the up and down direction. That is, extension of the back pan F22 to the lower side where legs of the seated person are placed can be suppressed.

In such a way, the control device U1, the battery 8, and the vibration device 35 unitized by being held by the holding cover 76 is collectively and easily attached to a lower surface of the resin plate F21d at positions to keep away from a support post F21a by self-tapping screws N1. By providing the control device U1, the battery 8, the vibration device 35, and the like at the positions to keep away from the support post F21a, these can be more easily attached. By disposing the control device U1, the battery 8, and the vibration device 35 by the holding cover 76, cables and harnesses (not shown) connecting these can be shortened, so that these can be more easily connected and a fear of generating disconnection can be reduced.

The vibration device 35 attached on the lower side of the resin plate F21*d* as described above is provided at a different position which is a position distant from the breathing sensor 9 on an upper surface of the pad portion F21*o*. Therefore, an influence of vibration generated by the vibration device 35 on detection precision of the breathing sensor 9 can be suppressed more than a case where the vibration device 35 and the breathing sensor 9 are provided to overlap with each other. By providing the vibration device 35 on the front side in the front to back direction of the chair with respect to the breathing sensor 9, even in a case where the seated person is seated in a front edge, a vibrating stimulation is easily transmitted, so that a decrease in the awakening effect due to the posture of the seated person can be suppressed.

Further, by providing the vibration device 35 in a front portion of the cushion pan F21, in particular, on the front side of the support post F21*a*, for example, the seated person can easily touch the vibration device 35 in a state where the seated person remains seated, so that the maintenance property is improved. By attaching the holding cover 76 holding the vibration device 35 and the like to the upper side frame portion F21*c* formed to protrude upward with respect to a lower side frame portion F21*b*, the upper side frame portion corresponding to a dent according to the present disclosure, an increase in thickness of the cushion pan F21 can be prevented. In other words, a space on the lower side of the cushion pan F21 where legs of the seated person are placed can be increased.

Further, the holding cover 76 that stores the control device U1, the battery 8, and the vibration device 35 is provided at a position to keep away from a movable range of an operation lever 10. Therefore, disturbance of operations of the operation lever 10 by the holding cover 76 can be avoided.

First Modified Example

Figure 41:
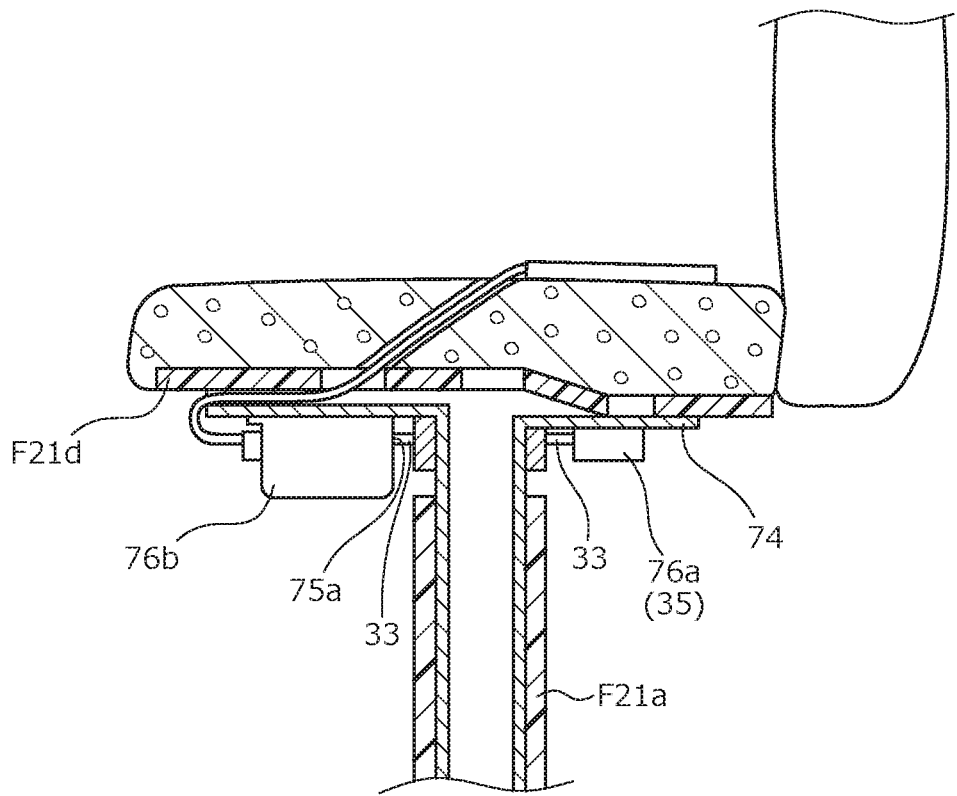
FIG. 41 is a sectional view taken along the line XLI-XLI of FIG. 35, showing arrangement of the vibration device according to a first modified example.
Figure 42A:
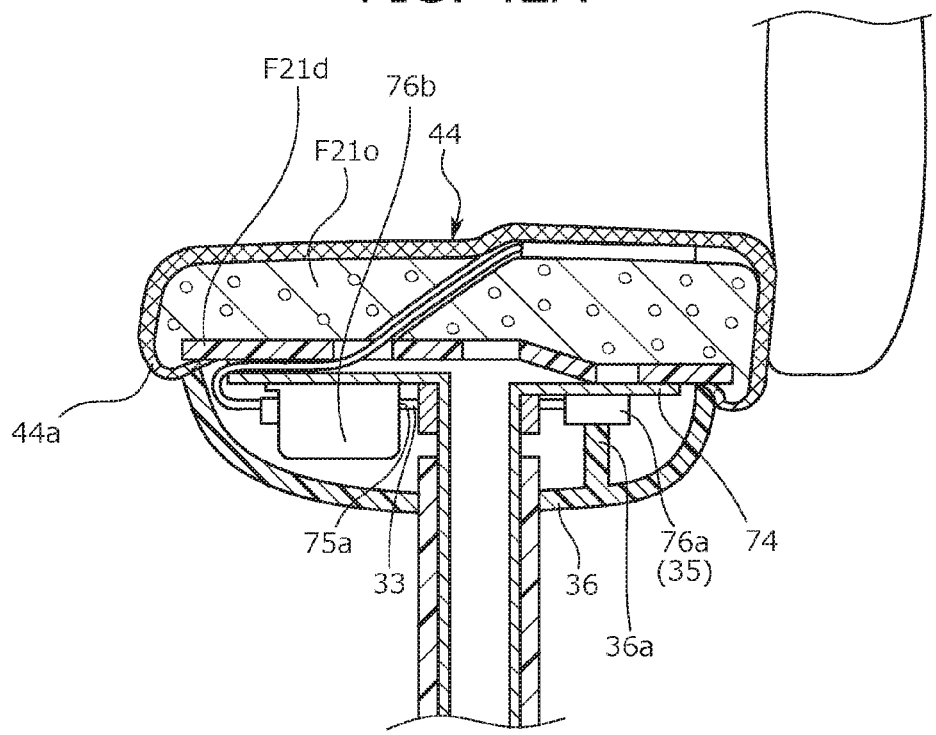
FIG. 42A is a sectional view taken along the line XLII-XLII of FIG. 35 in a state where a seated portion cover is attached to a pad portion with a skin.
Figure 42B:
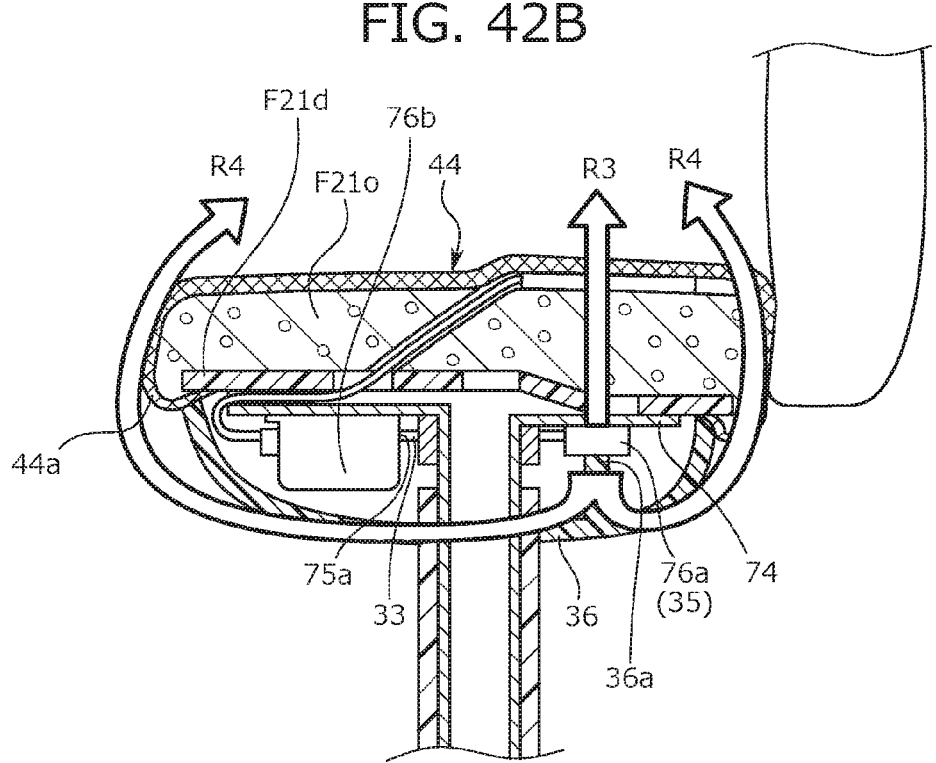
FIG. 42B is an illustration showing a state where vibration is propagated from the vibration device via the seated portion cover.

Now, with reference to FIGS. 41 and 42, arrangement of the vibration device 35 according to a first modified example is described. FIG. 41 is a sectional view taken along the line XLI-XLI of FIG. 35, showing the arrangement of the vibration device 35 according to the first modified example. FIG. 42A is a sectional view taken along the line XLII-XLII of FIG. 35 in a state where a seated portion cover 36 is attached to the pad portion F21*e* with the skin. FIG. 42B is an image view showing a state where vibration is propagated from the vibration device 35 via the seated portion cover 36.

In the example shown in FIG. 41, the motor accommodation portion 76*a* is separated from the component accommodation portion 76*b*, and attached to a portion on a lower surface of a seated portion frame 74 on the rear side of the support post F21*a*. An opening hole 75*a* is formed on a rear side wall of the component accommodation portion 76*b*. The vibration device 35 and the ECU 7 are connected by a harness 33 passing through this opening hole 75*a*. By providing the vibration device 35 accommodated in the motor accommodation portion 76*a* on the rear side of the support post F21*a* in such a way, legs of the seated person on the front side of the support post F21*a* do not easily touch the vibration device 35 and the motor accommodation portion 76*a* on the rear side of the support post F21*a*, so that an uncomfortable feeling of the seated person can be suppressed.

Further, by arranging the motor accommodation portion 76*a* on the rear side in the front to back direction of the chair with respect to the support post F21*a*, the component accommodation portion 76*b* disposed on the front side of the support post F21*a* can be arranged on the rear side as the component accommodation portion 76*b* is not connected to the motor accommodation portion 76*a*. Thus, since the component accommodation portion 76*b* can be arranged on the rear side, a front side space on the lower side of the cushion pan F21 can be ensured. Therefore, the component accommodation portion 76*b* can be suppressed from narrowing the front side space where legs of the seated person are placed on the lower side of the cushion pan F21.

Since the motor accommodation portion 76*a* accommodating the vibration device 35 is disposed at a different position from the component accommodation portion 76*b* accommodating the ECU 7 and the battery 8, excessive vibration applied to the ECU 7 and the battery 8 can be suppressed. Therefore, the ECU 7 and the battery 8 can function more stably. Since the vibration device 35 is not provided to overlap with the ECU 7 or the battery 8, the increase in the thickness of the cushion pan F21 can be suppressed.

As shown in FIG. 42A, the seated portion cover 36 covering the motor accommodation portion 76*a* and the component accommodation portion 76*b* may be attached onto the lower surface of the resin plate F21*d*. The seated portion cover 36 is formed in a bowl shape, and attached to sandwich a peripheral edge portion of the pad portion F21*o* and a terminal 44*a* of the skin 44 covering the pad portion F21*o* with at least part of the resin plate F21*d*. A projection 36*a* is formed in part of the seated portion cover 36 on the inner side. The seated portion cover 36 is formed in such a manner that the projection 36*a* is in contact with the motor accommodation portion 76*a* in a state where the seated portion cover is attached to the resin plate F21*d*.

With such a configuration, as propagation routes for vibration generated from the vibration device 35, as shown by arrows in FIG. 42B, a route R3 running via the seated portion frame 74, the resin plate F21*d*, the pad portion F21*o*, and the skin 44, and a route R4 running via the seated portion cover 36 having the projection 36*a*, the skin 44, and the pad portion F21*o* can be formed. By doing so, the propagation efficiency of vibration throughout the cushion pan F21 can be enhanced.

In the above embodiment, by attaching the vibration device 35 in contact with the metal seated portion frame 74 corresponding to the metal portion and the projection 36*a* of the seated portion cover 36, the propagation efficiency of vibration can be enhanced. Further, the members in contact with the vibration device 35 are not only the seated portion frame 74 and the seated portion cover 36 but the at least part of the resin plate F21*d* may be in contact. For example, a through hole may be formed in part of the seated portion frame 74, and part of a projecting portion formed in the resin plate F21*d* may be inserted into the through hole to touch the vibration device 35. While a vibrating stimulation is enhanced by the vibration device 35 touching the seated portion frame 74 which serves as the metal portion, by the vibration device touching the resin plate F21*d* in such a way, the propagation efficiency of vibration throughout the cushion pan F21 can be enhanced.

Second Modified Example

Figure 43:
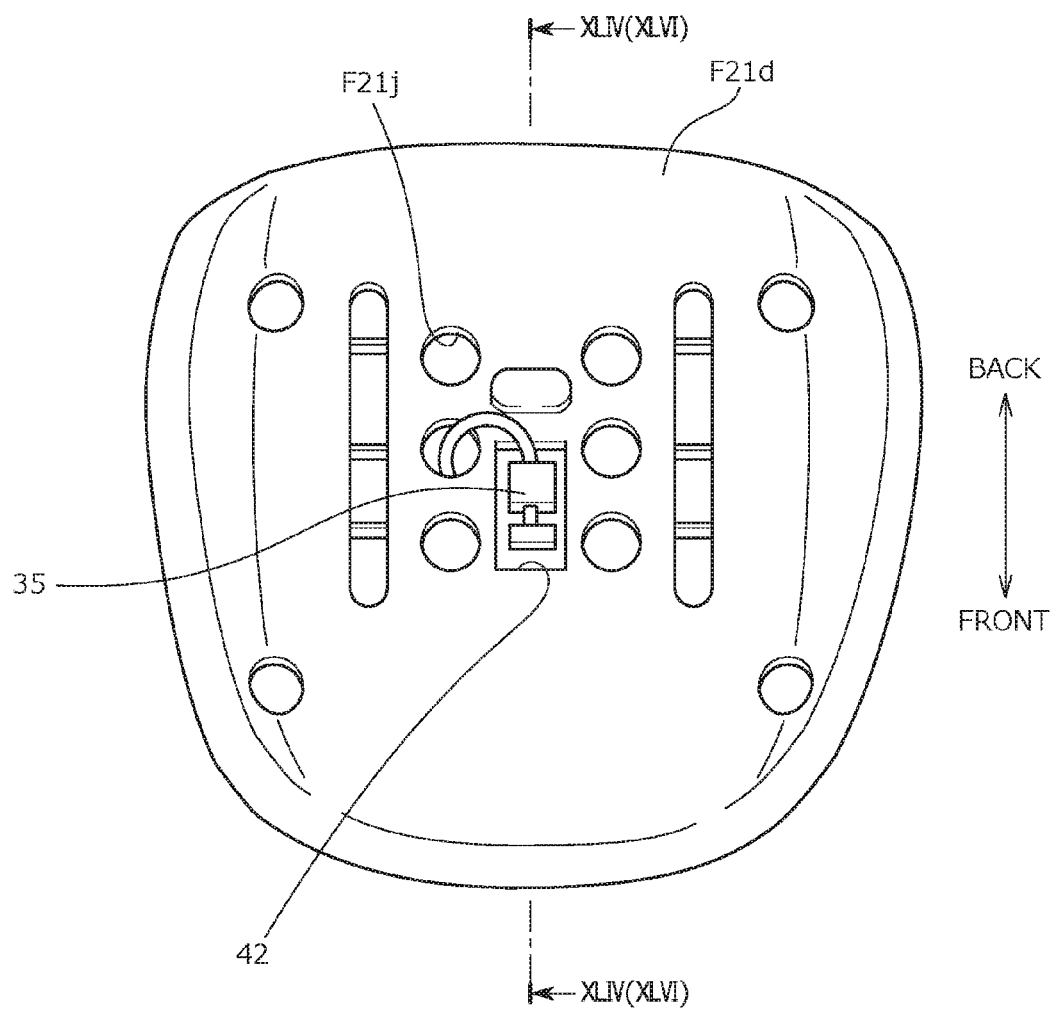
FIG. 43 is a top view showing the resin plate in which the vibration device is mounted on an upper portion according to a second modified example.
Figure 44:
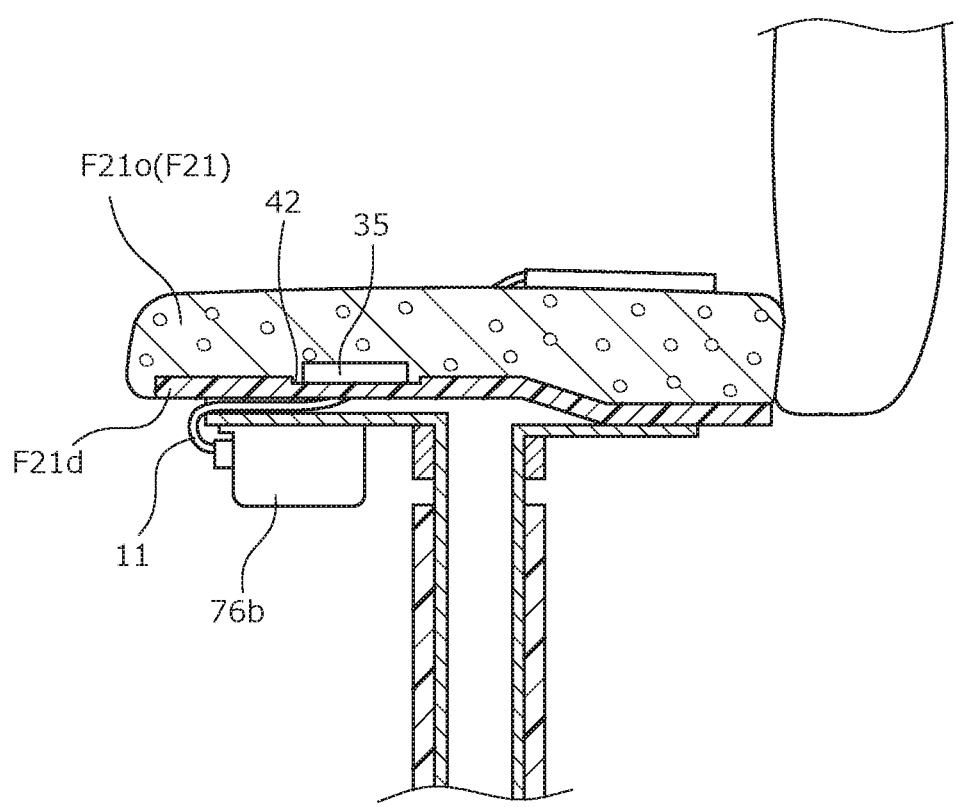
FIG. 44 is a sectional view taken along the line XLIV-XLIV of FIG. 43.

Now, with reference to FIGS. 43 and 44, arrangement of the vibration device 35 according to a second modified example is described. FIG. 43 is a top view showing the resin plate F21*d* in which the vibration device 35 is mounted on an upper portion according to the second modified example. FIG. 44 is a sectional view taken along the line XLIV-XLIV of FIG. 43.

In a center of an upper surface of the resin plate F21d according to the second modified example, a recess portion 42 on which the vibration device 35 is mounted is formed. In detail, the recess portion 42 is formed to have a horizontal area larger than the vibration device 35 with such depth that part of the vibration device 35 is housed. By mounting the vibration device 35 on the upper surface of the resin plate F21d and disposing the vibration device 35 nearer to the seated person seated in the cushion pan F21 than the other embodiments in such a way, attenuation of vibration until the vibration is propagated to the seated person can be suppressed. By arranging the vibration device 35 on the recess portion 42, a local increase in the thickness of the cushion pan F21 can be prevented, so that the seated person seated in the cushion pan F21 can be suppressed from feeling uncomfortable.

Third Modified Example

Figure 45:
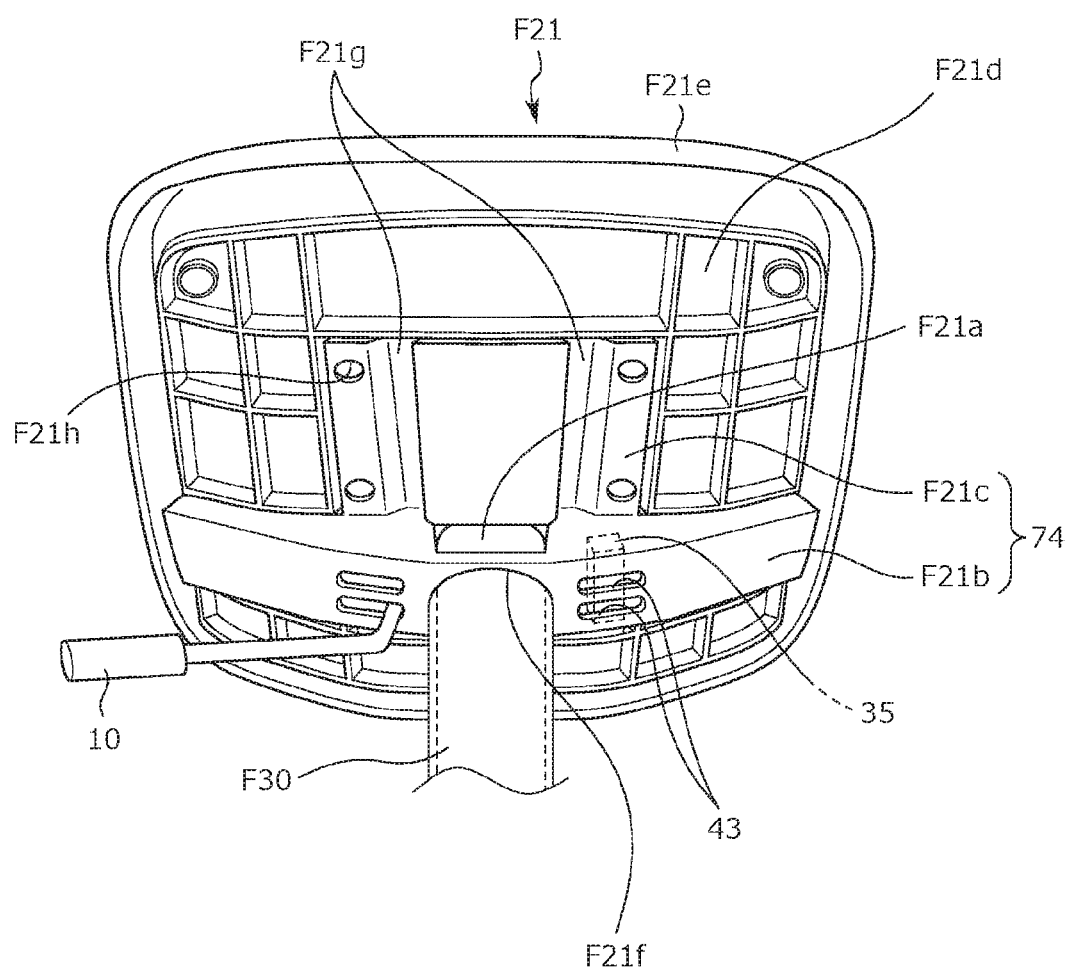
FIG. 45 is a lower side perspective view showing a lower surface of a cushion pan, showing a configuration in which the vibration device is disposed between a seated portion frame and the resin plate according to a third modified example.

Now, with reference to FIG. 45, arrangement of the vibration device 35 according to a third modified example is described. FIG. 45 is a lower side perspective view showing a lower surface of the cushion pan F21, showing a configuration in which the vibration device 35 is disposed between the seated portion frame 74 and the resin plate F21d according to the third modified example.

The lower side frame portion F21b in the seated portion frame 74 according to the present modified example is formed to have a U-shaped section and have an upper side space with the resin plate F21d. In the lower side frame portion F21b, through holes 43 into which the operation lever 10 is inserted are formed on both the sides in the chair width direction in such a manner that the operation lever 10 can be attached on any of both the sides in the chair width direction. The through holes 43 are connected to the upper side space of the lower side frame portion F21b, and two through holes are formed in the front to back direction on each of both the sides in the chair width direction. The vibration device 35 is disposed in the upper side space of the lower side frame portion F21b on the opposite side of the one side in the chair width direction where the operation lever 10 is attached (in a gap between the lower side frame portion F21b forming the seated portion frame 74 and the resin plate F21d serving as a plate member). The vibration device 35 is disposed at a position to be exposed downward from the through holes 43.

By disposing the vibration device 35 not on the lower side of the lower side frame portion F21b but in the upper side space of the lower side frame portion F21b (in the gap with the resin plate F21d serving as the plate member) in such a way, the gap can be effectively utilized, and a space where legs of the seated person are placed is not narrowed. By providing the vibration device 35 in the gap between the lower side frame portion F21b of the seated portion frame 74 extending to the right and the left of the support post F21a and the resin plate F21d, vibration can be propagated widely in the right and left direction of the support post F21a. Further, by attaching the vibration device 35 to the seated portion frame 74 extending in the chair width direction and the front to back direction, vibration generated from the vibration device 35 can be effectively propagated throughout the cushion pan F21 via the seated portion frame 74. Further, by exposing the vibration device 35 downward by the through holes 43, a state of the vibration device 35 can be observed. For example, a state where the vibration device 35 is not activated due to failure of connection to the harness 33 can be visually confirmed.

The vibration device 35 may be provided at a position to keep away from the movable range of the operation lever 10, in particular, may be attached on the upper side of the lower side frame portion F21b on the one side in the chair width direction where the operation lever 10 is attached. With such a configuration, when the seated person operates the operation lever 10, contact with the vibration device 35 can be suppressed. The space of the legged chair S can be effectively utilized. Thus, when a hand is inserted into one side in the right and left direction of the chair at the time of maintenance of the vibration device 35, disturbance of the maintenance can be avoided due to the operation lever 10 being placed on the opposite side. Further, the vibration device 35 may be attached on each of both the sides in the chair width direction on the upper side of the lower side frame portion F21b. By doing so, since vibration can be propagated widely in the chair width direction, an influence on propagation of vibration by the seating posture can be suppressed, so that the seated person can be kept awake stably. Further, even when one of the vibration devices 35 fails but the other vibration device 35 can be activated, an awakening function can be maintained.

Fourth Modified Example

Figure 46:
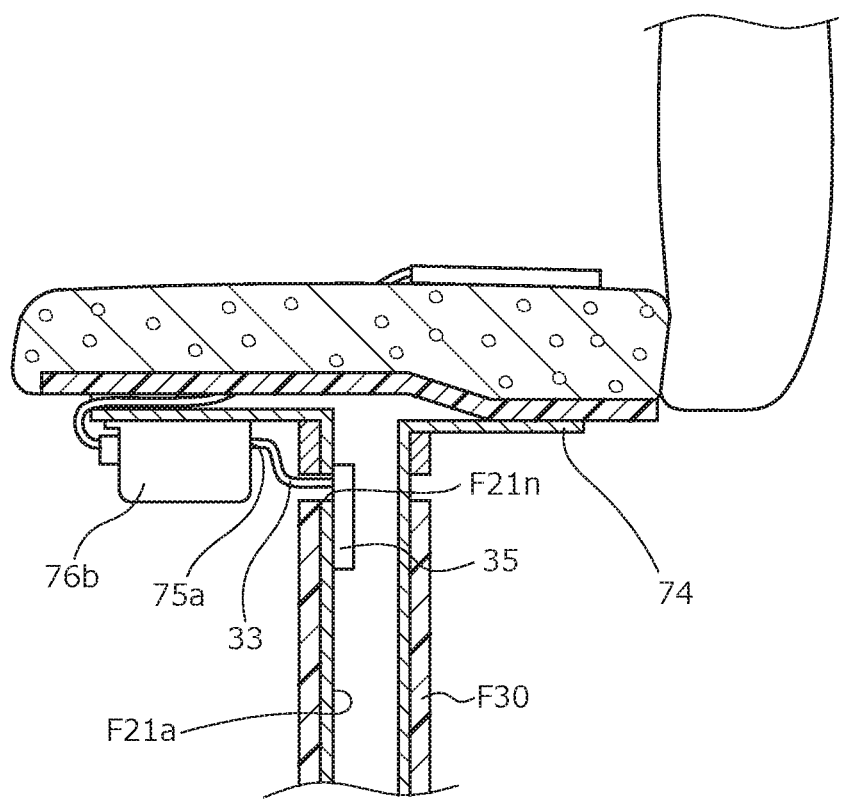
FIG. 46 is a sectional view taken along the line XLVI-XLVI of FIG. 43 for illustrating arrangement of the vibration device according to a fourth modified example, the view showing a configuration in which the vibration device is arranged at a different position from the position shown in FIG. 43.

Now, with reference to FIG. 46, arrangement of the vibration device 35 according to a fourth modified example is described. FIG. 46 is a sectional view taken along the line XLVI-XLVI of FIG. 43 for illustrating the arrangement of the vibration device 35 according to the fourth modified example, the view showing a configuration in which the vibration device 35 is arranged at a different position from the position shown in FIG. 43.

The vibration device 35 according to the present modified example is attached to an inner surface of the support post F21a. In particular, a through hole F21n through which the harness 33 passes is formed in a portion of the support post F21a facing the component accommodation portion 76b. With such a configuration, vibration generated from the vibration device 35 is propagated to the seated person via the support post F21a, the seated portion frame 74 formed integrally with the support post F21a, and the pad portion F21e with the skin. This vibration is propagated throughout the substantially entire surface of the pad portion F21e with the skin by the seated portion frame 74. Thus, the awakening effect by a vibrating stimulation can be enhanced. Since the vibration device 35 is not exposed to the exterior of the legged chair S, a space where legs of the seated person are placed is not narrowed. By combining the configurations of the above embodiments, a plurality of vibration devices 35 may be provided at the positions.

Seventh Embodiment

A chair according to a seventh embodiment of the present disclosure is a chair capable of avoiding an uncomfortable feeling of the seated person by heat generated from an awakening device. As described above, JP A 2013-220810 describes the technique of providing a vibrating stimulation to the seated person by using a vehicle seat including a heartbeat sensor or a breathing sensor, and an electric device such as a motor. JP A 2014-180415 describes a chair including air cells functioning as a cushion material, and a control device (described as a control unit in the same patent literature) that controls supply and discharge of the air to and from the air cells in a stated portion. This control device is provided on the seating surface side of a seated portion frame (described as a base portion in the same patent literature), and covered with a cover (described as a front side support portion in the same patent literature) from the upper side. JP T 2006-503599 describes the technique of, in order to correct the posture of the seated person, arranging the sensor on the seating surface of the legged chair, attaching the control unit including the battery and the control device, and a cover covering these to a lower surface of a seated portion of the chair (described as a seating portion in the same patent literature), and detecting the posture of the seated person on the basis of presence or absence of the sensor detection signal.

However, in a case where an electric device is attached to a legged chair, unlike the vehicle seat described in JP A 2013-220810 in which the electric device can be disposed inside the vehicle, an attachment space for a battery, an ECU (Electrical Control Unit), and the like is not easily ensured. In a case where an awakening device is attached to a legged chair, unlike a case of attaching to the vehicle seat in which the electric device can be disposed inside the vehicle, a control device and a battery forming the awakening device have to be arranged in the vicinity of the seated person.

In a case where a control device forming an awakening device is attached, it is thought that these are covered with a cover for protecting the control device. However, for example when the control device is covered with the cover as described in JP A 2014-180415 and JP T 2006-503599, heat generated from the control device is kept in the cover, and a temperature of the chair may sometimes be increased. Therefore, when the seated person touches part of the chair whose temperature is increased by receiving heat due to activation of the control device, the seated person may sometimes feel uncomfortable.

In a case where the cover is attached for protecting and thermally insulating the control device, the battery, and the like, there is a problem that an outer form of the chair is increased in size by the cover. In a case where the cover is attached, the control device, the battery, and the like covered with the cover are not easily touched, and there is a problem that a maintenance task is not easily performed. In particular, in a case where the cover covers the battery, the cover has to be removed for replacement of the battery. Thus, the battery is not easily replaced. In a case where the battery is a rechargeable battery, a charging cable connected to a charging jack and taken out from the cover may sometimes disturb a person passing by a peripheral part of the chair. Further, in a case where a harness or a cable is plugged into the control device or the battery in the cover through the cover, there is a problem that the harness or the cable is hanged on an object passing by the peripheral part of the chair or an object placed in the peripheral part and removed. When the chair has no display unit, an activation state, a stop state, or the like of the awakening device cannot be confirmed. Thus, the awakening device is not easily used.

A legged chair Sc according to the seventh embodiment of the present disclosure for solving these problems, an ECU 7, a battery 8, and a holding cover 71Z holding these provided in the legged chair Sc, and a seated portion cover 51 covering these is described with reference to the drawings.

Figure 47:
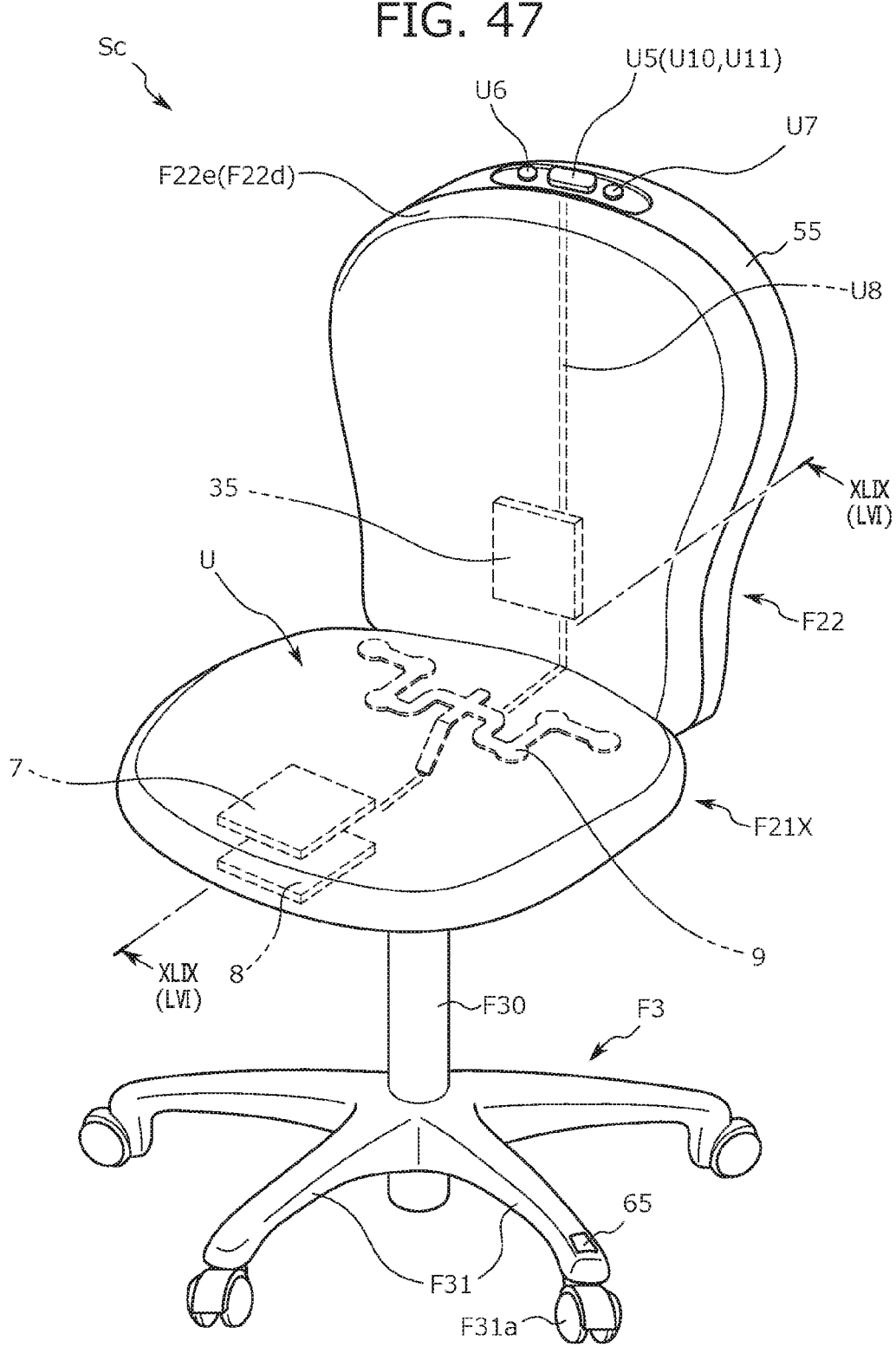
FIG. 47 is a perspective, schematic view of a legged chair according to a seventh embodiment of the present disclosure.
Figure 48:
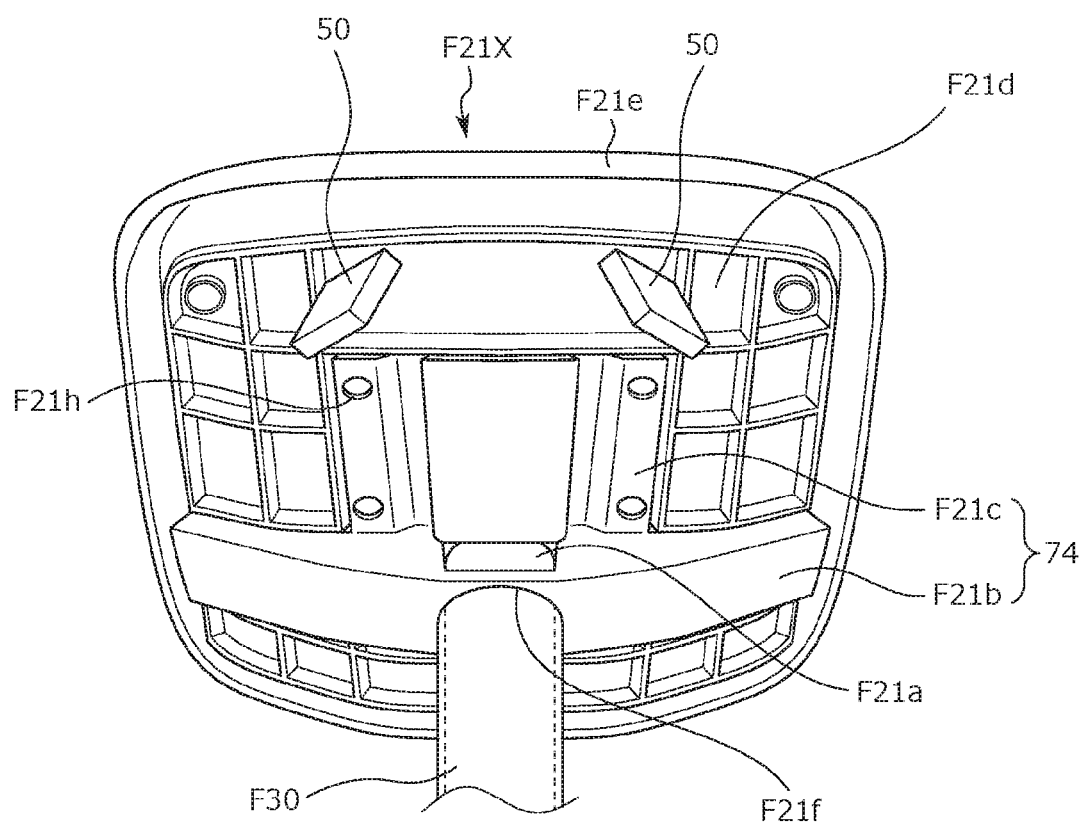
FIG. 48 is a lower side perspective view showing a lower surface of a cushion pan to which a holding cover and a seated portion cover are attached.
Figure 49:
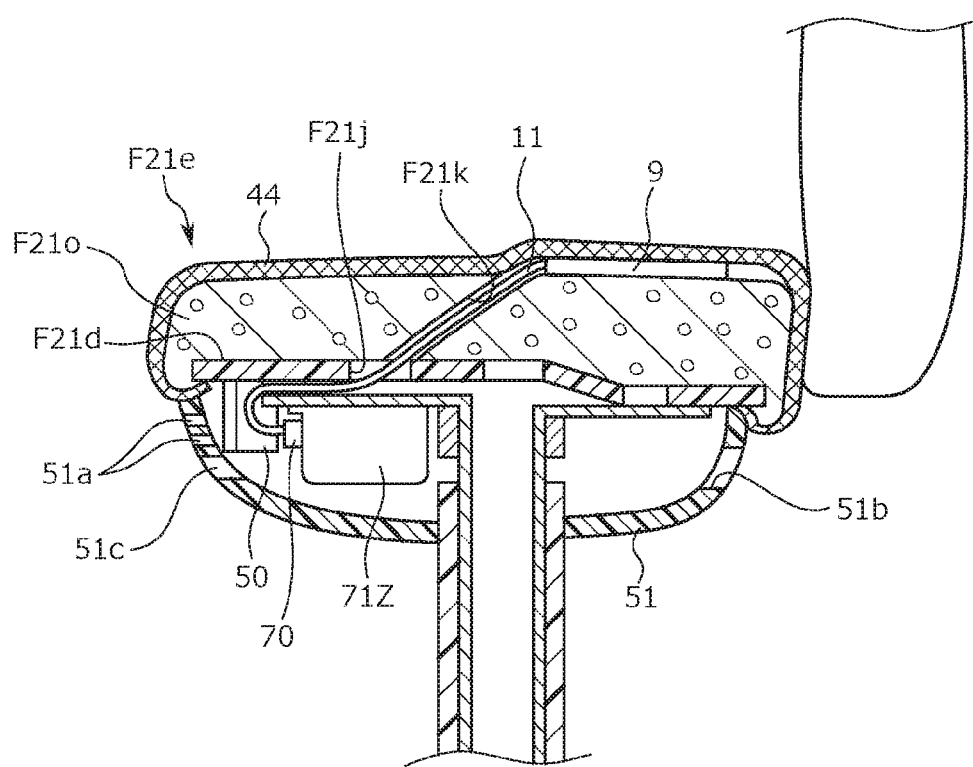
FIG. 49 is a schematic sectional view taken along the line XLIX-XLIX of FIG. 47.

With reference to FIGS. 47 to 49, a main configuration of the legged chair Sc is described. FIG. 47 is an perspective schematic view of the legged chair Sc according to the seventh embodiment of the present disclosure. FIG. 48 is a lower side perspective view showing a lower surface of a cushion pan F21X to which the holding cover 71Z and the seated portion cover 51 are attached. FIG. 49 is a schematic sectional view taken along the line XLIX-XLIX of FIG. 47. The legged chair Sc is mainly formed from a leg member F3, the cushion pan F21X attached to the leg member F3 to support the bottom portion of the seated person, a back pan F22 serving as a backrest portion coupled to the cushion pan F21X, and an awakening device U.

As shown in FIGS. 48 and 49, on a lower surface of a resin plate F21d provided in the cushion pan F21X of the legged chair Sc according to the present embodiment, two fans 50 are attached on the front side of a seated portion frame 74. The fans 50 attached in such a way have a function of air-cooling the ECU 7 and the battery 8 held by the holding cover 71Z described below, the holding cover being attached to the seated portion frame 74.

As shown in FIG. 47, the back pan F22 is formed from a resin plate F22d, a pad portion F22e with a skin attached on the front side of the resin plate F22d, and a backrest cover 55 attached on the rear side of the resin plate F22d.

The resin plate F22d corresponds to a plate member and a main body portion, and a vibration device 35 is attached to a center of a back surface of the resin plate F22d as shown in FIG. 47. The pad portion F22e with the skin is formed from a pad portion (not shown) made of a cushion material such as urethane, and a skin (not shown) covering the pad portion as well as the pad portion F21e with the skin. The backrest cover 55 covers the resin plate F22d and the vibration device 35 from the back surface, and an operation switch U5, an activation display unit U6, and a charging state display unit U7 described below are attached to an upper surface of the backrest cover. The operation switch U5, the activation display unit U6, and the charging state display unit U7 are connected to the ECU 7 by a harness U8.

The harness U8 is a wire harness that electrically connects constituent elements of the awakening device U, and as shown in FIG. 47, extends to pass through the interior of the cushion pan F21X and the back pan F22, respectively. In detail, one end portion of the harness U8 branches and is connected to the ECU 7 and the battery 8. The harness extends to the seat rear side on substantially one straight line from the one end portion, partly connected to the vibration device 35, and further extends toward the back pan F22. The harness U8 is bent in a coupled portion of the cushion pan F21X and the back pan F22, extends upward on the substantially one straight line, partly connected to the vibration device 35, and further extends toward an upper end of the back pan F22. The other end portion of the harness U8 branches into three, and the three portions are connected to the operation switch U5, the activation display unit U6, and the charging state display unit U7, respectively.

Figure 56:
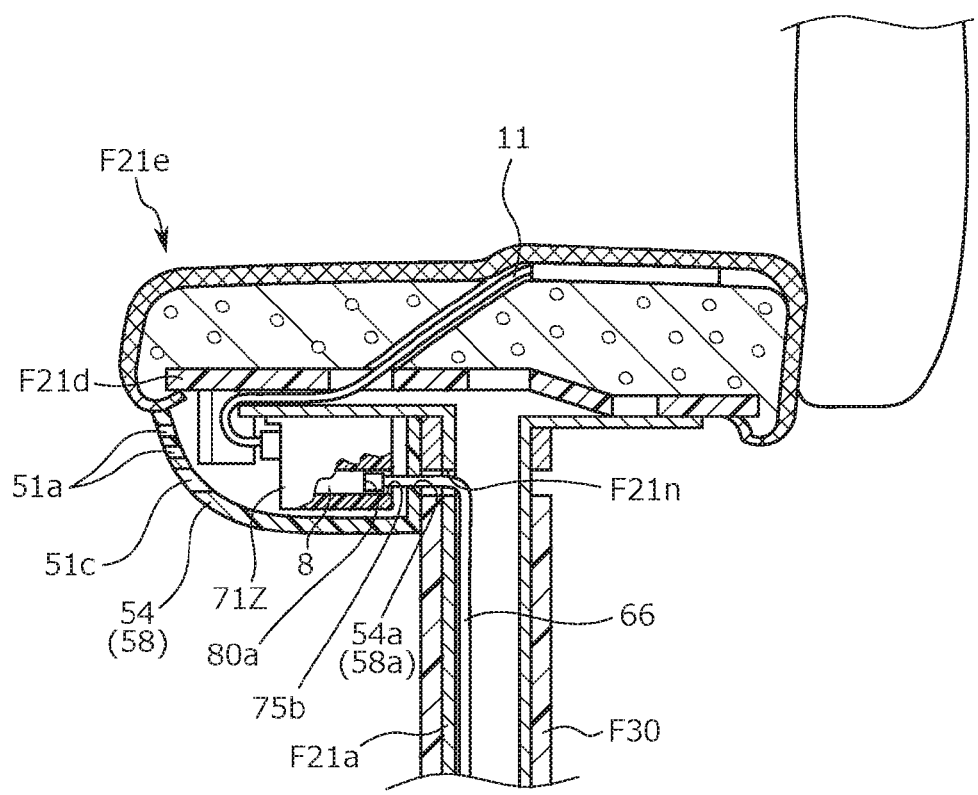
FIG. 56 is a schematic sectional view taken along the line LVI-LVI of FIG. 47 showing a seated portion cover according to a modified example.

A harness 11 connected to the breathing sensor 9 shown in FIG. 49, the harness U8 connected to the operation switch U5, the activation display unit U6, and the charging state display unit U7 and shown in FIG. 47, a harness (not shown) connected to the vibration device 35, and a cable (not shown) connected to the battery 8 are connected to a connection port 70a of a connector 70 attached to the ECU 7 according to the present embodiment. FIG. 49, and FIG. 56 described below are figures in which the harness U8 is omitted.

In the above configuration, the ECU 7, the battery 8, the breathing sensor 9, the vibration device 35, the operation switch U5, the activation display unit U6, and the charging state display unit U7 serving as the constituent elements of the awakening device U are arranged at the same positions in the seat width direction as shown in FIG. 47. Thus, the harness U8 connecting these constituent elements can extend on the substantially one straight line. Therefore, the harness U8 can be arranged compactly, so that an assembling task of the legged chair Sc including an assembling task of the harness U8 can be simplified to a great extent. Since the harness U8 does not have to extend in a complicated manner, a fear that the harness U8 is deformed is reduced. As a result, a size increase in the seat is suppressed and weight of the seat is reduced.

In the above configuration, the ECU 7, the battery 8, the breathing sensor 9, the vibration device 35, the operation switch U5, the activation display unit U6, the charging state display unit U7, and the harness U8 serving as the constituent elements of the awakening device U are arranged in a substantially center portion in the seat width direction as shown in FIG. 47. Therefore, the breathing sensor 9 and the vibration device 35 can detect the biological signals of the seated person with higher precision in comparison to a case where the breathing sensor and the vibration device are arranged in portions on both the sides in the seat width direction. Thus, physical force can be efficiently applied to the seated person. The harness U8 is arranged at a position less easily visually confirmed by the seated person and people around the seated person in comparison to a case where the harness is arranged in the portions on both the sides in the seat width direction. Thus, the design property of the legged chair Sc can be ensured.

In the above configuration, the operation switch U5, the activation display unit U6, and the charging state display unit U7 are attached to an upper end portion of the back pan F22 as shown in FIG. 47, and arranged at positions easily visually confirmed from the exterior when the seated person is seated. Therefore, the seated person and people around the seated person can be notified in an easily understandable manner of the fact that the awakening device is normally activated. The seat becomes such a seat that usability for a user is excellent and doze prevention for the seated person can be reliably achieved.

Holding Cover Holding ECU and Battery

Figure 50:
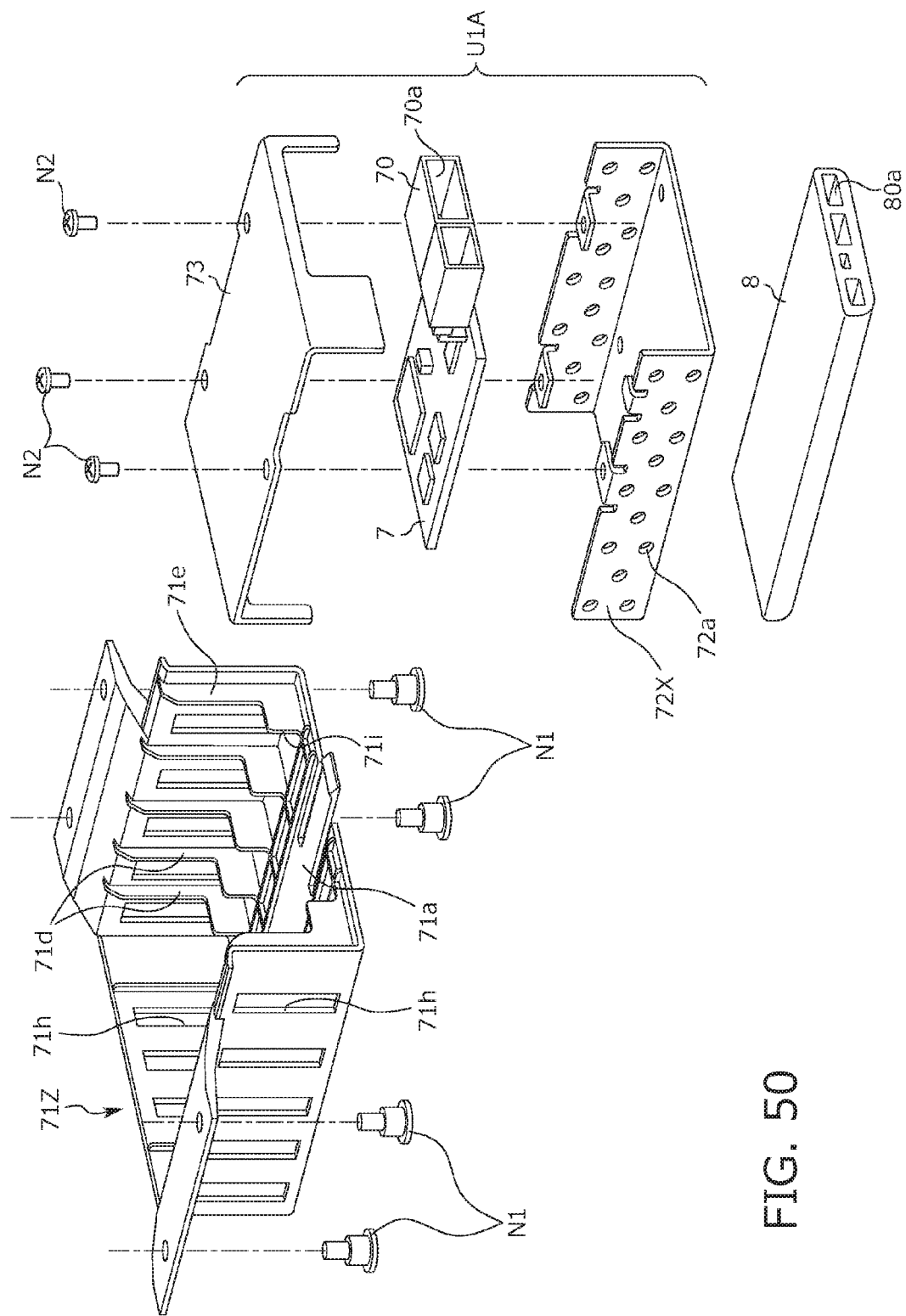
FIG. 50 is an exploded perspective view of a control device, a battery, the holding cover, and the like which are attached to the legged chair.
Figure 51:
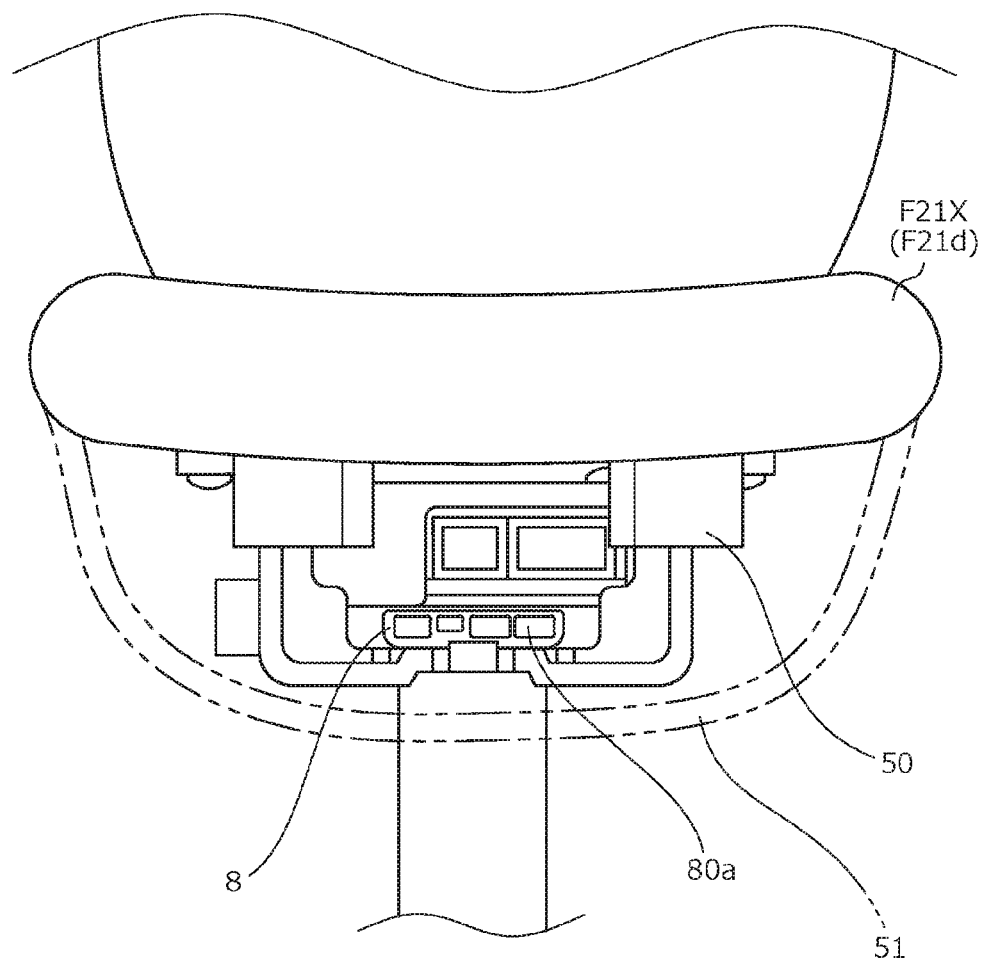
FIG. 51 is a schematic front view showing a state where the holding cover holding the control device and the battery is attached to the lower surface of the cushion pan.

Now, with reference to FIGS. 50 to 51 in addition to FIGS. 47 to 49, the holding cover 71Z holding the ECU 7 and the battery 8 is described. FIG. 50 is an exploded perspective view of a control device U1A, the battery 8, the holding cover 71Z, and the like which are attached to the legged chair Sc. FIG. 51 is a schematic front view showing a state where the holding cover 71Z holding the control device U1A and the battery 8 is attached to the lower surface of the cushion pan F21X.

The holding cover 71Z according to the present embodiment is formed to have an opening 71i in a front portion in such a manner that the connection port 70a of the connector 70 of the ECU 7 and the battery 8 held in a housing recess groove 71a are exposed by the opening 71i. By forming the opening 71i in the holding cover 71Z in such a way, the devices can be electrically connected in a state where the ECU 7 and the battery 8 are held by the holding cover 71Z. By attaching the holding cover 71Z to an upper side frame portion F21c in such a manner that the opening 71i faces the front side, the seated person can plug and unplug the harness 11, a charging cable 67, and the like in a state where the seated person is seated in the legged chair Sc without disturbance by a support barrel F30 on the rear side of the holding cover 71Z.

In particular, in a case where the battery 8 is of a detachable and replaceable type, the opening 71i also functions as an inlet/outlet for the battery 8. In a case where the battery 8 is of a rechargeable type, the opening 71i functions as a through port for the charging cable 67 plugged into a charging jack 80a by exposing the charging jack 80a of the battery 8. Similarly, the opening 71i functions as a through port for the harness 11 plugged into the connection port 70a or the harness U8 described below by exposing the connection port 70a of the connector 70.

In order to let the opening 71i function as the inlet/outlet for the battery 8, the through port for the charging cable 67 or the harness 11, or the through port for the harness U8, the holding cover 71Z may be attached in the direction in which the opening 71i does not face a support post F21a which is a barrier against insertion, removal, and the like of the battery 8. That is, as long as the opening 71i does not face the support post F21a, the holding cover 71Z may be attached in such a manner that the opening faces not only the front side but also the side or the rear side.

Between ribs 71d provided on side surfaces of the holding cover 71Z, the ribs being adjacent to each other in the front to back direction, square shaped slits 71h extending in the up and down direction are formed. On a rear surface of the holding cover 71Z, slits 71h are also formed at the same intervals. By forming the slits 71h in such a way, the air can be distributed through the interior and the exterior the holding cover 71Z, so that the heat radiation property of the ECU 7 and the battery 8 held by the holding cover 71Z can be enhanced.

In particular, by the slits 71h formed on the rear surface of the holding cover 71Z, the wind blown from the fans 50 on the front side of the holding cover 71Z flows rearward, so that the heat radiation property (also referred to as the heat exhaust property) is enhanced. Part of the slits 71h may function as a through port for the charging cable 67, the harness 11, or the harness U8 instead of the opening 71i.

The control device U1A is stored in the housing recess groove 71a of the holding cover 71Z together with the battery 8. In particular, the holding cover 71Z is attached to the upper side frame portion F21c on the front side of a lower side frame portion F21b and on the lower side of the resin plate F21d. Thus, a space in front of the lower side frame portion F21b is effectively utilized. By attaching the holding cover 71Z in such a way, downward extension of the resin plate F21d is suppressed, so that narrowing of a space where legs of the seated person are placed can be suppressed.

Seated Portion Cover Covering Resin Plate

In the above embodiment, the holding cover 71Z is described as a member that holds and protects the control device U1A and the battery 8. In order to further enhance a protection ability and make the esthetic aspect favorable, the seated portion cover 51 covering the resin plate F21d together with the holding cover 71Z may be attached.

Figure 52:
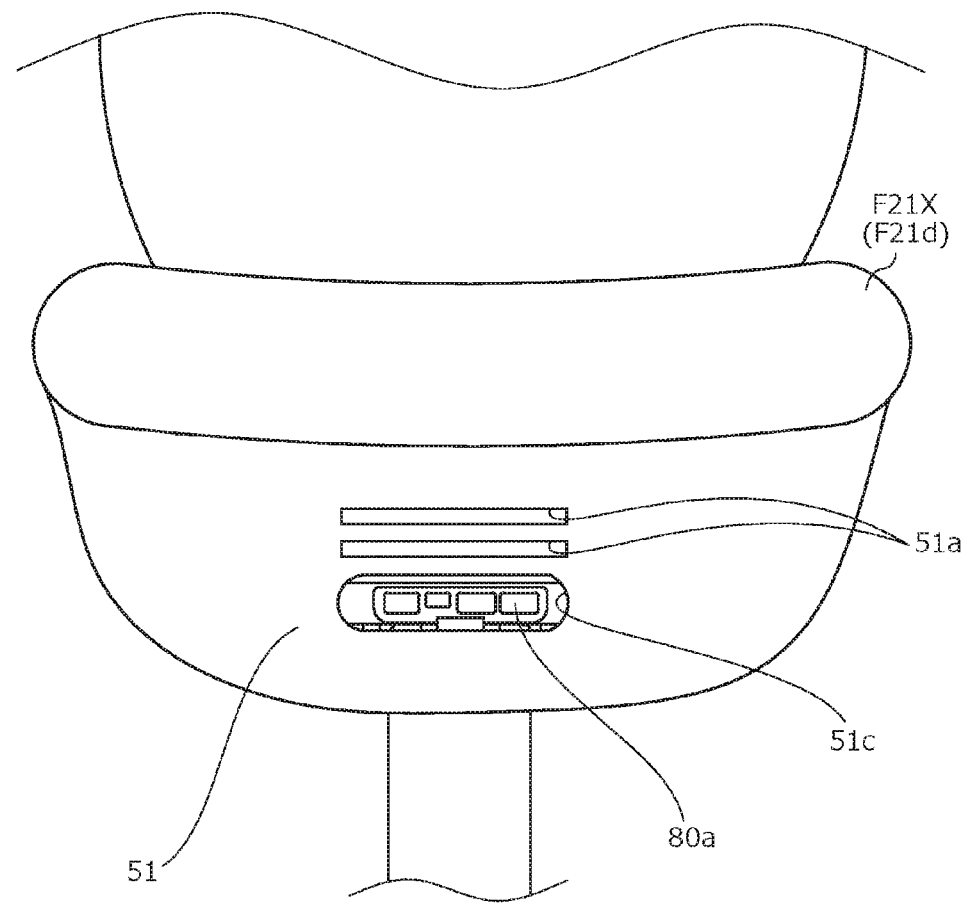
FIG. 52 is a schematic front view showing a state where the seated portion cover is attached to a lower surface of a resin plate.
Figure 53:
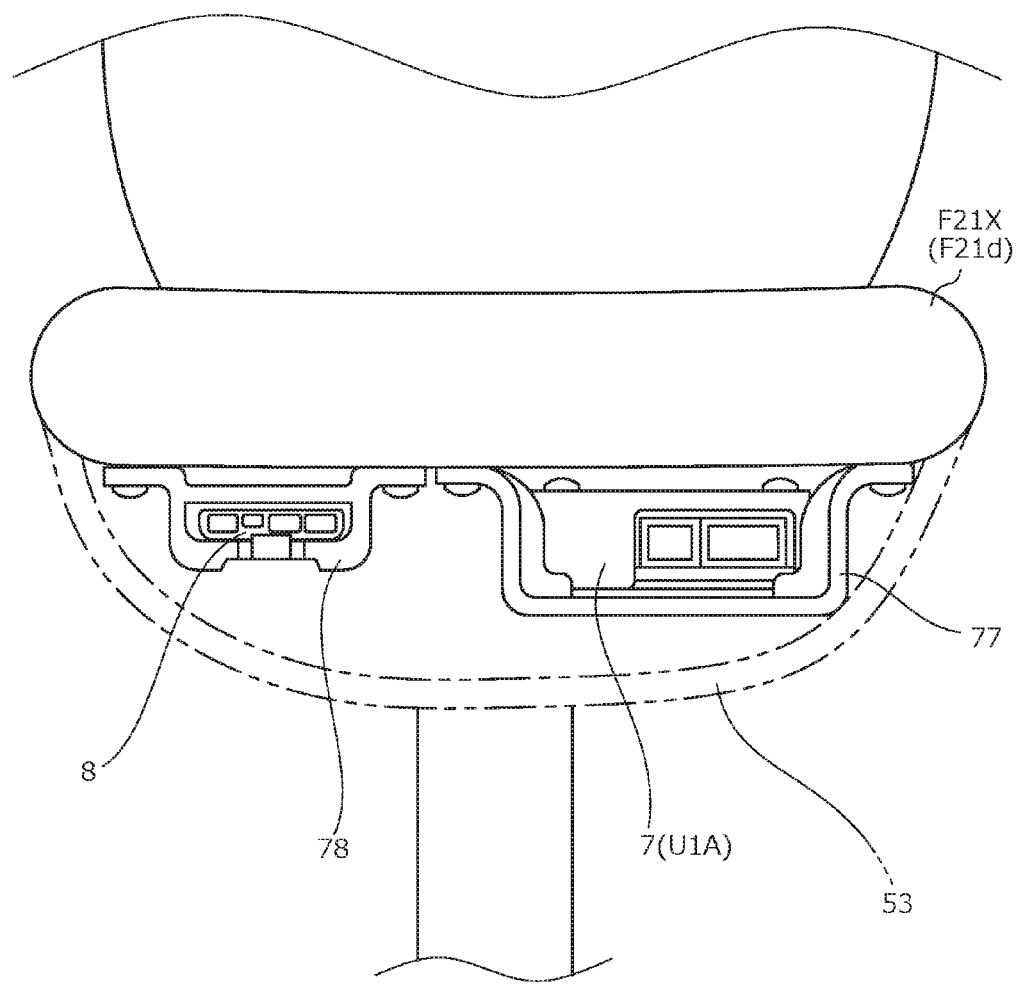
FIG. 53 is a schematic front view showing a state where a control device holding cover and a battery holding cover are attached to the lower surface of the resin plate.
Figure 54:
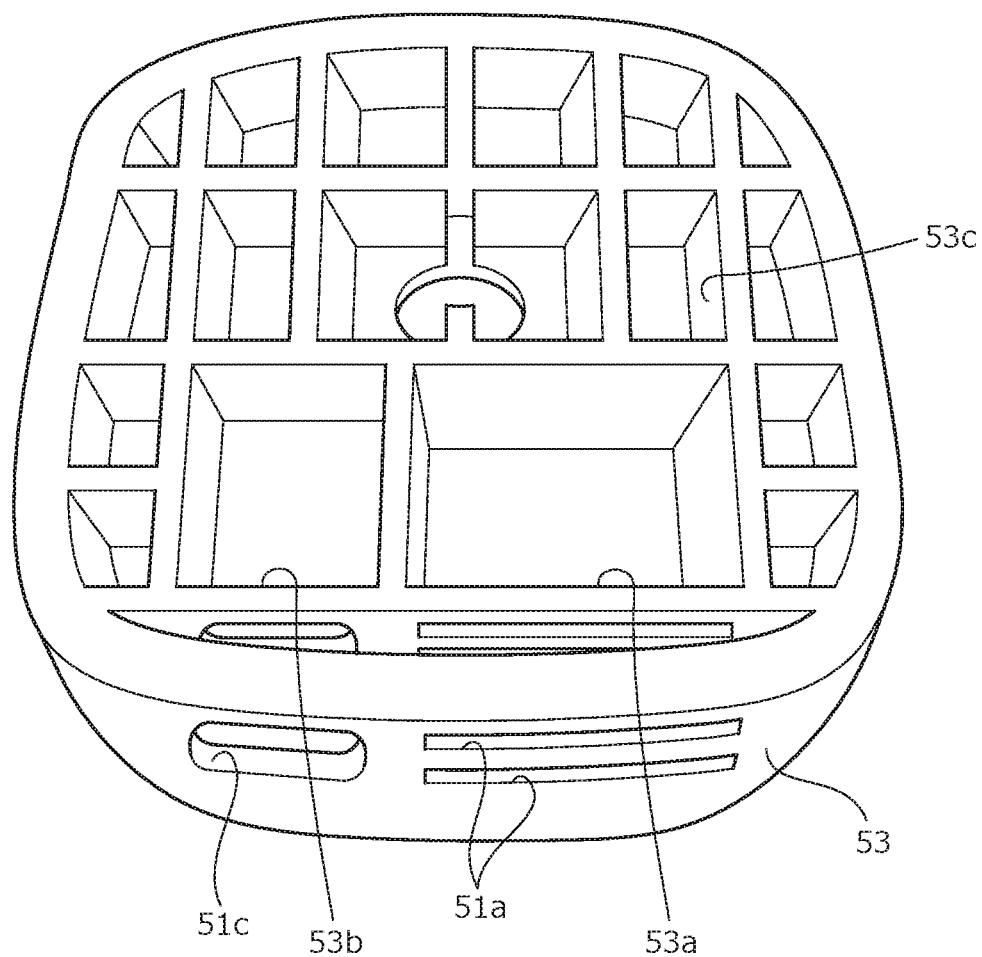
FIG. 54 is an upper side perspective view showing an upper portion of the seated portion cover.
Figure 55:
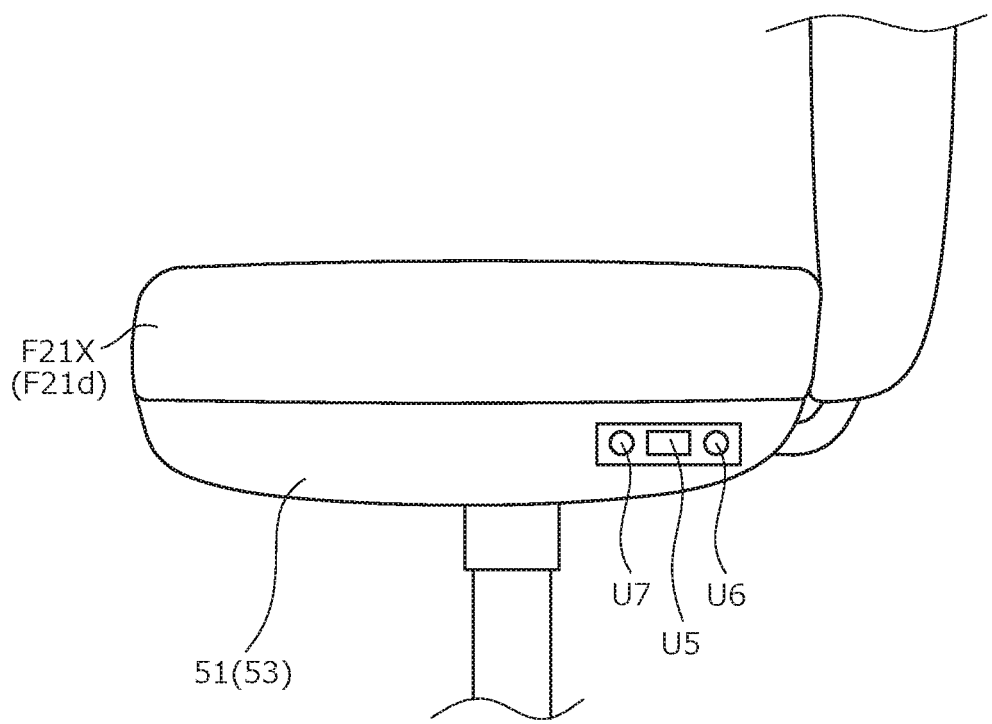
FIG. 55 is a schematic side view showing the seated portion cover from a side surface.

Now, the seated portion cover 51 covering the resin plate F21d from the back surface is described with reference to FIGS. 52 to 55 in addition to FIG. 49. FIG. 52 is a schematic front view showing a state where the seated portion cover 51 is attached to the lower surface of the resin plate F21d. FIG. 53 is a schematic front view showing a state where a control device holding cover 77 and a battery holding cover 78 are attached to the lower surface of the resin plate F21d. FIG. 54 is an upper side perspective view showing an upper portion of the seated portion cover 51. FIG. 55 is a schematic side view showing the seated portion cover 51 from a side surface.

The seated portion cover 51 is made of a resin material and has a bowl-like shape. The seated portion cover 51 has slits 51a in an upper portion on a front surface, an elongated opening hole 51c from which the battery 8 is exposed in a lower portion on the front surface, and an exhaust port 51b (refer to FIG. 49) on a rear surface.

The slits 51a are to introduce the external air into the seated portion cover 51 for air-cooling the control device U1A and the battery 8, and two upper and lower slits 51a are formed to extend in the chair width direction. As shown in FIG. 49, by disposing the fans 50 at positions facing the slits 51a, intake of the external air is more facilitated.

The opening hole 51c functions as an inlet/outlet which is an opening from and into which the battery 8 can be taken by exposing the battery 8, or the charging cable 67 and the charging jack 80a can be connected in a state where the holding cover 71Z is covered with the seated portion cover 51 by the opening hole. The opening hole 51c passes through in the front to back direction and extends in the chair width direction on the lower side of the slits 51a. The opening hole 51c also functions as an intake port for the external air together with the slits 51a. Further, the slits 51a or the opening hole 51c may function as a through port for the charging cable 67, the harness 11, or the harness U8. In particular, the slits 51a or the opening hole 51c can let the harness 11, U8, or the like to pass through the interior and the exterior of a seated portion cover 53. Thus, freedom of arrangement of the vibration device 35, the breathing sensor 9, the operation switch U5, the activation display unit U6, and the charging state display unit U7 described below, and the ECU 7 can be enhanced. The seated portion cover 51 may be attached to the resin plate F21d in the direction in which the opening hole 51c does not face the support post F21a which is a barrier against insertion, removal, and the like of the battery 8. That is, as long as the opening hole 51c does not face the support post F21a, the seated portion cover 51 may be attached in such a manner that the opening hole 51c faces not only the front side but also the side or the rear side. With such a configuration, the support post F21a is not disturbing when the battery 8 is taken in and out from the opening hole 51c or the charging cable 67, the harness 11, U8, or the like passes through the opening hole 51c.

The exhaust port 51b is configured to exhaust the air taken in from the slits 51a or the opening hole 51c to the exterior of the seated portion cover 51. By exhausting the air taken in from the slits 51a or the opening hole 51c and passing through the ECU 7 or the battery 8 to receive heat to the exterior of the seated portion cover 51 by the exhaust port 51b in such a way, heat of the ECU 7 and the battery 8 can be diffused, so that an uncomfortable feeling of the seated person can be avoided. In particular, by forming the exhaust port 51b in a rear portion of the seated portion cover 51, the exhaust wind comes out of the cover from the rear side of the seated portion cover 51. Therefore, an uncomfortable feeling of the seated person due to exposure of legs of the seated person on the front side of the legged chair Sc to the exhaust wind can be avoided.

In the holding cover 71Z according to the above embodiment, the control device U1A and the battery 8 are collectively held in the up and down direction. However, a cover separately holding the control device and the battery may be adopted. For example, as shown in FIG. 53, the control device holding cover 77 holding the control device U1A and the battery holding cover 78 holding the battery 8 may be attached side by side in the chair width direction. By attaching the control device holding cover 77 and the battery holding cover 78 in such a way, downward or forward/backward extension of both the covers from the resin plate F21d can be suppressed more than the holding cover 71Z holding the control device U1A and the battery 8 in an up/down overlapping manner, or a case where these are arranged side by side in the front to back direction. In accordance with this, downward extension of the seated portion cover 53 covering these can also be suppressed.

In the seated portion cover 51 and the seated portion cover 53, recess portions are formed in portions facing the holding cover 71Z or the control device holding cover 77 and the battery holding cover 78. For example, as the recess portions in the seated portion cover 53, as shown in FIG. 54, a control device housing portion 53a is formed in the portion facing the control device holding cover 77, a battery housing portion 53b is formed in the portion facing the battery holding cover 78, and a plurality of ribs 53c are formed in the other portions. By forming the plurality of ribs 53c, the seated portion cover 53 has light weight and high rigidity.

The control device housing portion 53a has a shape corresponding to the control device holding cover 77, and the battery housing portion 53b has a shape corresponding to the battery holding cover 78. Specifically, as in the present embodiment, in a case where a lower surface of the control device holding cover 77 is placed at a position lower than a lower surface of the battery holding cover 78, the control device housing portion 53a is formed to be deeper than the battery housing portion 53b. The control device housing portion 53a is formed in such a manner that a bottom surface of the control device housing portion 53a is positioned at a position slightly lower than the lower surface of the control device holding cover 77 in a state where the seated portion cover 53 is attached to the resin plate F21d. Similarly, the battery housing portion 53b is formed in such a manner that a bottom surface of the battery housing portion 53b is positioned at a position slightly lower than the lower surface of the battery holding cover 78 in a state where the seated portion cover 53 is attached to the resin plate F21d.

The control device housing portion 53a and the battery housing portion 53b are formed on the front side of the support post F21a in a state where the seated portion cover 53 is attached to the resin plate F21d. By forming these in such a way, the control device U1A or the battery 8 can be arranged at a position facing the above position. Therefore, the seated person can remove the seated portion cover 53 and touch the control device U1A or the battery 8 from the front side of the support post F21a. Thus, the maintenance property becomes favorable.

By forming the control device housing portion 53a and the battery housing portion 53b in such a way, in a state where the control device holding cover 77 and the battery holding cover 78 are attached to the resin plate F21d, the seated portion cover 53 can be attached to the resin plate F21d without disturbance of these. By forming the control device housing portion 53a and the battery housing portion 53b, size of the seated portion cover 53 covering the battery 8 and the control device U1A can be reduced. In this case, by forming the control device housing portion 53a the deepest in comparison to the other portions, a downward extension amount of the seated portion cover 53 can be the smallest, so that a space where legs of the seated person are placed on the lower side of the seated portion cover 53 can be extended. Conversely, by arranging the control device U1A at a position facing the control device housing portion 53a, the downward extension amount of the seated portion cover 53 can be suppressed. In a case where the portion to which the battery 8 is attached is extended the most on the lower side of the resin plate F21d in comparison to the portion to which the control device U1A is attached, the battery housing portion 53b may be formed to be the deepest.

As well as the seated portion cover 53 having the above control device housing portion 53a which houses the control device holding cover 77 and the battery housing portion 53b which houses the battery holding cover 78 and including the ribs 53c, recess portions (not shown) covering the holding cover 71Z and ribs can also be formed in the seated portion cover 51. In this case, the holding cover 71Z, in other words, the recess portions (not shown) are preferably arranged in a center in the chair width direction. With such a configuration, weight is balanced in the chair width direction.

Further, in a case where the control device U1A or the battery 8 is attached on the side of the back pan F22, the same configuration as the above seated portion covers 51, 53 can be applied to the backrest cover 55.

Display Units Provided in Seated Portion Cover

The operation switch U5, the activation display unit U6, and the charging state display unit U7 are attached to the side surface of the seated portion cover 51 shown in FIG. 55.

The operation switch U5 is a push bottom type operation switch for activating or stopping the awakening device U, fitted into and attached to a fitting hole (not shown) of the seated portion cover 51. In the mode shown in FIG. 47, the operation switch is fitted into and attached to a fitting hole (not shown) provided in an upper end portion of the back pan F22, in detail, in an upper end portion of the backrest cover 55.

The activation display unit U6 is a display light that displays activation or stoppage of the awakening device U, formed to display a blue color in a case where the awakening device is normally activated, display a yellow color in a case where the awakening device is activated but some failure is caused, and turn off the light in a case where the awakening device is stopped.

The charging state display unit U7 is a display light that displays a charging state of the battery 8, formed to display a blue color in a case where the battery 8 is sufficiently charged, display a red color in a case where the remaining charge amount becomes a predetermined value or less, and turn off the light in a case where there is no remaining charge amount. By providing the charging state display unit U7, the charging state (charge amount) of the battery 8 can be easily confirmed, so that the present device can be normally activated while grasping a time for which the awakening device U can be activated. The activation display unit U6 and the charging state display unit U7 are attached to the side surface of the seated portion cover 51 and arranged at positions to sandwich the operation switch U5 as shown in FIG. 55. In the mode shown in FIG. 47, the activation display unit U6 and the charging state display unit U7 are attached to the upper end portion of the back pan F22, and at least part of the operation switch U5, the activation display unit U6, and the charging state display unit U7 are arranged at the same position in the seat width direction and arranged at the same position in the front to back direction of the seat as the vibration device 35.

By attaching the operation switch U5 to the seated portion cover 51 in such a way, the seated person can operate turning ON/OFF of the awakening function in a seated state, so that operability is enhanced. By not arranging the operation switch U5 on the seating surface, an erroneous operation of the operation switch U5 when the seated person is seated is suppressed, and the operation switch U5 can be more easily operated after seating. By providing the activation display unit U6 and the charging state display unit U7 in the seated portion cover 51, the activation state of the awakening function and the charging state of the battery 8 can be confirmed. Thus, the legged chair Sc can be more easily used. In particular, by attaching the operation switch U5, the activation display unit U6, and the charging state display unit U7 on the side surface of the seated portion cover 51, since legs of the seated person are not placed on the side of the seated portion cover 51 in a normal use state, an operation of the operation switch U5 and visual confirmation of the activation display unit U6 and the charging state display unit U7 can be more easily performed.

The operation switch U5, the activation display unit U6, and the charging state display unit U7 may be fitted into and attached to the fitting hole (not shown) provided in the upper end portion of the backrest cover 55 as shown in FIG. 47, or may be attached to both the covers. By attaching at least any of the operation switch U5, the activation display unit U6, and the charging state display unit U7 in an upper portion of the backrest cover 55, even in a state where someone stands in front of the legged chair Sc, he/she can change the activation state of the awakening device U and also confirm the activation state.

Modified Example

Finally, with reference to FIG. 56, a seated portion cover 54 according to a modified example is described. FIG. 56 is a schematic sectional view taken along the line LVI-LVI of FIG. 47 showing the seated portion cover 54 according to the modified example.

The seated portion cover 54 according to the modified example is formed and attached to cover only the front side of the support post F21*a* on the lower surface of the resin plate F21*d*. At a position facing the support post F21*a* on a rear surface of the seated portion cover 54, a through port 54*a* from which the charging jack 80*a* of the battery 8 shown in FIG. 50 is exposed is formed. The battery 8 is held by the holding cover 71Z in such a manner that the charging jack 80*a* faces the rear side to face the support post F21*a*, and a through port 75*b* from which the charging jack 80*a* is exposed is formed in a rear portion of the holding cover 71Z.

In a front portion of the support post F21*a* facing the seated portion cover 54, a through hole F21*n* communicating with the exterior and an internal space is formed. That is, in a state where the seated portion cover 54 covers the holding cover 71Z, the through port 54*a* and the through port 75*b* face the through hole F21*n*, and an extension cable 66 is brought to the interior of the support post F21*a* through these.

As shown in FIG. 47, a charging connector 65 is disposed in a leading end of a foot portion F31 on the upper side of a caster F31*a* in the leg member F3. The extension cable 66 is connected to the charging jack 80*a* and the charging connector 65. With such a configuration, by plugging the charging cable 67 into the charging connector 65 in a tip of the foot portion F31 near the floor, the battery 8 can be charged. Thus, the charging cable 67 does not disturb a person passing by a peripheral part and can be more easily used. The seated person can more easily visually confirm the leading end of the foot portion F31 than the vicinity of the lower surface of the cushion pan F21X, so that the charging cable 67 can be more easily connected to the charging connector 65.

As well as the through port 75*b* through which the extension cable 66 passes, in a portion facing the support post F21*a* on the rear surface of the seated portion cover 54, a through port through which the harness 11 or the harness (not shown) connected to the vibration device 35 passes to the rear side of the seated portion cover 54 may be formed. By forming the through port at a position facing the support post F21*a* in such a way, a connection portion for the harness to be hardly touched except for maintenance can be less easily touched with legs or the like of the seated person, so that sudden removal of the harness can be suppressed. In this modified example, the seated portion cover 54 is also an arbitrary constituent element as a matter of course.

In order to let the slits 51*a* or the opening hole 51*c* function as an inlet/outlet for the battery 8, a through port for the charging cable 67 or the harness 11, or a through port for the harness U8, the seated portion cover 51, 53, 54 may be attached to the lower surface of the cushion pan F21X in the direction in which the slits 51a or the opening hole 51c do not face the support post F21a which is a barrier against installation, removal, and the like of the battery 8. That is, as long as the slits 51a or the opening hole 51c do not face the support post F21a, the seated portion cover 51, 53, 54 may be attached to the lower surface of the cushion pan F21X in such a manner that the slits 51a or the opening hole 51c face not only the front side but also the side or the rear side.

In the above embodiment, the fans 50 attached to the lower surface of the resin plate F21d are described. However, as long as the ECU 7 or the battery 8 can be cooled, the present disclosure is not limited to this configuration. For example, the fans 50 may be attached to the seated portion cover 51. Attachment of the fans 50 to the seated portion cover 51 is effective in a case where the fans 50 cannot be attached upon facing difficulties in self-tapping due to the metal resin plate F21d or the like. Alternatively, a space may be provided in the holding cover 71Z and the fans 50 may be attached in the space. When the fans 50 are attached to the holding cover 71Z, the fans are arranged near the ECU 7 connected to the fans 50. Thus, wiring can be compactly collected up.

Eighth Embodiment

A chair according to an eighth embodiment of the present disclosure is a chair including an awakening device capable of avoiding disturbance of operations of an operation unit by a charging cable plugged into a charging jack, and supplying the electric power to a stimulation device and a control device to stably activate the stimulation device and the control device. For the purpose of preliminarily preventing generation of an accident at the time of driving a vehicle, there is the known technique of preventing the decrease in an awake state of the driver of the vehicle. JP A 2013-220810 describes the technique of providing a vibrating stimulation to the seated person by using the vehicle seat including the heartbeat sensor or the breathing sensor, and the electric device such as the motor. For example, JP A 6-253953 describes the legged chair including the vibration device (described as the vibration motor in the same patent literature) below the seated portion (described as a seat portion in the same patent literature).

However, in a case where an awakening device is attached to a legged chair, unlike the above vehicle seat described in JP A 2013-220810, a battery in a vehicle cannot be utilized. Thus, there is a need for attaching the battery to the chair. Although the chair can be connected to a household power source via a power source cord, a moving range of the chair is reduced by the power source cord, or the chair may sometimes roll over the power source cord. Thus, the power source cord is not preferable for use. Therefore, it is thought that a rechargeable battery is used. However, in the midst of power feed by connecting a charging cable to a charging jack of the battery, as well as a case where the power source cord is used, it is thought that the moving range of the chair is also narrowed down by the charging cable and the chair goes over the charging cable.

A general chair for office use includes a mechanism capable of adjusting an angle of reclining of a backrest or height of a seated portion, and also includes an operation lever for adjusting a degree of the adjustment. The charging cable connected to the charging jack of the battery may sometimes disturb operations of the operation lever. In a case where a cover that protects at least part of the battery and the awakening device is provided, the battery is shielded from the exterior by the cover, and it is thought that power feed to the battery is less easily performed. Further, when a charging connector of the battery provided in the chair is placed at a high place, in the charging cable connected to the household power source generally placed at a low place and the charging connector, it is thought that a portion in the vicinity of the charging connector is greatly bent and disconnection is more easily caused.

Figure 57:
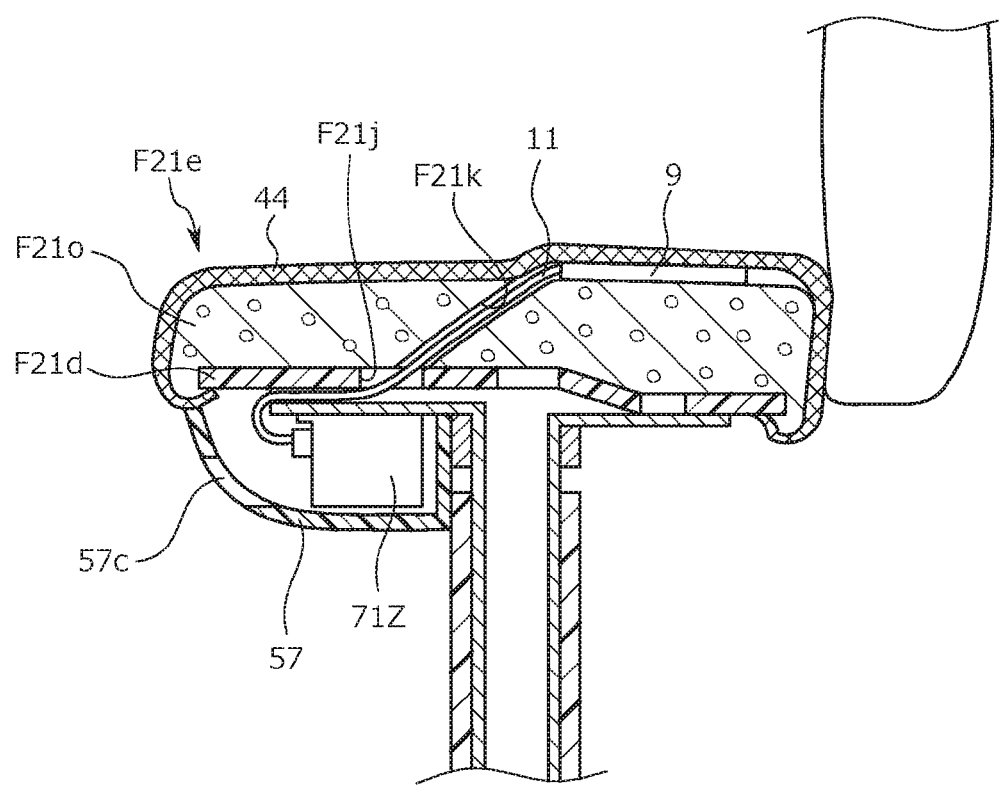
FIG. 57 is a schematic sectional view taken along the line LVII-LVII of FIG. 1 about a legged chair S according to an eighth embodiment of the present disclosure.
Figure 58:
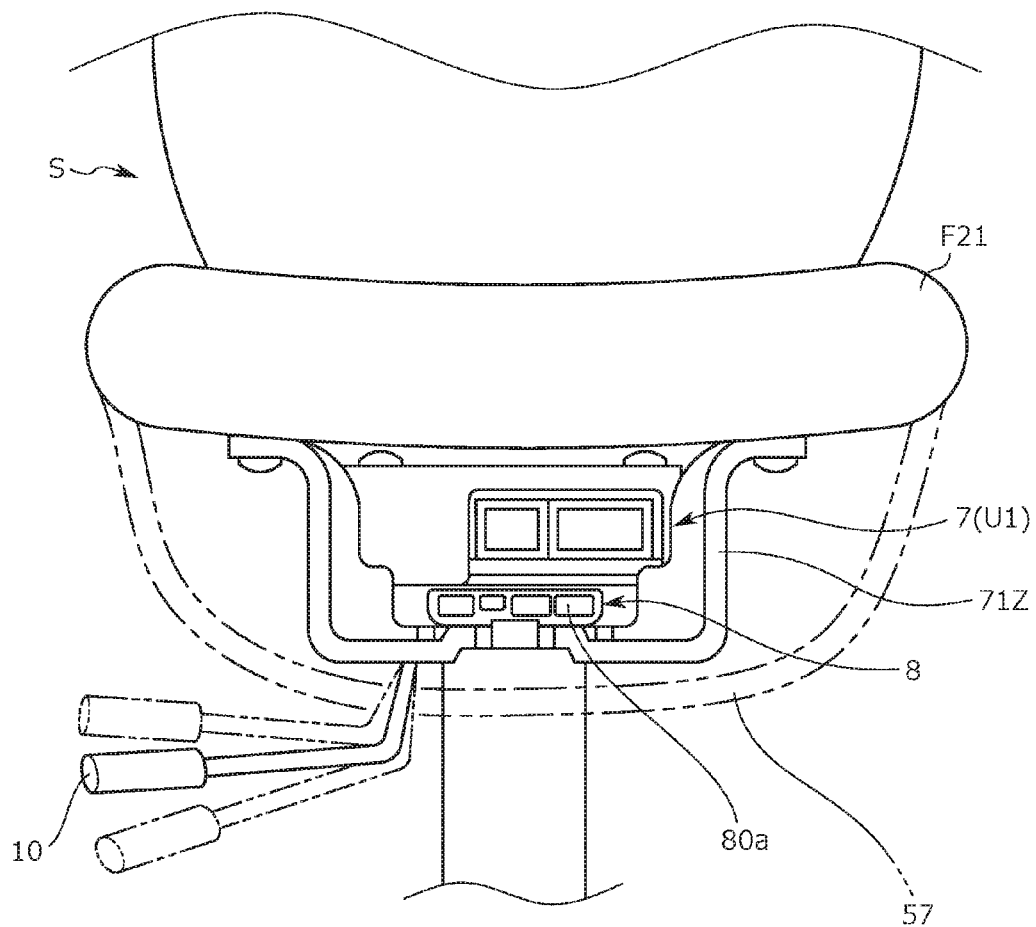
FIG. 58 is a schematic front view showing a state where a holding cover holding a control device and a battery is attached to a lower surface of a cushion pan.
Figure 59:
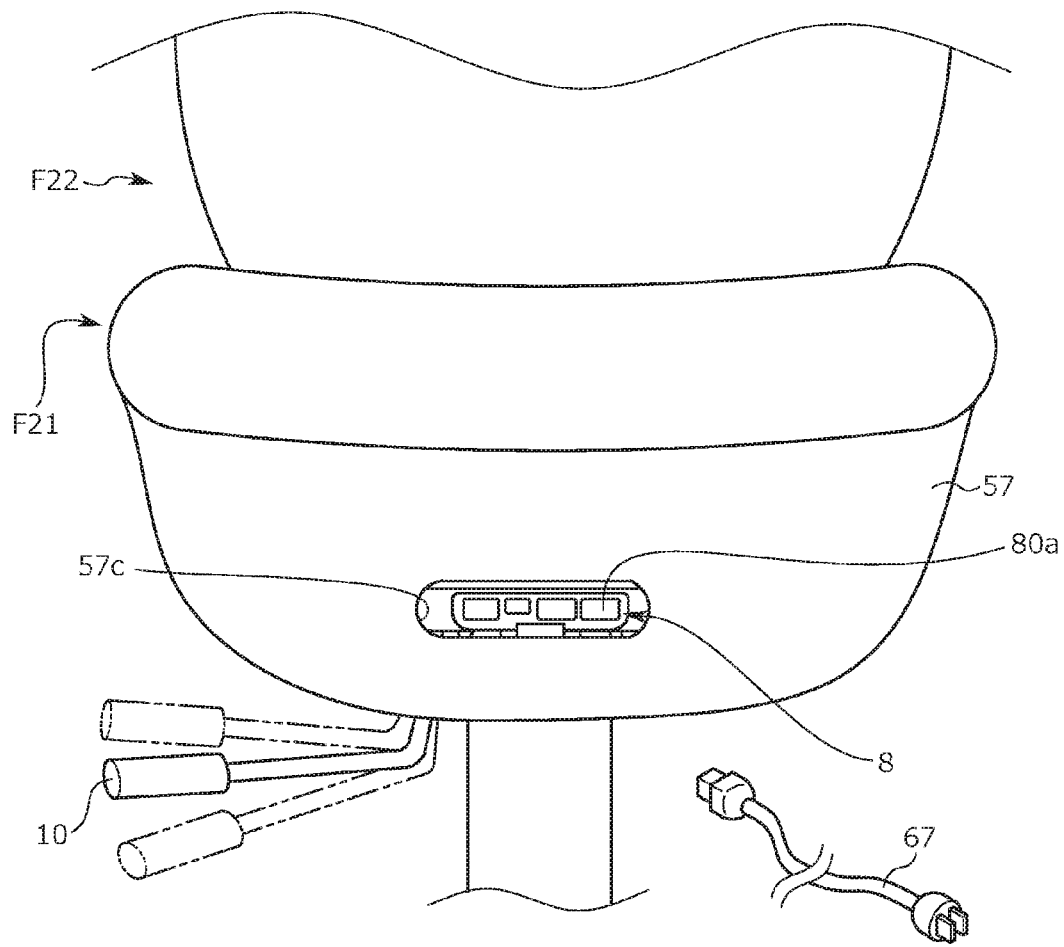
FIG. 59 is a schematic front view showing a state where a seated portion cover is attached to a lower surface of a resin plate of the cushion pan.

A legged chair S according to the eighth embodiment of the present disclosure for solving these problems, an ECU 7, a battery 8, and a holding cover 71Z holding these provided in the legged chair S, and a seated portion cover 57 covering these is described with reference to the FIGS. 57 to 59. FIG. 57 is a schematic sectional view taken along the line LVII-LVII of FIG. 1 about the legged chair S according to the eighth embodiment of the present disclosure. FIG. 58 is a schematic front view showing a state where the holding cover 71Z holding a control device U1A and the battery 8 is attached to a lower surface of a cushion pan F21. FIG. 59 is a schematic front view showing a state where the seated portion cover 57 is attached to a lower surface of a resin plate F21d of the cushion pan F21.

As described above, power feed of the battery 8 is performed by plugging a charging cable 67 into a charging jack 80a. When the legged chair S is used while performing power feed, it is thought that the charging cable 67 may be disturbing. In particular, in the legged chair S including an operation lever 10, the charging cable 67 may sometimes disturb operations of the operation lever 10. Therefore, as shown in FIG. 58, the charging jack 80a of the battery 8 is provided at a position to keep away from a movable range of the operation lever 10. With such a configuration, when the operation lever 10 is operated, the charging cable 67 connected to the charging jack 80a can be suppressed from disturbing the operations. Further, the charging cable 67 is not easily removed from the charging jack 80a at the time of operating the operation lever 10. Thus, the electric power can be stably supplied to a vibration device 35 and the control device U1A, so that activation of these can be stabilized.

In particular, the charging jack 80a is preferably provided at a position to keep away from the upper side and the lower side of the movable range of the operation lever 10. With such a configuration, disturbance of the operations by a hand of the seated person actuating the operation lever 10 touching the charging cable 67 connected to the charging jack 80a can be more suppressed.

Further, the charging jack 80a is arranged on the opposite side of the operation lever 10 attached on one side in the chair width direction in the cushion pan F21. With such a configuration, disturbance by the charging cable 67 connected to the charging cable 80a when the seated person seated in the cushion pan F21 extends his/her hand from the one side in the chair width direction and operates the operation lever 10 can be suppressed from disturbing.

Further, the holding cover 71Z may be attached in such a manner that the charging jack 80a faces the rear side of the cushion pan F21. With such a configuration, by avoiding to dispose the charging cable 67 in a space where legs of the seated person are placed on the front side of the cushion pan F21, disturbance by the charging cable 67 such as hanging onto legs can be avoided.

Ninth Embodiment

Figure 60:
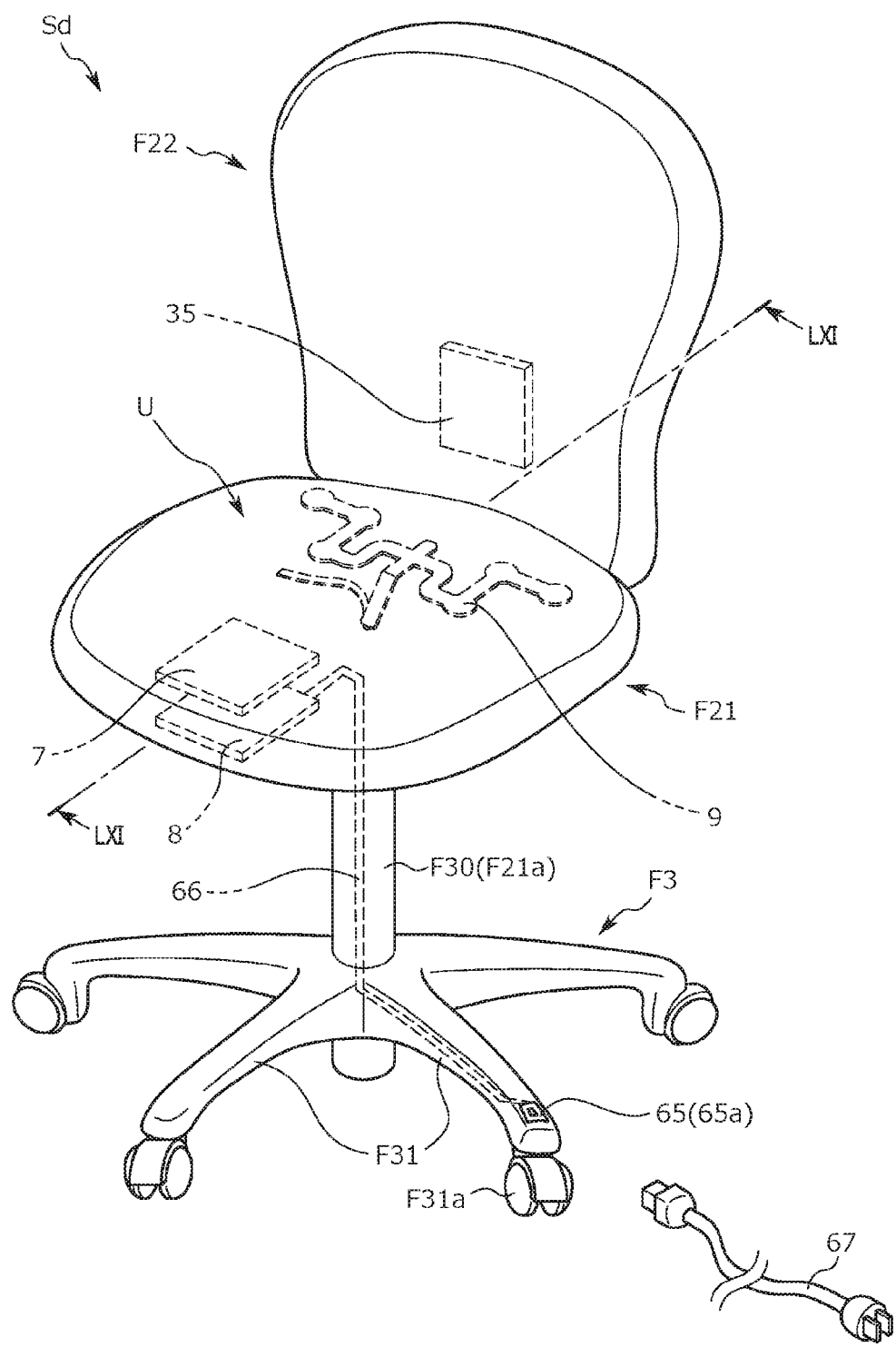
FIG. 60 is a perspective schematic view of a legged chair according to a ninth embodiment.
Figure 61:
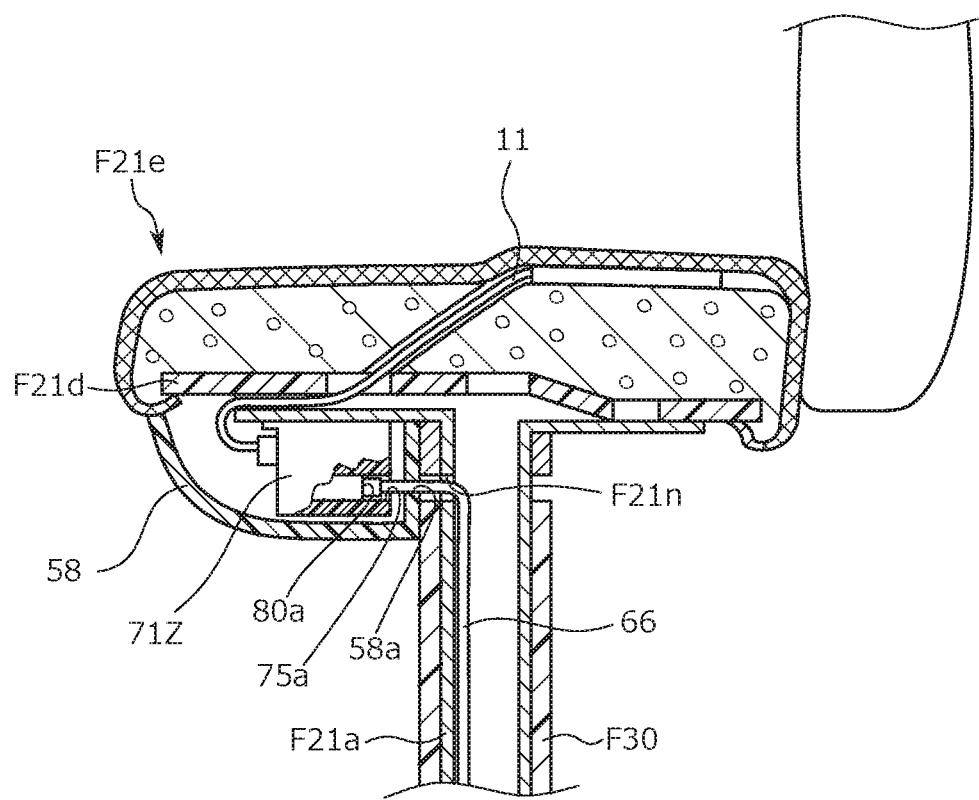
FIG. 61 is a schematic sectional view taken along the line LXI-LXI of FIG. 60.

Now, a legged chair Sd according to a ninth embodiment is described with reference to FIGS. 60 and 61. FIG. 60 is an perspective schematic view of the legged chair Sd according to the ninth embodiment. FIG. 61 is a schematic sectional view taken along the line LXI-LXI of FIG. 60. The legged chair Sd includes a charging connector 65 in a leading end of a foot portion F31, and the electric power can be fed to a battery 8 by plugging a charging cable 67 into the charging connector 65.

In a seated portion cover 58 of the legged chair Sd, unlike the seated portion cover 54 shown in FIG. 56 and the seated portion cover 57 shown in FIG. 59, the slits 51a and the opening holes 51c, 57c are not formed. Therefore, grit and dust can be suppressed from intruding an ECU 7 and the battery 8 in the seated portion cover 58.

On the front side of a support post F21a to face the seated portion cover 58, a through hole F21n communicating with the exterior and an internal space is formed. That is, in a state where the seated portion cover 58 covers a holding cover 71Z, a through port 58a and a through port 75b face the through hole F21n, and an extension cable 66 is brought to the interior of the support post F21a through these. Since the extension cable 66 is disposed to pass through the internal space of the support post F21a in such a way, the extension cable 66 is not hanged on peripheral members of the legged chair Sd and hence not dropped off a charging jack 80a. Further, since no external force is applied to the extension cable 66, deterioration can be prevented. Since the extension cable 66 is not exposed to the exterior, the design property is improved. Since the extension cable 66 is not touched by the seated person, the seated person can use the legged chair Sd comfortably.

As shown in FIG. 60, the charging connector 65 is disposed in the leading end of the foot portion F31 on the upper side of a caster F31a in a leg member F3. One end of the extension cable 66 is connected to the charging jack 80a, the other end is connected to the charging connector 65, and the extension cable is disposed along a lower surface of the foot portion F31. With such a configuration, by connecting the charging cable 67 to the charging connector 65 fixed to the leg member F3 which is separated from a cushion pan F21 in which the seated person is seated, the battery 8 can be charged. Thus, the charging cable 67 can be prevented from disturbing the seated person. Since the extension cable 66 is disposed along the lower surface of the foot portion F31, contact of the extension cable 66 with legs of the seated person can be avoided, so that removal of the extension cable 66 from the charging jack 80a can be avoided. When the seated person use the legged chair Sd during power feed of the battery 8, disturbance by the extension cable 66 can be avoided. When the foot portion F31 has a hollow portion, the same effects can be obtained by letting the extension cable 66 pass through the hollow portion.

By plugging the charging cable 67 into a connection port 65a of the charging connector 65 in a tip of the foot portion F31 near the floor, the battery 8 can be charged. Therefore, the charging cable 67 is not disposed in the air obliquely upward or downward but disposed to hug the ground. Thus, the charging cable does not disturb a person passing by a peripheral part of the legged chair Sd and can be more easily used. Since the charging connector 65 is formed on the upper side of the caster F31a, the charging cable 67 connected to the charging connector 65 can be suppressed from entanglement with the caster F31a. The seated portion cover 58 is an arbitrary constituent element to which the holding cover 71Z may be attached to be exposed.

Tenth Embodiment

Figure 62:
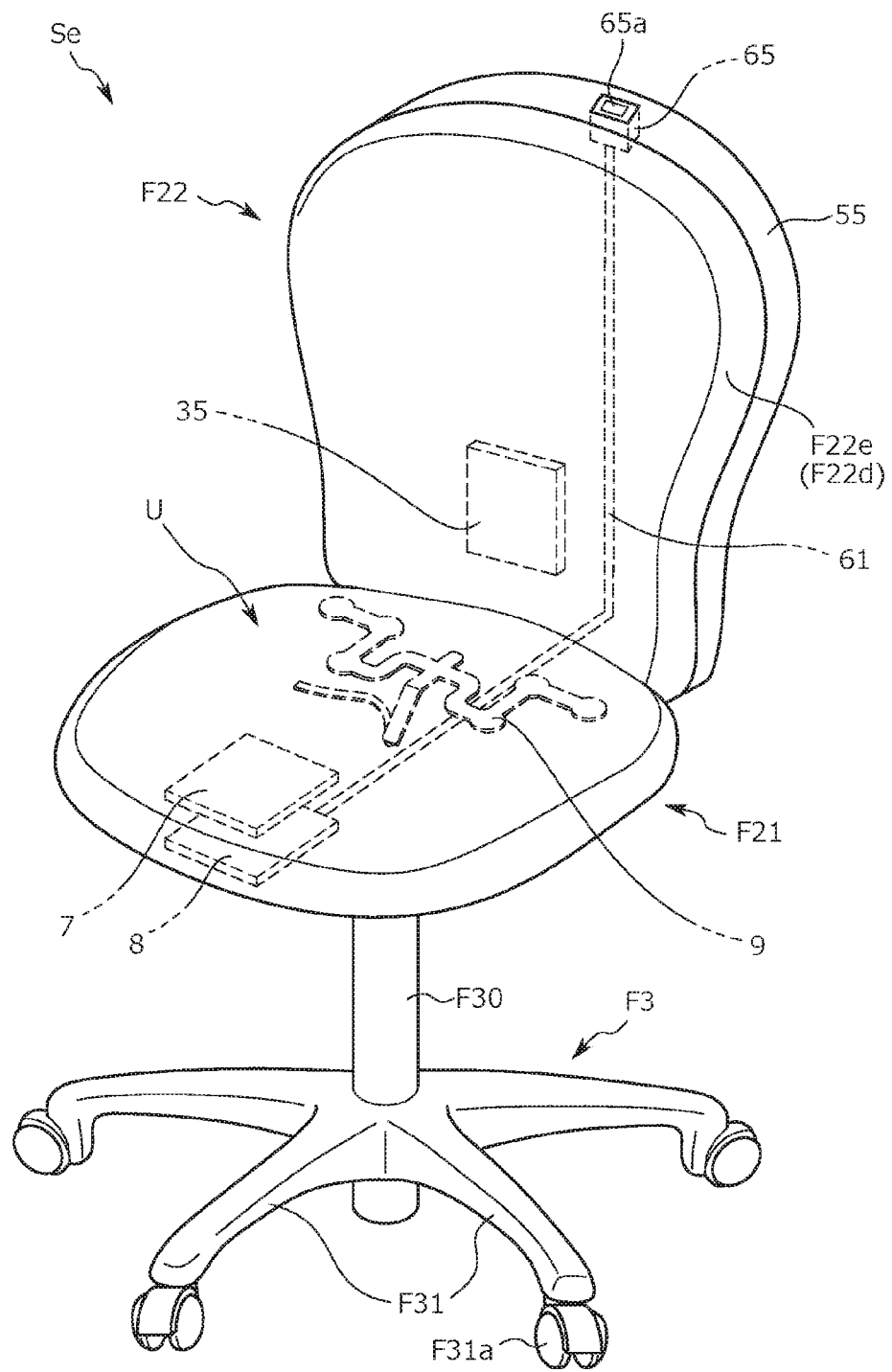
FIG. 62 is perspective schematic view of a legged chair according to a tenth embodiment.

Now, a legged chair Se according to a tenth embodiment is described with reference to FIG. 62. FIG. 62 is an perspective schematic view of the legged chair Se according to the tenth embodiment. The legged chair Se according to the tenth embodiment includes a charging connector 65 attached to an upper portion of a backrest cover 55 which is attached to a back surface of a resin plate F22d of a back pan F22 in such a manner that a connection port 65a is exposed to the exterior to be directed upward. An extension cable 61 is connected to a battery 8 and the charging connector 65 through the interior of a cushion pan F21 and the back pan F22.

With such a configuration, since the charging connector 65 is attached to the backrest cover 55, the battery 8 can be charged by plugging a charging cable 67 into the charging connector 65 without removing the backrest cover 55.

In particular, since the charging connector 65 is attached to the upper portion of the backrest cover 55, a standing person can easily plug the charging cable 67 into the connection port 65a without bending down.

A place where the charging connector 65 is attached is not limited to the upper portion of the backrest cover 55 but may be attached to a side surface or a lower surface of the backrest cover 55. By attaching the charging connector 65 to the side surface or the lower surface of the backrest cover 55 in such a manner that the connection port 65a is directed sideways or downward, foreign substances falling down from the upper side can be avoided from entering the connection port 65a.

Figure 63:
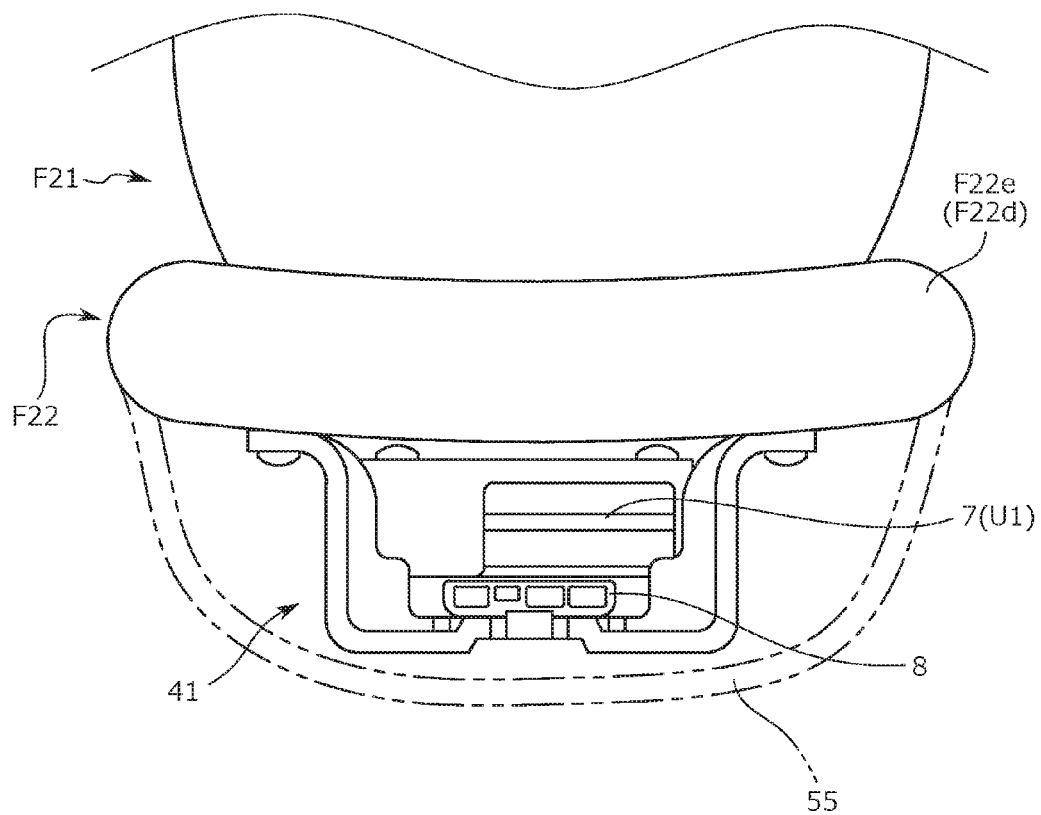
FIG. 63 is a schematic top view showing a state where a holding cover is attached to a rear surface of a resin plate of a back pan.

In particular, when the charging connector 65 is attached in such a manner that the connection port 65a is directed downward, the charging cable 67 to be connected to a household outlet and generally provided at a low place can be avoided from being greatly bent in the vicinity of the connection port 65a. Therefore, deterioration of the charging cable 67 is suppressed, so that disconnection can be more easily avoided. Further, attachment of the charging connector 65 is not limited to the backrest cover 55 but the charging connector may be attached to the seated portion cover 57, 58. As shown in FIG. 63, a holding cover 41 holding an ECU 7 and the battery 8 may be attached to a rear surface of the resin plate F22d of the back pan F22. With such a configuration, there is no need for providing the extension cable 61, so that the number of parts can be reduced.

Eleventh Embodiment

A seat with an awakening device according to an eleventh embodiment of the present disclosure is a seat with an awakening device capable of more reliably achieving prevention of a doze of the seated person and effectively maintaining an awake state. Conventionally, there is the known working chair including the doze prevention device capable of preventing a doze of the seated person for the purpose of efficiently studying or working (for example, refer to JP A 6-253953).

The vibration chair for doze prevention described in JP A 6-253953 includes a chair main body, the vibration motor attached to a bottom surface of a cushion pan serving as the seat portion of the chair main body, and a remote controller for turning ON or OFF activation of the vibration motor. In addition to an operation switch for the vibration motor, a timer for setting a vibration time is provided in the remote controller. With the above configuration, when the seated person gets sleepy during work, the chair main body can be vibrated by activating the vibration motor. Therefore, a doze of the seated person can be prevented.

However, in the vibration chair for doze prevention as described in JP A 6-253953, nothing particular is done for notifying the seated person and people around the seated person in an easily understandable manner of the fact that the doze prevention device is normally activated, that is, the doze prevention device is activated in a stand-by state. Therefore, when the seated person and people around the seated person remain ignorant of the fact that the doze prevention device is not activated, at the end, there is a fear that doze prevention of the seated person cannot be achieved.

In the vibration chair for doze prevention as described in JP A 6-253953, for example, in a case where the seated person falls into a sleeping state, or in a case where an awake state of the seated person is considerably decreased, operations by the remote controller are not easily performed, and there is a fear that an awake state of the seated person cannot be effectively maintained.

In the vibration chair for doze prevention as described in JP A 6-253953, suppression of a size increase in the chair for a user to easily carry, and weight reduction of the seat are desired.

Figure 64:
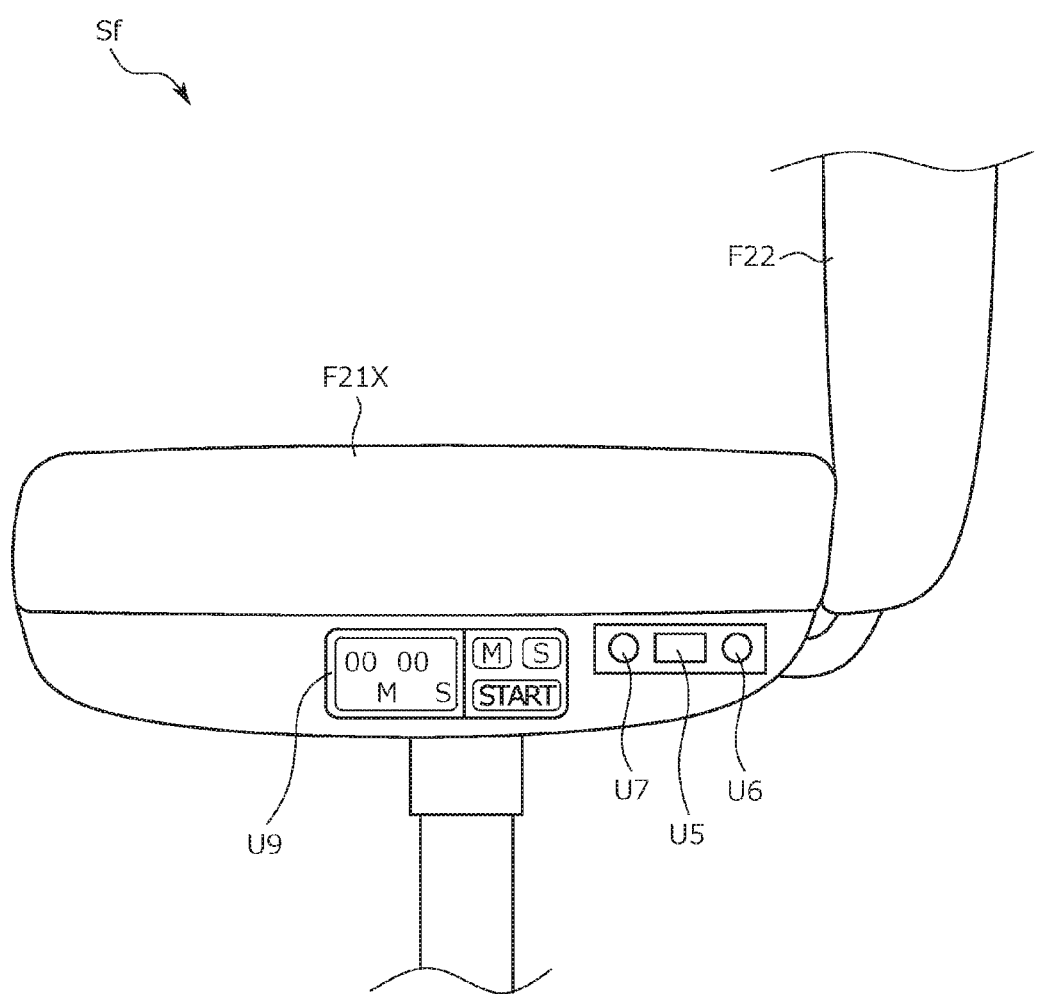
FIG. 64 is a side view showing a seat with an awakening device according to an eleventh embodiment.

Now, the seat with the awakening device according to the eleventh embodiment of the present disclosure for solving these problems is described on the basis of FIG. 64. Description of contents redundant with the above legged chair Sc is omitted. In a legged chair Sf, an operation switch U5, an activation display unit U6, and a charging state display unit U7 are respectively arranged on a left outer side surface of a cushion pan F21X in the seat width direction, and also arranged in a seat rear portion. As a constituent element of an awakening device U, a timer unit U9 that measures a preliminarily set time and when the set time elapses, sends a predetermined signal toward an ECU 7 is further provided.

The timer unit U9 is attached to a peripheral part of the operation switch U5, and for example, in a case where the set time is one hour, can send the predetermined signal toward the ECU 7 on each one hour interval. The ECU 7 can send a signal for driving a vibration device 35 toward the vibration device 35 on the basis of the predetermined signal received from the timer unit U9 irrespective of determination of an awake state of the seated person. In addition, for example, by making the set time of the timer unit U9 three hours and sending the predetermined signal to the ECU 7 after three hours, activation of the ECU 7 can be stopped. With the timer unit U9, the seated person can activate the vibration device 35 in accordance with a use environment, so that convenience of the vibration device 35 can be enhanced.

In the above configuration, the operation switch U5, the activation display unit U6, and the charging state display unit U7 are arranged at the same position as a breathing sensor 9 in the front to back direction of the seat. Therefore, a harness U8 can extend on the substantially one straight line from the position of the breathing sensor 9, so that an assembling task of the harness U8, and deformation of the harness U8 can be suppressed.

In the above configuration, the operation switch U5 is arranged on the left outer side surface of the cushion pan F21X in the seat width direction and arranged in the seat rear portion. Therefore, the operation switch is arranged at a position where a hand is easily accessible when the seated person is seated. An occasion where the seated person erroneously touches the operation switch U5 when crossing his/her legs the other way around in a seated state or the like is reduced.

Modified Example

Figure 65:
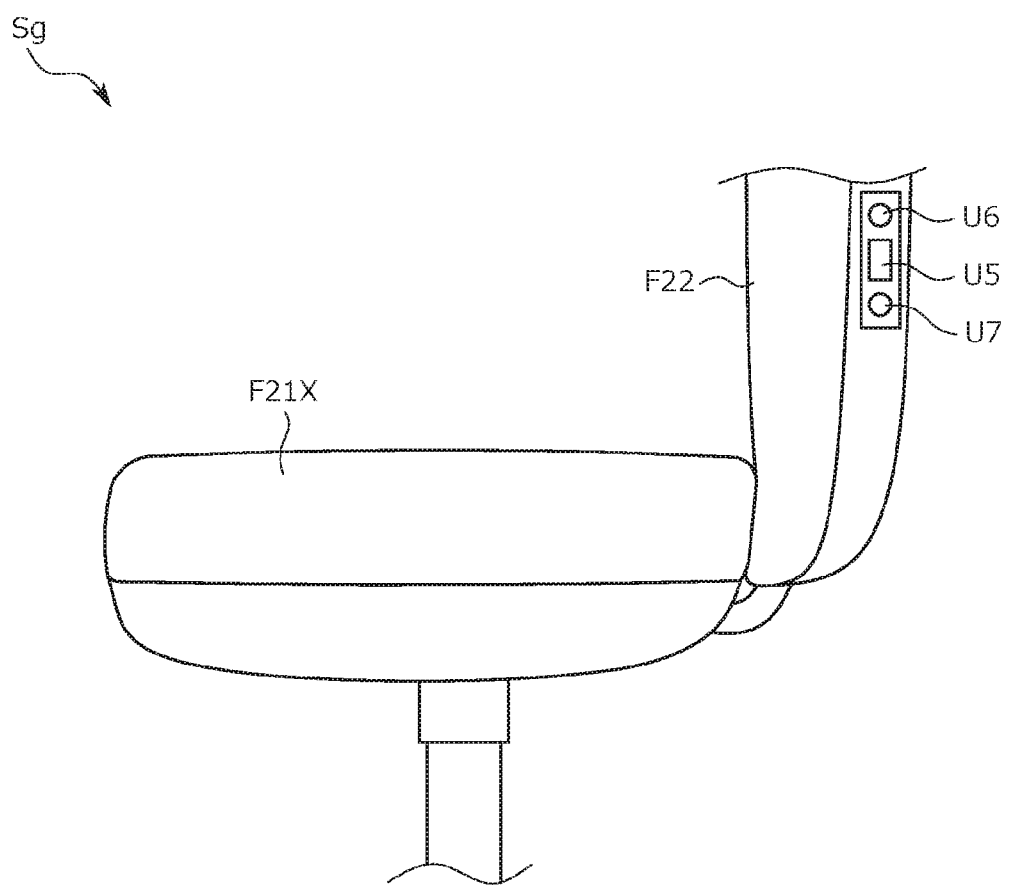
FIG. 65 is a side view showing a modified example of the seat with the awakening device.

Now, a modified example of the seat with the awakening device is described on the basis of FIG. 65. In a legged chair Sg serving as a seat according to the modified example, the operation switch U5, the activation display unit U6, and the charging state display unit U7 are arranged on a left outer side surface of a back pan F22 in the seat width direction and arranged in a lower portion. With the above configuration, the operation switch, the activation display unit, and the charging state display unit are arranged at positions where a hand is easily accessible when the seated person is seated. An occasion where the seated person erroneously touches the operation switch U5 is reduced. With the above configuration, the operation switch u5, the activation display unit U6, and the charging state display unit U7 are arranged at the same position as the vibration device 35 in the up and down direction. Thus, the harness U8 can extend on the substantially one straight line from the position of the vibration device 35.

Other Embodiments

In the legged chair Sc according to the above embodiment shown in FIG. 47, the activation display unit U6 is attached to the upper end portion of the back pan F22. However, the present disclosure is not particularly limited but the activation display unit may be attached to a position to be visually confirmable from the exterior when the seated person is seated. The position to be visually confirmable from the exterior when the seated person is seated corresponds to, for example, a position excluding a position hidden by the seated person and a position of a bottom surface portion of the seat main body and the leg member F3.

In the above embodiments, the breathing sensor 9 is adopted as a biological sensor that detects biological signals of the seated person. However, the present disclosure is not particularly limited but a biological sensor such as a heart-beat sensor or a body temperature sensor may be adopted instead of the breathing sensor 9.

In the above embodiments, the vibration device 35 is adopted as the drive unit that provides physical force to the seated person. However, the present disclosure is not particularly limited but a drive unit such as a pushing unit that performs a pushing action may be adopted instead of the vibration device 35.

In the above embodiments, as shown in FIG. 47, the operation switch U5 is adopted as a push button type switch for activating the awakening device U. However, the present disclosure is not particularly limited but the operation switch can be changed. For example, in order to activate or stop the awakening device U, an optical sensor U10 that detects presence or absence of light around the seat may be adopted instead or additionally. By adopting the optical sensor U10, setting to automatically turn ON/OFF the awakening device U not depending on operations of the seated person can be done. Thus, a mistake to turn on or turn off the awakening device U can be prevented. At this time, the optical sensor U10 is desirably attached to the portion where the operation switch U5 is arranged instead or additionally as shown in FIG. 47. For example, in order to activate or stop the awakening device U, a seating sensor U11 that detects that the seated person is seated may be adopted instead or additionally. At this time, the seating sensor U11 is desirably attached in a peripheral part of the breathing sensor 9 which is a portion supporting the seated person as shown in FIG. 47, or the breathing sensor 9 may also function as the seating sensor U11.

In the above embodiments, as shown in FIG. 47, the operation switch U5, the activation display unit U6, and the charging state display unit U7 are arranged at the positions in the vicinity of each other. However, the present disclosure is not particularly limited but the operation switch, the activation display unit, and the charging state display unit may be arranged at separate positions from each other as a matter of course.

In the above embodiments, the seat with the awakening device used as a working chair is described as a specific example. However, the present disclosure is not limited to this but the seat can be utilized as a seat widely used indoor or outdoor for commercial facilities such as a movie theater and a planetarium and community facilities such as a waiting lounge of a hospital. The seat can also be utilized as not only a vehicle seat for automobiles, trains, buses, and the like but also a seat for vehicles such as airplanes and vessels.

TABLE OF REFERENCE NUMERALS

FL: Floor
F3: Leg member (leg portion)
F21, F21X: Cushion pan (seated portion)
  F21a: Support post
  F21b: Lower side frame portion
  F21c: Upper side frame portion (metal frame)
  F21d: Resin plate
  F21e: Pad portion with skin
  F21f: Through hole
  F21g: Recess portion
  F21h: Through-hole
  F21j: Borehole
  F21k, F21m: Guide hole
  F21n: Through hole
  F21o, F21p, F21q: Pad portion
F22: Back pan (backrest)
  F22c: Coupling pipe (linear metal frame)
  F22d: Resin plate (plate member, main body portion)
  F22e: Pad portion with skin
F30: Support barrel
F31: Foot portion
  F31a: Caster
N1: self-Tapping screw (fastening member)
N2: Fixing screw
R1, R2, R3, R4: Route
S: Legged chair
SP: Space
Sa: Vehicle seat
Sb, Sc, Sd, Se, Sf, Sg: Legged chair
S1: Seatback
  S1a: Cushion pad
  S1b: Skin material
S2: Seat cushion
  S2a: Cushion pad
  S2b: Skin material
U: Awakening device
  U1: Control device
    U1A: Control device
  U5: Operation switch
  U6: Activation display unit
  U7: Charging state display unit
  U8: Harness
  U9: Timer unit
  U10: Optical sensor
  U11: Seating sensor
7: ECU (control device)
8: Battery
9: Breathing sensor (biological sensor)
  9X: Breathing sensor (biological sensor)
  9a: Electrode
  9b: Film with conductor wire
10: Operation lever (operation unit)
  10A: Heartbeat sensor
11: Harness
  11X: Electrode portion
  11a: Conductive sheet
    11aa: Ink
    11ab: Second resin film
    11ac: First resin film
    11ad: Double-stick tape
  11b: Slit portion
  11c: Cutout portion
  11d: Conductor wire
    11da: Basic conductor wire (one part)
    11db: Crossing conductor wire (other part)
  11e: Terminal coupling member
  11f: Cable
  11h: Crossing portion
12: Power transmission unit
13: Power receiving unit
14: Conductor wire
15: Cable
16: Wireless power feeding device
18: Basic pattern
  18a: Basic conductor wire
  18b: Crossing conductor wire
19: Coupled pattern
  19a, 19b: Square portion
    19aa, 19ba: Basic conductor wire
    19ab, 19bb: Crossing conductor wire
  19c: Coupled portion
20a: Recess groove (position displacement prevention unit)
20b: Rib (position displacement prevention unit)
20c: Projection portion (position displacement prevention unit)
21: Detection device
  21A: Desk
22: Arithmetic processing device
  22X, 22Y: Hanging groove
  22b: Wire
23: Vibration device
  23X: Contact portion
  23a: End portion
24: Armrest
26: Conductive cloth
30: Backrest main body
  30a, 300: Back frame
  30b: Pad portion
  30c: Resin portion
  30d: Skin
  30e: Terminal
  30j, 30k, 30m: Rib (vibration diffusion unit, shielding plate, projecting portion)
  31a, 31b, 31c, 31d, 31e: Recess portion
32: Backrest cover
33: Harness
34: Connection member
  34a: Resin portion
  34b: Hollow portion
35: Vibration device (stimulation device, drive unit)
36: Seated portion cover
  36a: Projection
37: Attachment member (metal portion)
  37a: Upper end portion
  37b: Lower end portion
  37c: Center part
  37d: Both end part
  37e: Center part
  37f: Both end part
  37g: Middle portion 38: self-Tapping screw
41: Holding cover
42: Recess portion
43: Through hole
44: Skin
  44a: Terminal
50: Fan
51: Seated portion cover (cover)
  51a: Slit
  51b: Exhaust port (opening hole)
  51c: Opening hole (opening, inlet/outlet, through port)
53, 54: Seated portion cover (cover)
  53a: Control device housing portion (recess portion, deepest recess portion)
  53b: Battery housing portion (recess portion)
  53c: Rib
  54a: Through port
55: Backrest cover
57, 58: Seated portion cover (cover)
  57c: Opening hole
  58a: Through port
61: Extension cable
65: Charging connector
  65a: Connection port
66: Extension cable
67: Charging cable
70: Connector
  70a: Connection port
71, 71X, 71Y, 71Z: Holding cover (holding member, resin portion)
  71a: Housing recess groove
  71b: Pan attachment portion (projecting portion)
  71c: Pan attachment hole
  71d, 71e: Rib
  71f: Cantilever piece
  71g: Locking projection
  71h: Slit (opening hole)
  71i: Opening (inlet/outlet, through port, other through port)
72: Base member
  72X: Base member
  72a: Punch hole
73: Cover member
74: Seated portion frame
75: Holding cover (case)
  75a: Opening hole
  75b: Through port (opening hole)
76: Holding cover
  76a: Motor accommodation portion
  76b: component accommodation portion
  76c: Motor accommodation hole
77: Control device holding cover
78: Battery holding cover
80a: Charging jack

The invention claimed is:

1. A chair comprising:
a leg member;
a support post connected to the leg member;
a frame integrated with the support post, the frame forming a seated portion;
a stimulation device configured to provide a stimulation to a seated person, and a control device that controls the stimulation device;
a holding member configured to hold the control device; and
a sensor configured to detect a biological signal of the seated person; wherein
the holding member is attached to the frame,
the seated portion includes a pad that is supported by the frame and a cover that covers the pad,
the sensor is disposed between the pad and the cover of the seated portion, and
the holding member is disposed in front of the support post and the sensor in a front and rear direction of the seated portion.

2. The chair according to claim 1, wherein
the holding member has a projecting portion attached to the frame, wherein the projecting portion projects on an upper side of the control device held by the holding member, and
in a state where the holding member is attached to the frame, a space is formed between the frame and the control device.

3. The chair according to claim 1, further comprising a harness that connects the sensor and the control device, wherein
the pad is provided with a guide hole that extends obliquely forward and downward, and
the harness passes through the guide hole in a front and rear direction of the seated portion.

4. The chair according to claim 1, wherein a portion of the pad to which the sensor is attached is thicker in an up and down direction than a portion of the pad which the control device overlaps in the up and down direction.

5. The chair according to claim 1, wherein
a hanging groove is formed in the pad, and
the hanging groove is disposed between the sensor and the control device in the front and rear direction of the seated portion.

6. The chair according to claim 1, wherein
a hanging groove is formed in the pad,
a part of the sensor comes into the hanging groove,
other parts of the sensor are disposed at both a front side and a rear side of the hanging groove, and
the hanging groove is disposed between the sensor and the control device in the front and rear direction of the seated portion.

7. The chair according to claim 1, wherein a cutout is formed on a front surface of the holding member for connecting the control device and the sensor.

8. The chair according to claim 7, wherein
a plurality of slits for heat radiation are formed in the holding member, and
each of the plurality of slits is disposed on a different surface of the holding member from the surface of the holding member on which the cutout is formed.

9. The chair according to claim 1, further comprising a power receiving unit that is arranged below the leg member, wherein
the holding member is disposed at a front side of the power receiving unit in a front and rear direction of the chair.

10. The chair according to claim 1, further comprising a vibration device that is accommodated in the holding member.

11. The chair according to claim 10, wherein the vibration device and the control device are disposed to overlap each other in the front and rear direction of the seated portion.

12. The chair according to claim 11, wherein a vertical wall is provided between the vibration device and the control device.

13. The chair according to claim 11, wherein the holding member holds a battery on a lower side of the control device.

14. The chair according to claim 1, further comprising a vibration device in the seated portion, wherein
the vibration device is disposed between the sensor and the holding member in the front and rear direction of the seated portion.

15. The chair according to claim 14, wherein the vibration device is disposed between the support post and the holding member.

* * * * *